US007836600B2

(12) United States Patent
Chwalek et al.

(10) Patent No.: US 7,836,600 B2

(45) Date of Patent: Nov. 23, 2010

(54) FLUID EJECTOR HAVING AN ANISOTROPIC SURFACE CHAMBER ETCH

(75) Inventors: James M. Chwalek, Pittsford, NY (US); John A. Lebens, Rush, NY (US); Christopher N. Delametter, Rochester, NY (US); David P. Trauernicht, Rochester, NY (US); Gary A. Kneezel, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 178 days.

(21) Appl. No.: 11/685,259

(22) Filed: Mar. 13, 2007

(65) Prior Publication Data

US 2007/0153060 A1 Jul. 5, 2007

Related U.S. Application Data

(62) Division of application No. 10/911,186, filed on Aug. 4, 2004, now Pat. No. 7,213,908.

(51) Int. Cl.

| | |
|---|---|
| ***B23P 17/00*** | (2006.01) |
| ***B21D 53/76*** | (2006.01) |
| ***B41J 2/14*** | (2006.01) |
| ***B41J 2/16*** | (2006.01) |

(52) U.S. Cl. ....................................... 29/890.1; 347/47

(58) Field of Classification Search ................ 29/890.1; 347/47

See application file for complete search history.

(56) References Cited

U.S. PATENT DOCUMENTS 3,765,969 A 10/1973 Kragness et al.

(Continued)

FOREIGN PATENT DOCUMENTS

EP 1 112 848 7/2001

(Continued)

OTHER PUBLICATIONS

S.S. Baek, H.T.Lim, H. Song, Y.S. Kim, K.D.Bae, C.H. Cho, C.S. Lee, J.W. Shin, S.J. Shin, K. Kuk and Y.S. Oh, "T-Jet: A Novel Thermal Inkjet Printhead With Monolithically Fabricated Nozzle Plate on Soi Water", Jun. 12, 2003, pp. 472-475, XP002356682.

*Primary Examiner*—A. Dexter Tugbang
*Assistant Examiner*—David P Angwin
(74) *Attorney, Agent, or Firm*—William R. Zimmerli

(57) ABSTRACT

A method of forming a fluid chamber and a source of fluid impedance includes providing a substrate having a surface; depositing a first material layer on the surface of the substrate, the first material layer being differentially etchable with respect to the substrate; removing a portion of the first material layer thereby forming a patterned first material layer and defining the fluid chamber boundary location; depositing a sacrificial material layer over the patterned first layer; removing a portion of the sacrificial material layer thereby forming a patterned sacrificial material layer and further defining the fluid chamber boundary location; depositing at least one additional material layer over the patterned sacrificial material layer; forming a hole extending from the at least one additional material layer to the sacrificial material layer, the hole being positioned within the fluid chamber boundary location; removing the sacrificial material layer in the fluid chamber boundary location by introducing an etchant through the hole; forming the fluid chamber by introducing an etchant through the hole; and forming a source of fluid impedance.

17 Claims, 48 Drawing Sheets

U.S. PATENT DOCUMENTS

| | | | |
|---|---|---|---|
| 4,580,149 | A | 4/1986 | Domoto et al. |
| 4,847,630 | A | 7/1989 | Bhaskar et al. |
| 5,278,585 | A | 1/1994 | Karz et al. |
| 5,502,471 | A | 3/1996 | Obermeier et al. |
| 5,760,804 | A | 6/1998 | Heinzl et al. |
| 5,841,452 | A | 11/1998 | Silverbrook |
| 6,019,457 | A | 2/2000 | Silverbrook |
| 6,102,530 | A | 8/2000 | Kim et al. |
| 6,183,067 | B1 | 2/2001 | Matta |
| 6,273,553 | B1 | 8/2001 | Kim et al. |
| 6,478,408 | B2 | 11/2002 | Lee et al. |
| 6,499,832 | B2 | 12/2002 | Lee et al. |
| 6,676,244 | B2 | 1/2004 | Kwon et al. |
| 6,751,865 | B1 * | 6/2004 | Peeters et al. .............. 29/890.1 |
| 7,487,590 | B2 * | 2/2009 | Song et al. ................. 29/890.1 |
| 2002/0075359 | A1 | 6/2002 | Wuu et al. |
| 2003/0160842 | A1 | 8/2003 | Min et al. |
| 2004/0000051 | A1 * | 1/2004 | Silverbrook ............... 29/890.1 |
| 2006/0027521 | A1 | 2/2006 | Kneezel et al. |
| 2007/0144004 | A1 * | 6/2007 | Silverbrook ............... 29/890.1 |
| 2008/0016689 | A1 * | 1/2008 | Horn et al. ................. 29/890.1 |

FOREIGN PATENT DOCUMENTS

| | | |
|---|---|---|
| EP | 1 413 439 | 4/2004 |
| JP | 55 121080 | 9/1980 |

* cited by examiner

FLUID EJECTOR HAVING AN ANISOTROPIC SURFACE CHAMBER ETCH

CROSS REFERENCE TO RELATED APPLICATIONS

This is a divisional of application Ser. No. 10/911,186, filed Aug. 4, 2004. Reference is made to commonly assigned, U.S. Pat. No. 7,213,908 issued May 8, 2007 entitled "SUBSTRATE ETCHING METHOD FOR FORMING CONNECTED FEATURES, in the name of Gary Kneezel, et al., the disclosure of which is incorporated herein by reference.

FIELD OF THE INVENTION

The present invention relates generally to micro electromechanical (MEM) fluid emission devices such as, for example, inkjet printing systems, and more particularly to fluid emission devices having an anisotropic surface chamber etch.

BACKGROUND OF THE PRIOR ART

Ink jet printing systems are one example of digitally controlled fluid emission devices. Ink jet printing systems are typically categorized as either drop-on-demand printing systems or continuous printing systems.

Drop-on-demand printing systems incorporating a heater in some aspect of the drop forming mechanism are known. Often referred to as "bubble jet drop ejectors", these mechanisms include a resistive heating element(s) that, when actuated (for example, by applying an electric current to the resistive heating element(s)), vaporize a portion of a fluid contained in a fluid chamber creating a vapor bubble. As the vapor bubble expands, liquid in the liquid chamber is expelled through a nozzle orifice. When the mechanism is de-actuated (for example, by removing the electric current to the resistive heating element(s)), the vapor bubble collapses allowing the liquid chamber to refill with liquid.

In order to achieve sufficiently high printing resolution and printing throughput, typically there are well over 100 individually addressable drop ejectors per printhead chip. In order to enable the addressing and driving of each of a larger number of drop ejectors, it is necessary to integrate driving and logic electronics on the same chip as the bubble jet drop ejectors, rather than needing to make interconnection of one lead per drop ejector to off-chip electronics There are various families of bubble jet drop ejector designs which may be distinguished from one another according to the relative primary direction of bubble growth and the direction of drop ejection.

In the first family of bubble jet drop ejector designs, the heating element is located within the fluid chamber directly below the nozzle orifice on a substantially planar surface which is substantially parallel to the plane of the nozzle orifice. When the heating element is pulsed, a bubble is nucleated in the fluid above the heating element. The primary direction of bubble growth is upward relative to the heating element. Downward growth of the bubble is not permitted, because of the planar surface on which the heating element resides. Since the nozzle opening is directly above the heating element, the direction of drop ejection substantially coincides with the primary direction of bubble growth.

In the second family of bubble jet drop ejector designs, the heating element is located within the fluid chamber on a substantially planar surface which is substantially perpendicular to the plane of the nozzle orifice. The heating element is laterally offset from the nozzle opening. When the heating element is pulsed, a bubble is nucleated in the fluid above the heating element. The primary direction of bubble growth is upward relative to the heating element. Downward growth of the bubble is not permitted, because of the planar surface on which the heating element resides. Since the nozzle is laterally offset from the heating element and the nozzle opening is substantially perpendicular to the heating element, the direction of drop ejection is substantially perpendicular to the primary direction of bubble growth.

In the third family of bubble jet drop ejector designs, the heating element is located substantially within the same plane as the nozzle opening with the heating element located at the periphery of the nozzle opening. By "located substantially within the same plane as the nozzle opening" it is meant that the heating element and the nozzle opening are both on the same side of the fluid chamber. By "located at the periphery of the nozzle opening" it is meant that the heating element is located laterally offset from the center of the nozzle opening. The heating element or elements may have a variety of possible shapes. The heating element or elements may surround the nozzle opening, or simply be at one or more sides of the nozzle opening. If the plane of the heating element and the nozzle is defined to be above the fluid chamber (see FIGS. 2-5), then when the heating element is pulsed, the primary direction of bubble growth is downward relative to the heating element. Upward growth of the bubble is not permitted, because of the planar surface on which the heating element resides. As the bubble expands, it exerts a pressure on the fluid in the chamber below the heating element. Since the nozzle opening is above the fluid chamber, the direction of drop ejection is upward, which is substantially opposite to the primary direction of bubble growth. This family of bubble jet drop ejectors in which the direction of drop ejection is substantially opposite to the primary direction of bubble growth is called backshooters. It is within the context of the backshooter family of drop ejectors that this invention is described.

In U.S. Pat. No. 4,580,149, Domoto discloses a drop ejector geometry which is related to the backshooter family. In this geometry all heaters are located within one large common ink chamber. Such a configuration will have unacceptably large interactions, i.e. fluidic cross-talk, between nearby drop ejectors. Also, since the bubble growth is not constrained by a chamber, a significant amount of energy will be lost rather than directed toward ejecting a droplet, so that this structure is not very efficient.

In U.S. Pat. No. 4,847,630, Bhaskar et al. disclose a drop ejector configuration which would operate in a backshooting mode. The process disclosed for making the device is to electroform an orifice plate, form an insulating layer on the orifice plate, form heater elements on the insulating layer, form an electrically insulating layer over the heater elements to protect them against the ink and cavitation damage, form chambers by electroforming, and connect the structure to an ink supply. Such a manufacturing process would not be compatible with integration of driving and logic electronics needed to address many drop ejectors.

In U.S. Pat. No. 5,760,804 assigned to Eastman Kodak Company, Heinzl et al. disclose a backshooter printhead having a plurality of ducts formed on the ink supply side of a cover plate of an ink supply vessel, each duct being in fluid communication with a respective nozzle opening on the other side of the cover plate. For some configurations of high resolution printheads having a spacing between drop ejectors corresponding to more than a few hundred nozzles and ducts per inch, providing individual ducts through the substrate for each nozzle may result in the walls between ducts being somewhat narrow for high-yield fabrication.

In U.S. Pat. No. 5,502,471 assigned to Eastman Kodak Company, Obermeier et al. disclose a refinement of the configuration of the backshooter printhead in Pat. No. 5,760,804 (which was filed prior to Pat. No. 5,502,471, but which was issued later). Obermeier et al. disclose flow throttle structures formed as longitudinally extended channels in a material layer between a chip and the ink supply. On the chip are disposed a plurality of ink channels, ejection openings, and the respective heating elements. It is specified that the material layer (in which the flow throttle structures are formed) covers the ink channels furnished in the chip. The function of the flow throttle is to increase the fluid impedance, and thereby to restrict the amount of ink which is pressed backwards in the direction of the supply channels, in order to improve the energy efficiency of drop ejection and also to reduce the fluidic crosstalk with nearby channels. In some applications, it is advantageous to provide fluid impedance for better energy efficiency and reduced crosstalk by other means than longitudinally extended channels in a material layer which covers the ink channels on the chip.

In U.S. Pat. Nos. 5,841,452 and 6,019,457, Silverbrook discloses a variety of bubble jet drop ejecting structures whose common features include a) the integrally forming of nozzles, ink passageways, and heater means on a substrate; and b) the ink supply inlet being on the opposite side of the substrate from the ink ejecting outlet, with a straight-through passageway connecting the inlet and the outlet. Two of the structures disclosed by Silverbrook would be considered to be backshooter devices (FIGS. 12 and 17 of both cited patents). Furthermore, in Pat. No. 6,019,457, Silverbrook discloses an ink passageway whose cross-section is gradually enlarging over a part of its length, with the larger cross-section being nearer the outlet side. Silverbrook cites the following disadvantage with respect to his FIG. 17 backshooter configuration formed by isotropic plasma etch of a substantially hemispherical chamber, followed by reactive ion etching of a barrel passageway connecting the chamber to the fluid inlet: there are potential difficulties with the nozzles filling with ink by capillary action if the angle of the barrel and the chamber are not closely monitored. Silverbrook's fabrication process for his FIG. 12 backshooter configuration is somewhat difficult to implement, in that it requires printing narrow barrel patterns at the bottom of 300 micron deep channels. It is desirable to have means of making backshooter devices with fluid chambers and connecting passageways having higher yield, tighter dimensional control, and better fluidic performance than the structures proposed in Pat. Nos. 5,841,452 and 6,019,457.

In U.S. Pat. Nos. 6,102,530 and 6,273,553, Kim et al. disclose a backshooter type printhead in which two different bubbles are produced in the fluid by heater elements. The first bubble to be formed is at the entry side of the fluid chamber and acts as a virtual valve to provide a high resistance to fluid exiting the chamber toward the ink entry side of the chamber at the time when the second bubble is formed to provide the drop ejection force. Furthermore, the ink chamber fabrication method described by Kim is an orientation dependent etching step which is subsequent to a previous orientation dependent etch of the ink inlet which intersects the chamber. As is well known in the art, orientation dependent etching of intersecting features having different dimensions will cause rapid enlargement of the two features in such a way that it is difficult to provide tight dimensional control. A concern with the virtual valve type of means for providing fluid impedance is the reproducibility and stability of the fluid impedance within the various drop ejectors of one printhead, both initially and after prolonged use, as well as the reproducibility from one printhead to another. Since the fluid impedance affects drop volume, drop velocity, and refill frequency, the stable and reproducible performance of the device may be compromised.

In U.S. Pat. Nos. 6,478,408 and 6,499,832, S. Lee et al. disclose backshooter type printheads having an ink chamber with substantially hemispherical shape, an ink supply manifold, an ink channel which supplies ink from the manifold to the ink chamber, a nozzle plate with a nozzle at a location corresponding to the central part of the ink chamber, and a heater formed on the nozzle plate around the nozzle. The hemispherical chamber is formed by dry etching through the nozzle with an etch gas which etches the substrate isotropically. In the described embodiments, the ink channel is formed in the surface of the substrate also by isotropically etching through a groove which is narrower than the diameter of the nozzle. The depth of the ink channel is less than the depth of the hemispherical chamber. In some embodiments there is a cusp-like protrusion at the intersection of the hemispherical chamber and the ink channel, the protrusion said to serve as a bubble barrier. In some embodiments, a nozzle guide extends from the edge of the nozzle to the inside of the ink chamber. Because the hemispherical chamber and the ink channel are formed by isotropic etching for a length of time, the resultant geometries will be somewhat dependant on parameters such as gas pressure, substrate temperature, and etch time. Uniformity of chamber and channel geometries, both within a printhead and from printhead to printhead may be difficult to achieve. As a result, it may be difficult to achieve a high yield of devices having the desired drop volume, drop velocity, refill frequency and uniformity.

S. Baek et al. in "T-Jet: A Novel Thermal Inkjet Printhead with Monolithically Fabricated Nozzle Plate on SOI Wafer" (Transducers '03, pages 472-475, June 2003), discloses a backshooting drop ejector configuration made by a trench filling technique in a Silicon on Insulator wafer. Sidewalls of a chamber and fluid restrictor are defined by filling a trench in the top silicon layer, while the bottom of the chamber is defined by the insulator layer. Under-heater layer, heater layer with conductor layer, upper heater layer and metal cover layer are deposited and patterned, and a nozzle plate is formed by electroplating. An ink delivery manifold is formed in the bottom silicon layer. Then the ink chamber and restrictor are formed by isotropic etching through the nozzle.

SUMMARY OF THE INVENTION

According to one aspect of the invention, a fluid ejecting device includes a substrate having a first surface and a second surface located opposite the first surface. A nozzle plate is formed over the first surface of the substrate. The nozzle plate has a nozzle through which fluid is ejected. A drop forming mechanism is situated at the periphery of the nozzle. A fluid chamber is in fluid communication with the nozzle and has a first wall and a second wall with the first wall and the second wall being positioned at an angle relative to each other. A fluid delivery channel is formed in the substrate and extends from the second surface of the substrate to the fluid chamber. The fluid delivery channel is in fluid communication with the fluid chamber. A source of fluid impedance comprises a physical structure located between the nozzle and the fluid delivery channel.

According to another aspect of the invention, a method of forming a fluid chamber and a source of fluid impedance comprises providing a substrate having a surface; depositing a first material layer on the surface of the substrate, the first material layer being differentially etchable with respect to the substrate; removing a portion of the first material layer thereby forming a patterned first material layer and defining the fluid chamber boundary location; depositing a sacrificial material layer over the patterned first layer; removing a portion of the sacrificial material layer thereby forming a patterned sacrificial material layer and further defining the fluid chamber boundary location; depositing at least one additional material layer over the patterned sacrificial material layer; forming a hole extending from the at least one additional material layer to the sacrificial material layer, the hole being positioned within the fluid chamber boundary location; removing the sacrificial material layer in the fluid chamber boundary location by introducing an etchant through the hole; forming the fluid chamber by introducing an etchant through the hole; and forming a source of fluid impedance.

According to another aspect of the invention, a fluid ejecting device includes a substrate having a first surface and a second surface located opposite the first surface. A nozzle plate is formed over the first surface of the substrate, the nozzle plate has a nozzle through which fluid is ejected. A fluid chamber is in fluid communication with the nozzle and has a bottom portion positioned opposite the nozzle. The bottom portion comprises a first wall and a second wall with the first wall and the second wall being positioned at an angle relative to each other. A fluid delivery channel is formed in the substrate and extends from the second surface of the substrate to the fluid chamber. The fluid delivery channel is in fluid communication with the fluid chamber. A source of fluid impedance comprises a physical structure located between the nozzle and the fluid delivery channel.

BRIEF DESCRIPTION OF THE DRAWINGS

In the detailed description of the embodiments of the invention presented below, reference is made to the accompanying drawings, in which.

FIB. 30B shows a cross-sectional view as seen along direction 30B-30B.

Figure 31A:
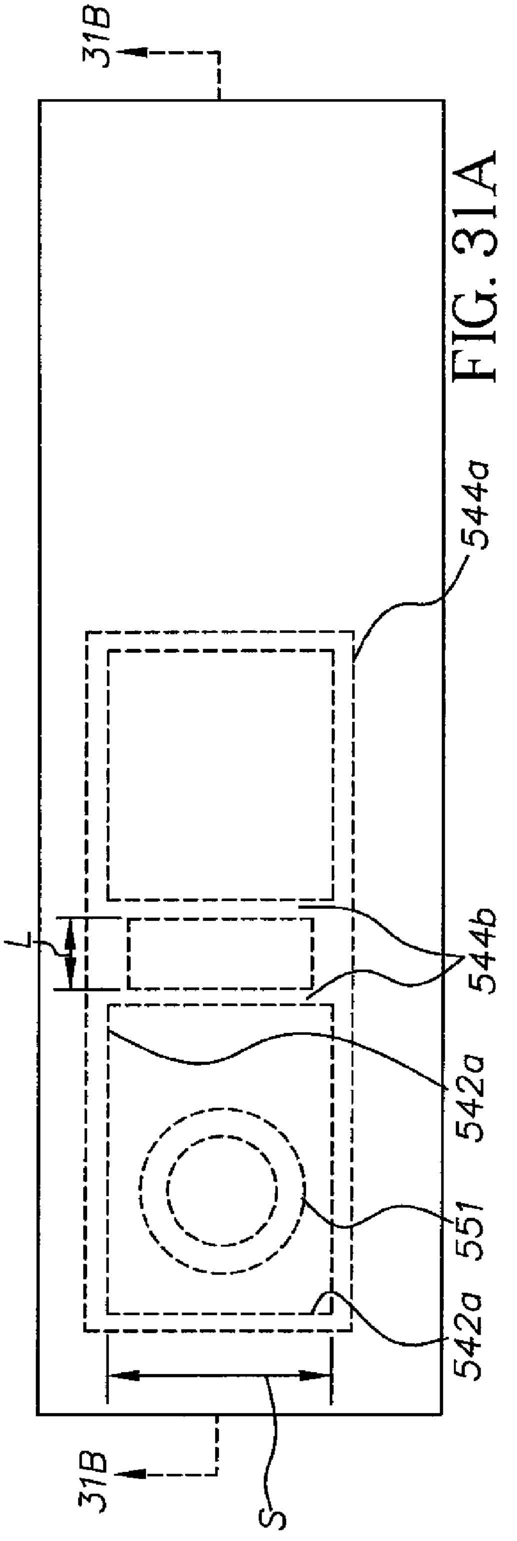

FIG. 31A shows a top view of a substrate, heater, and multilayer stack in a fifth embodiment.

Figure 31B:
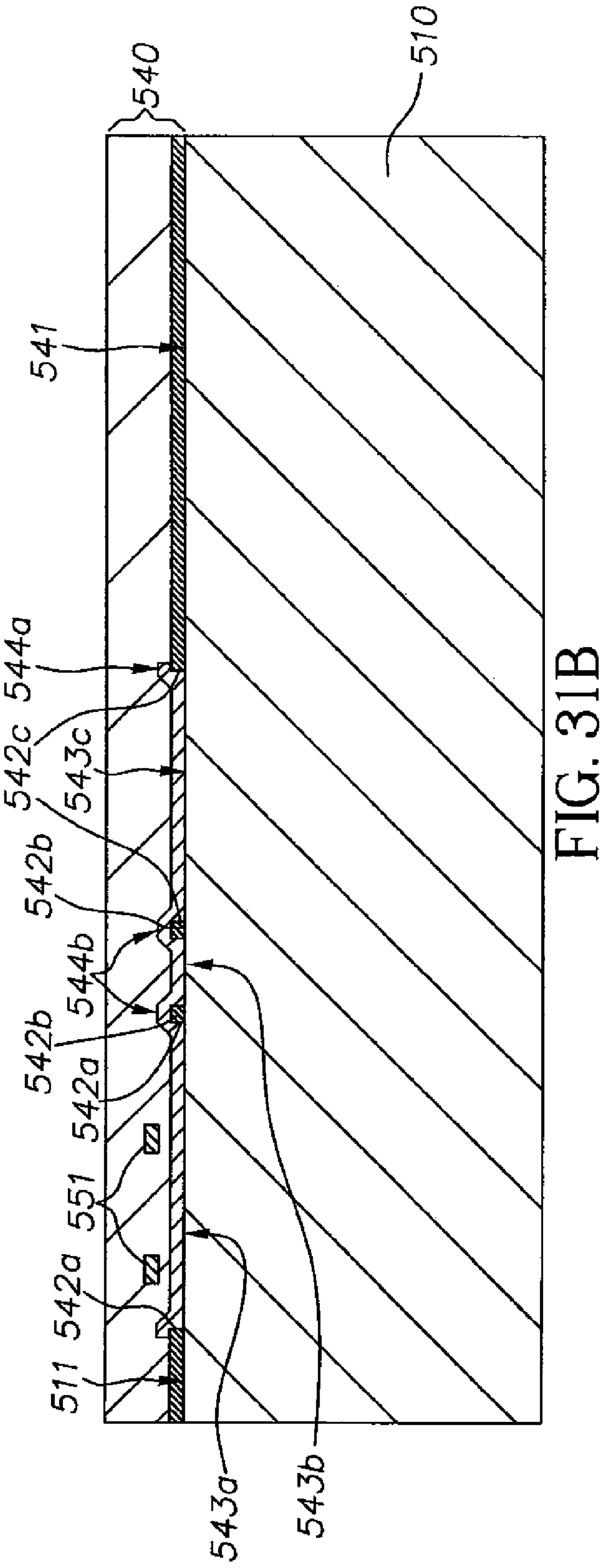

FIG. 31B shows a cross-sectional view as seen along direction 31B-31B.

Figure 32A:
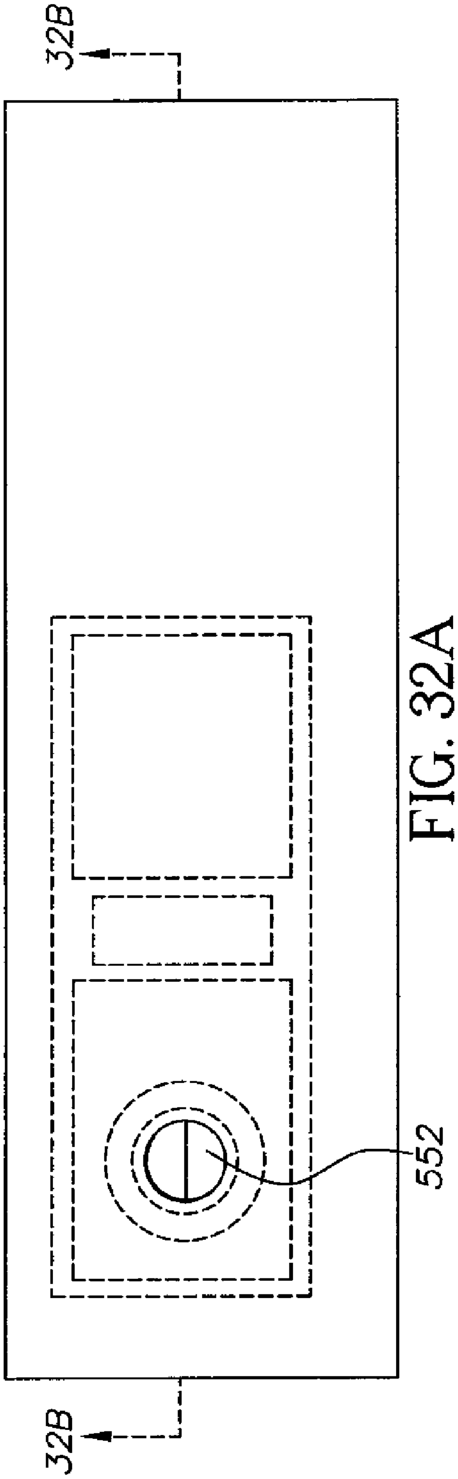

FIG. 32A shows a top view following a subsequent step of forming a nozzle.

Figure 32B:
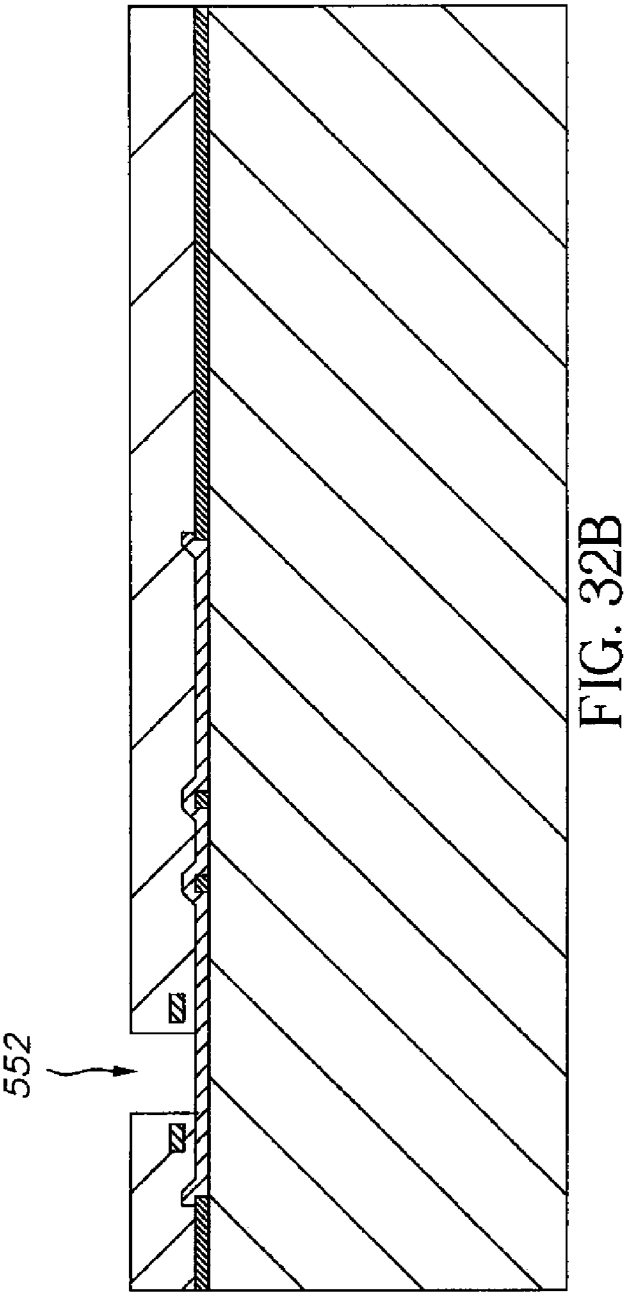

FIG. 32B shows a cross-sectional view as seen along direction 32B-32B.

Figure 33A:
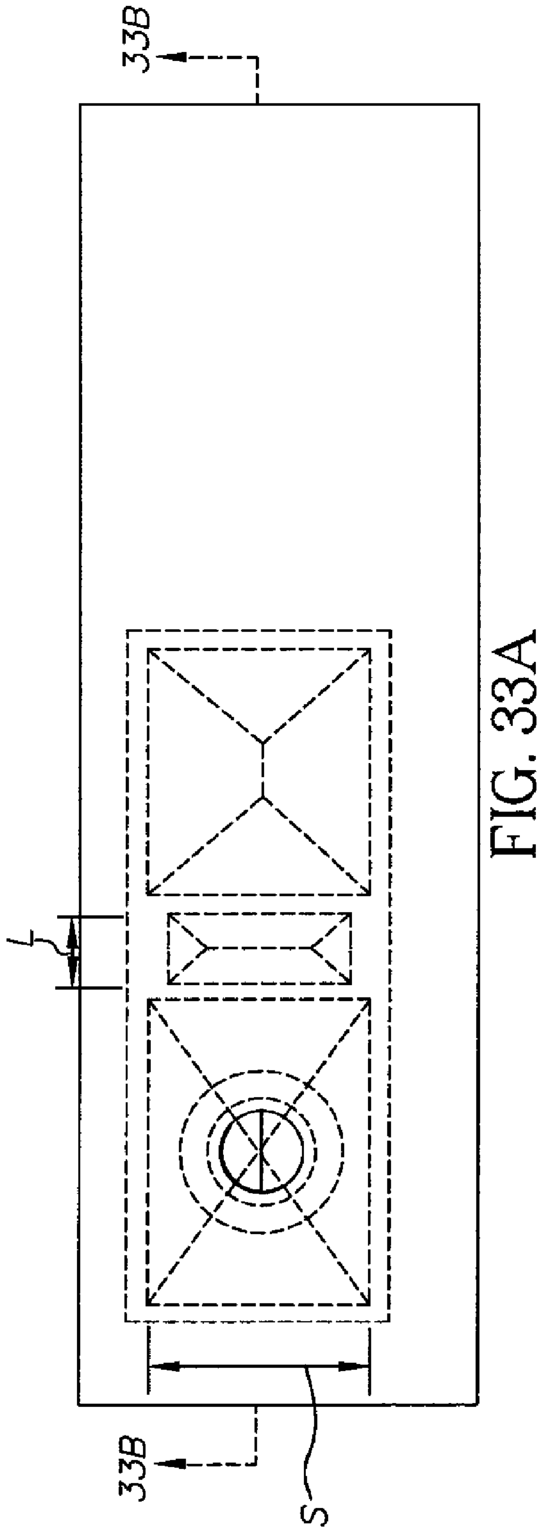

FIG. 33A shows a top view following a subsequent step of forming a fluid chamber and a multistage impedance channel.

Figure 33B:
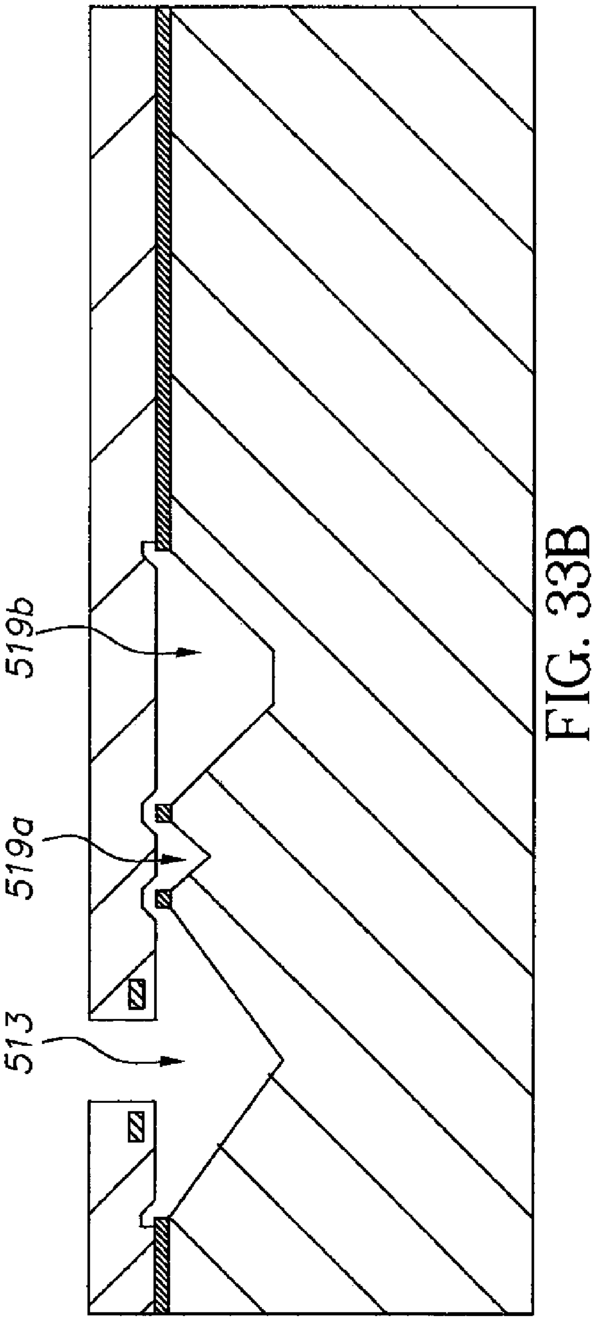

FIG. 33B shows a cross-sectional view as seen along direction 33B-33B.

Figure 34A:
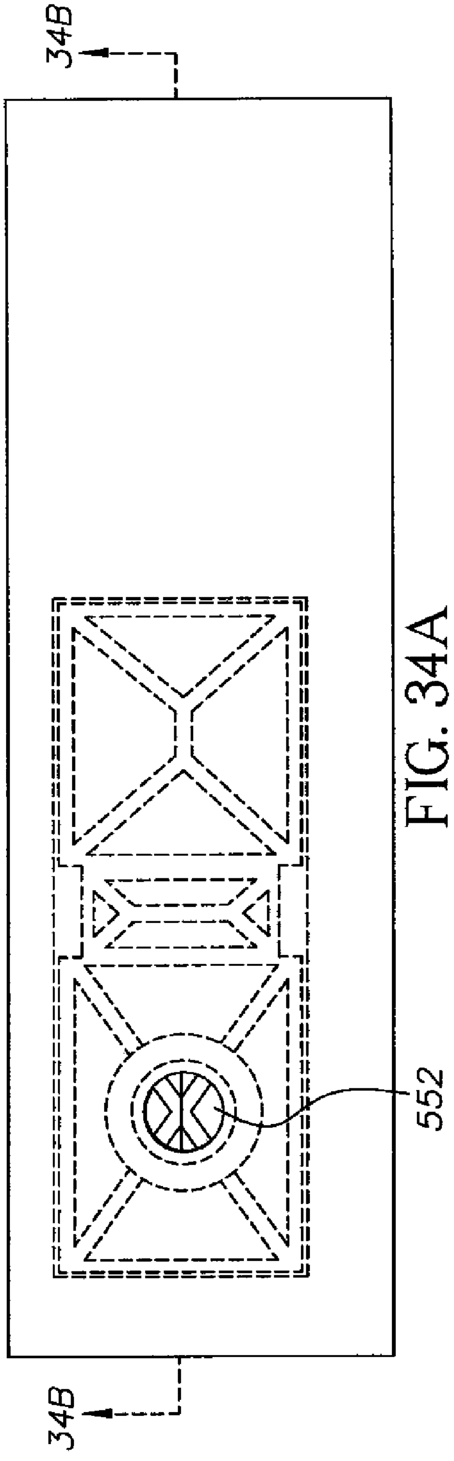

FIG. 34A shows a top view following a subsequent step of enlarging the connection between the fluid chamber and the multistage impedance channel.

Figure 34B:
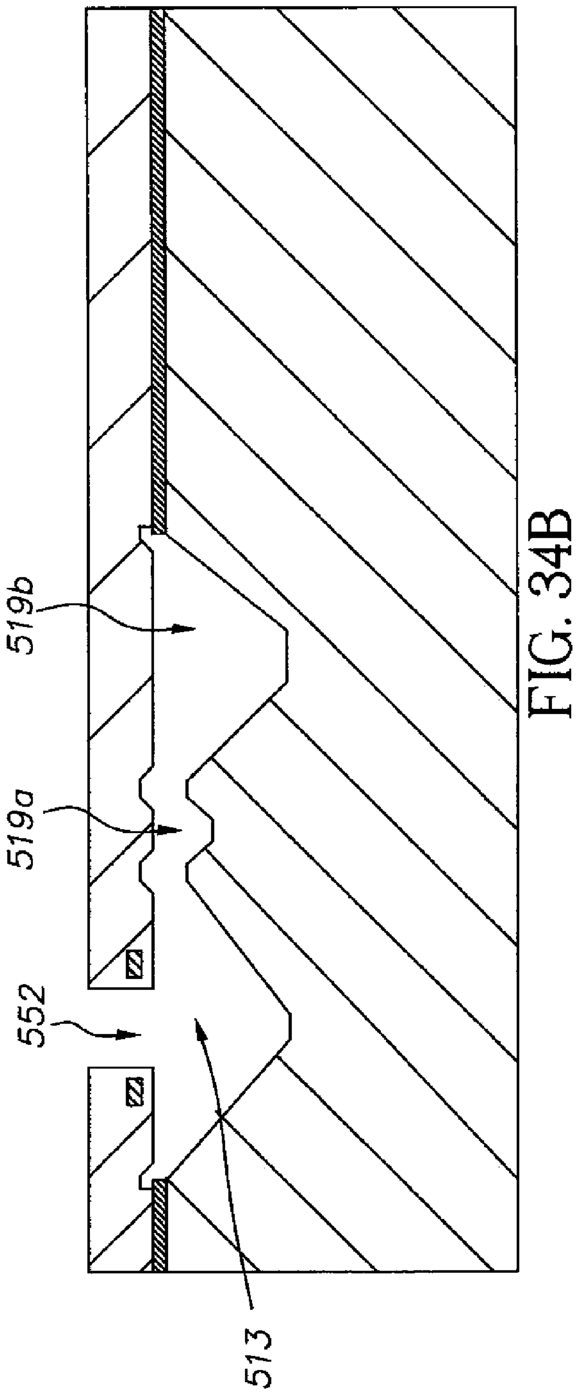

FIG. 34B shows a cross-sectional view as seen along direction 34B-34B.

Figure 35A:
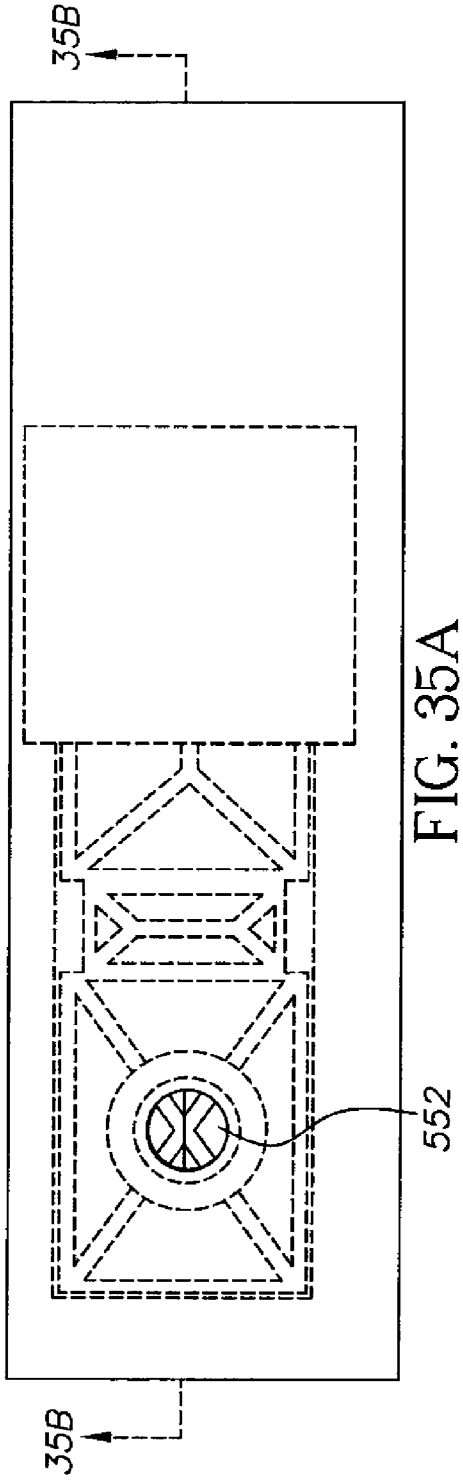

FIG. 35A shows a top view following a subsequent step of forming a fluid delivery channel.

Figure 35B:
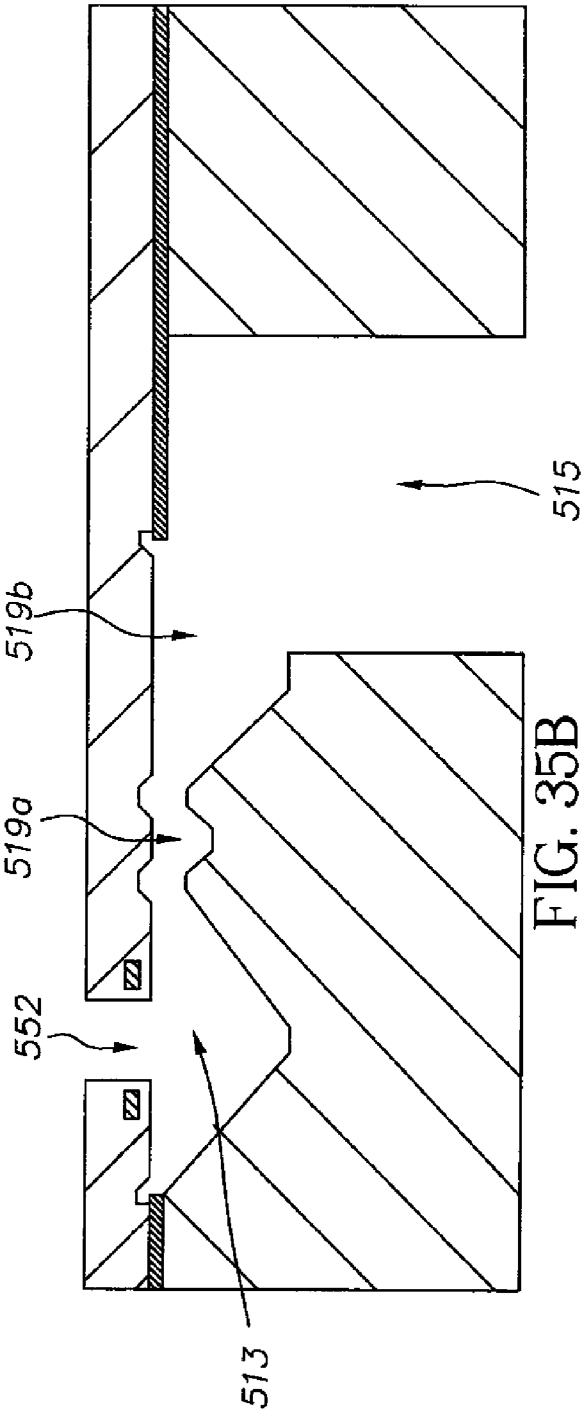

FIG. 35B shows a cross-sectional view as seen along direction 35B-35B.

Figure 36A:
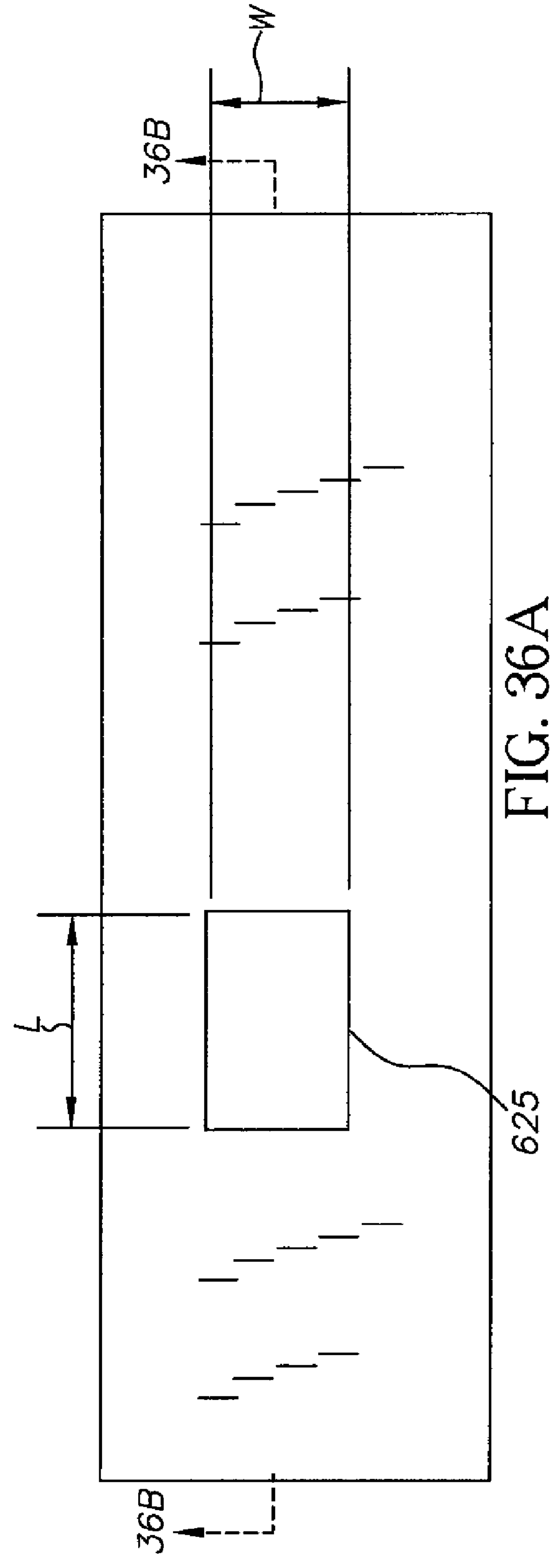

FIG. 36A shows a top view of a substrate with a pit formed in the surface in a sixth embodiment.

Figure 36B:
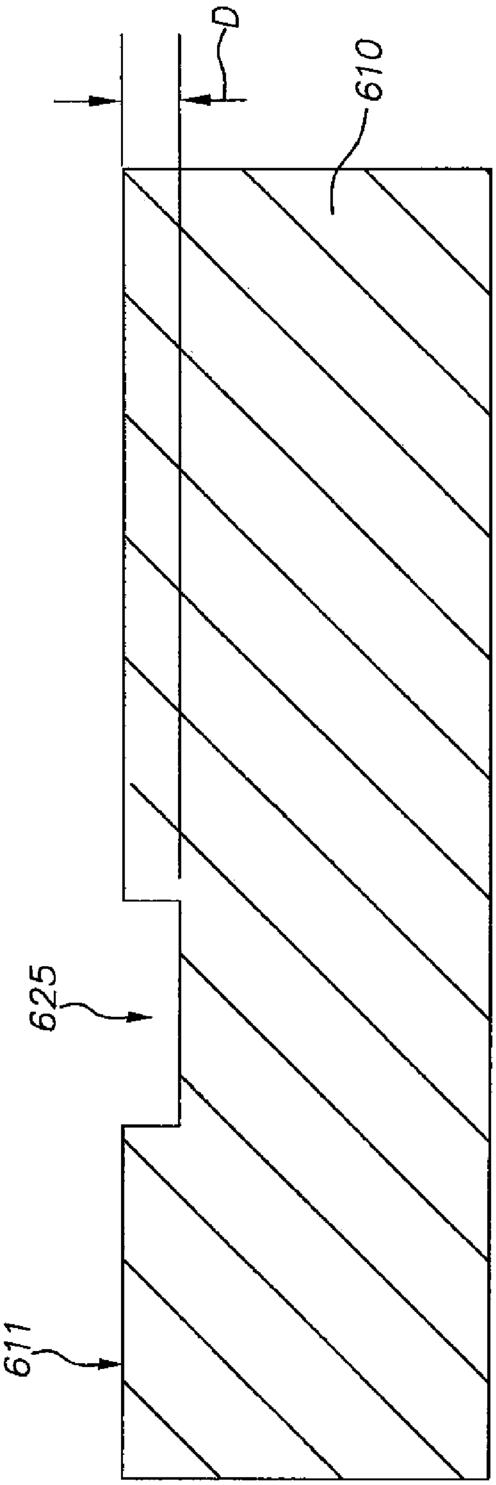

FIG. 36B shows a cross-sectional view as seen along direction 36B-36B.

Figure 37A:
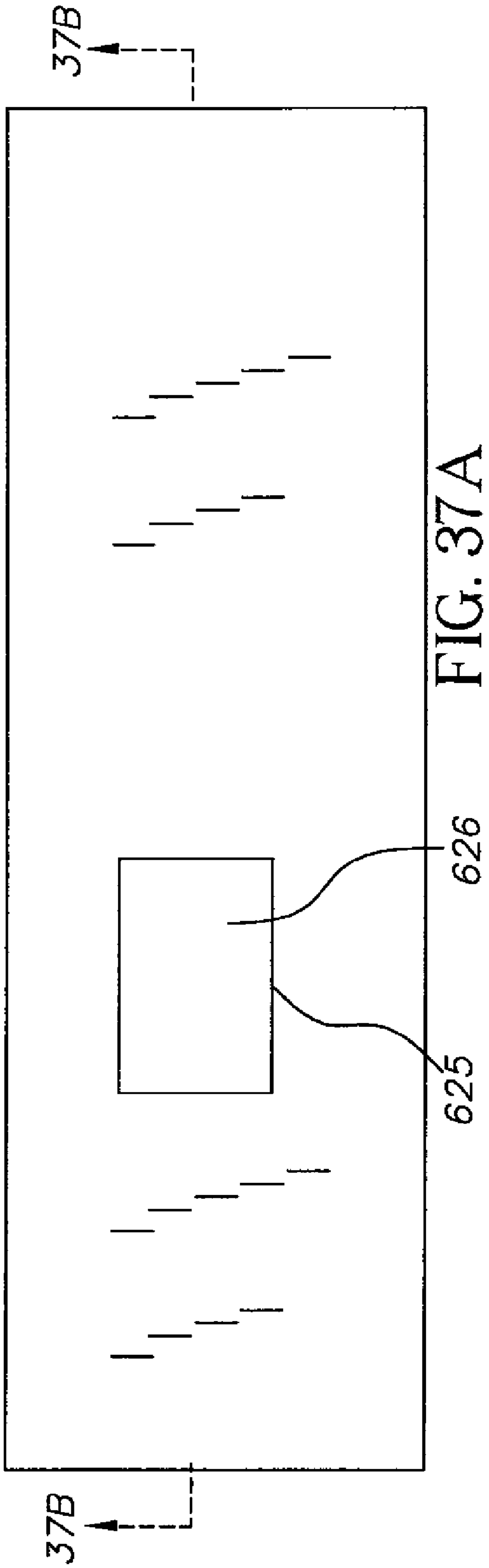

FIG. 37A shows a top view following a subsequent step of filling the pit with a sacrificial material.

Figure 37B:
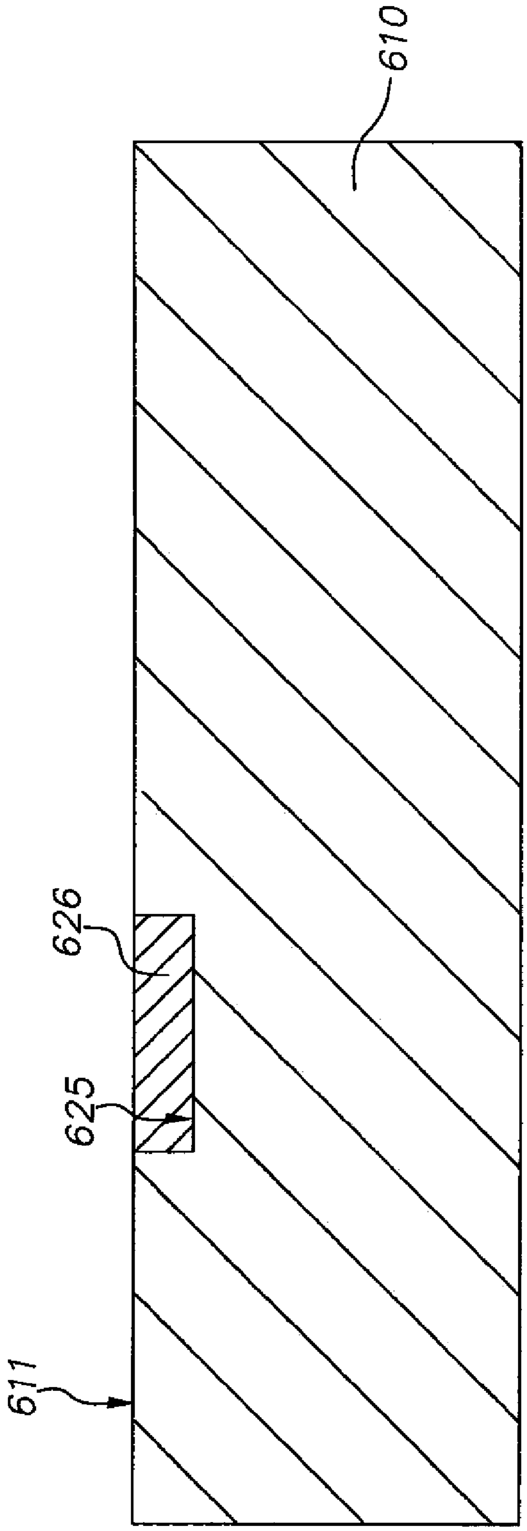

FIG. 37B shows a cross-sectional view as seen along direction 37B-37B.

Figure 38A:
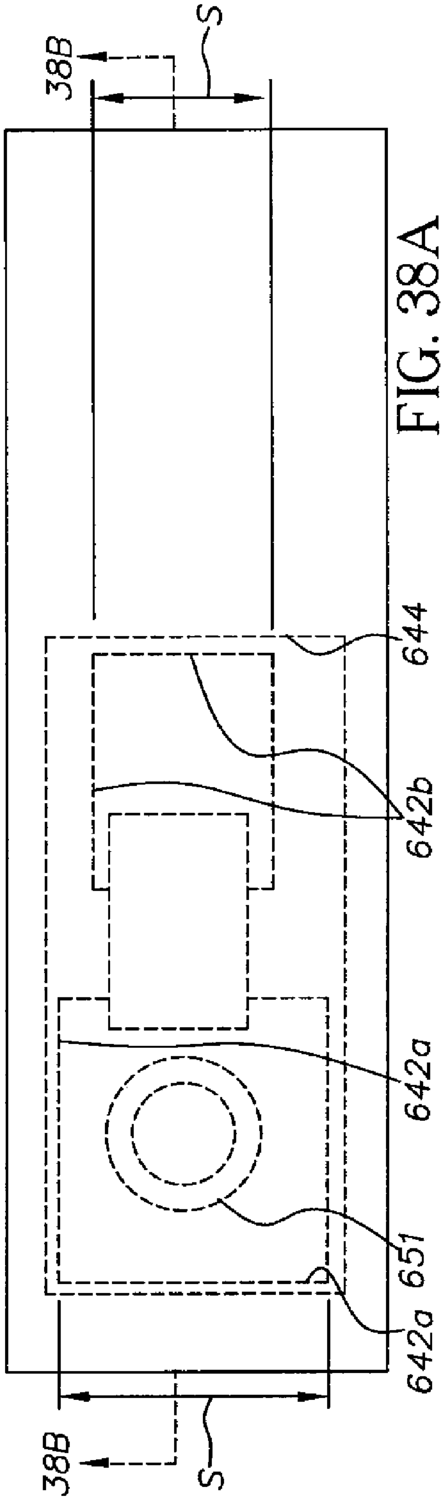

FIG. 38A shows a top view following subsequent steps of forming a multilayer stack and heater.

Figure 38B:
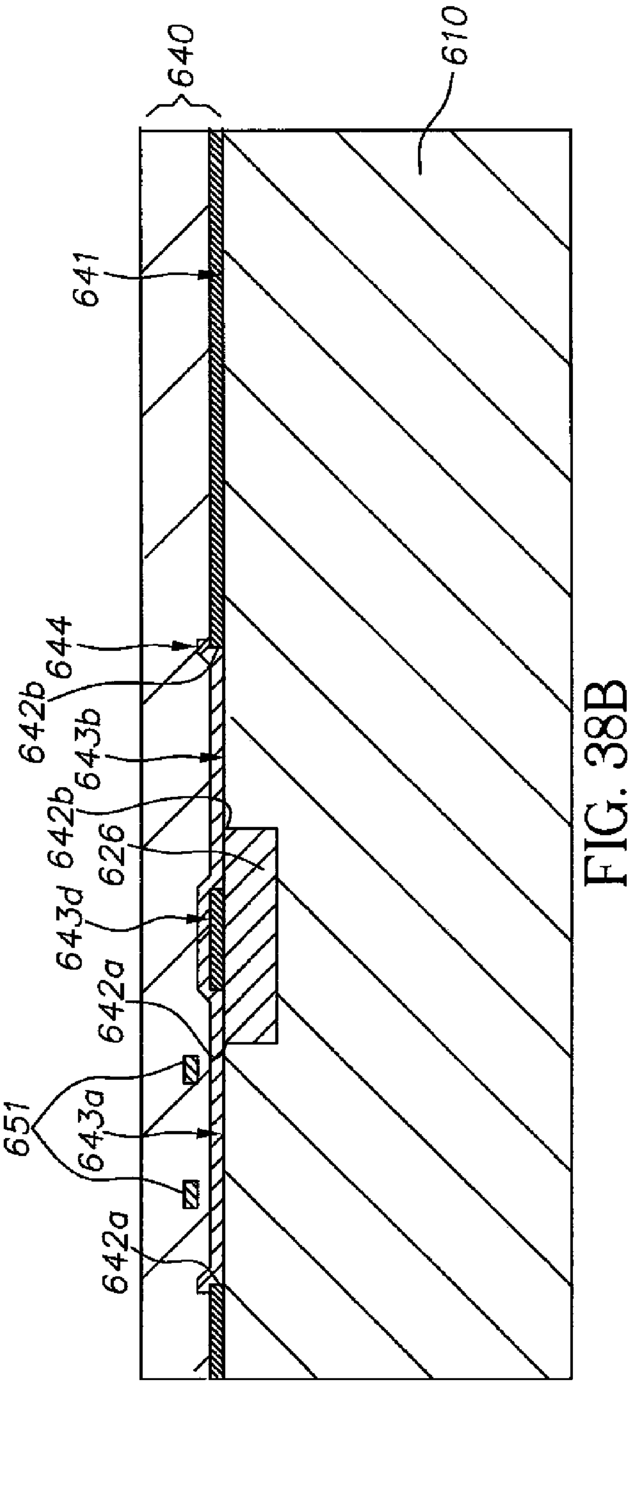

FIG. 38B shows a cross-sectional view as seen along direction 38B-38B.

Figure 39A:
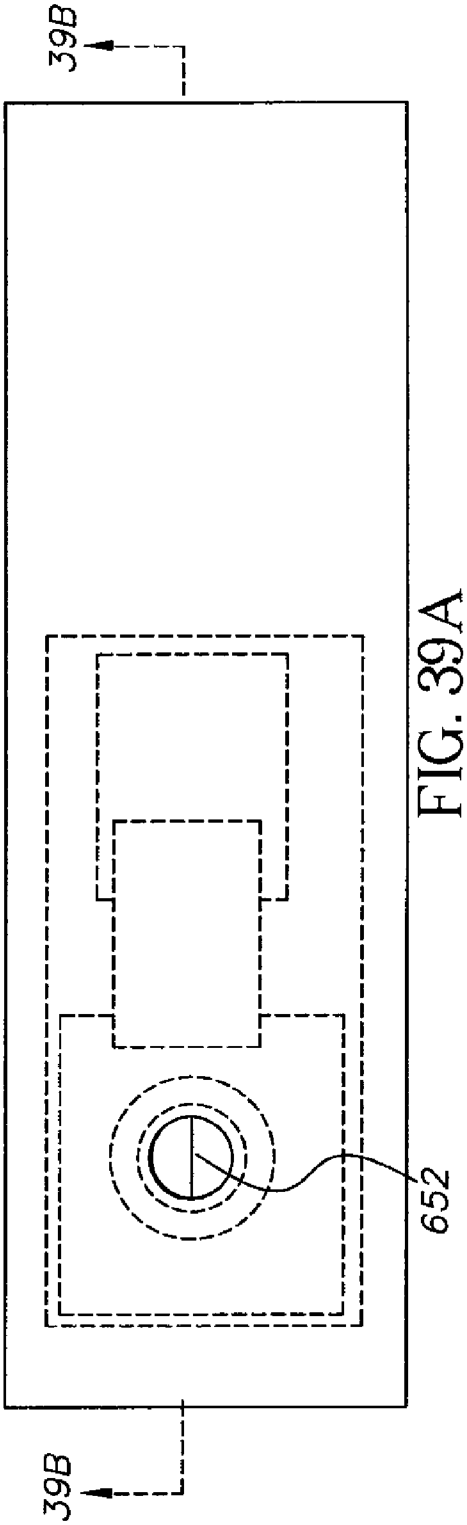

FIG. 39A shows a top view following a subsequent step of forming a nozzle.

Figure 39B:
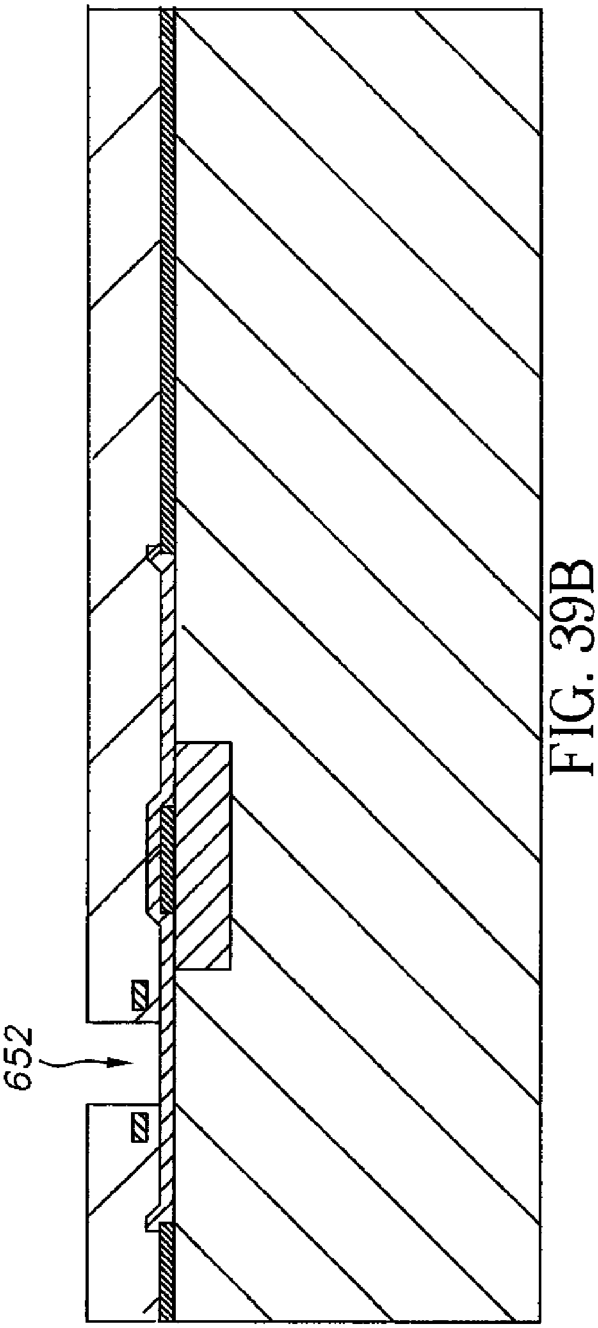

FIG. 39B shows a cross-sectional view as seen along direction 39B-39B.

Figure 40A:
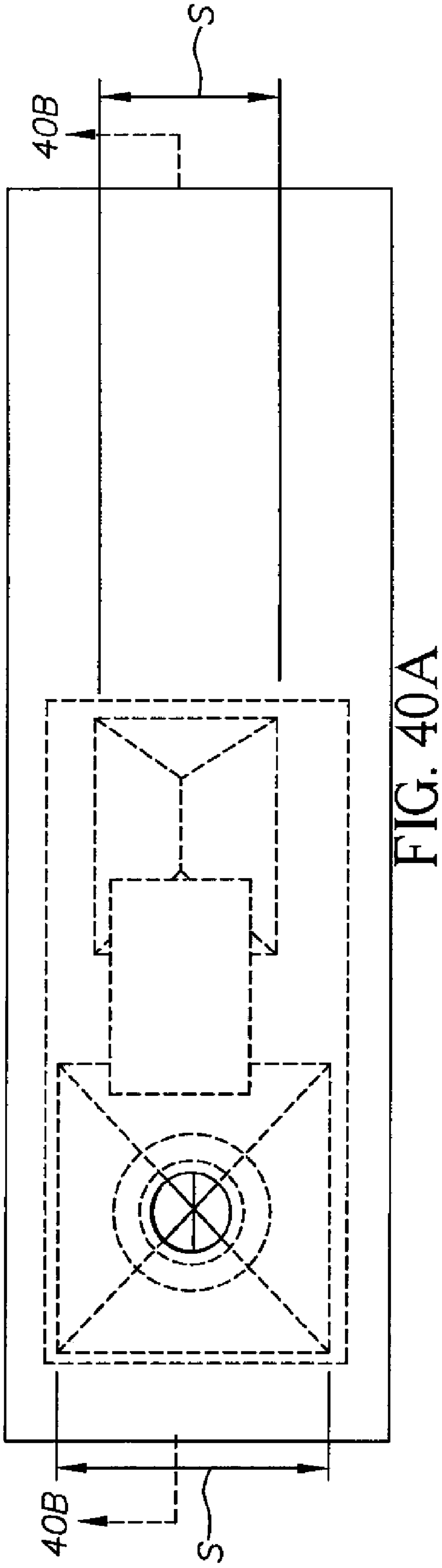

FIG. 40A shows a top view following a subsequent step of forming a fluid chamber and an impedance channel adjacent to the filled pit.

Figure 40B:
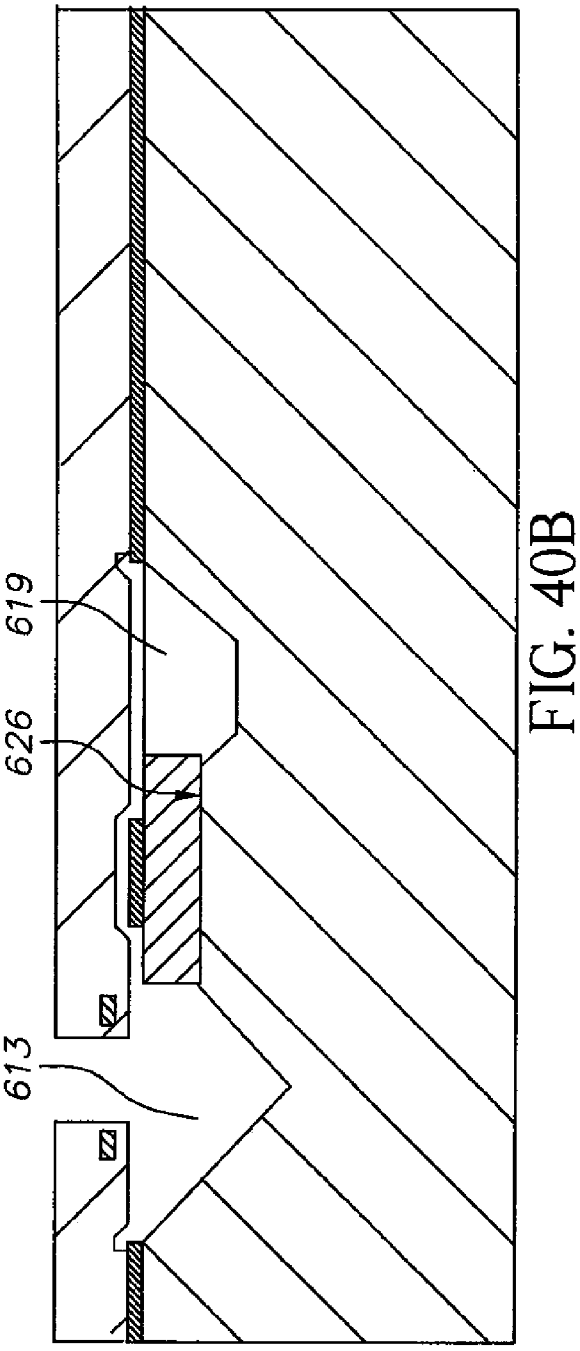

FIG. 40B shows a cross-sectional view as seen along direction 40B-40B.

Figure 41A:
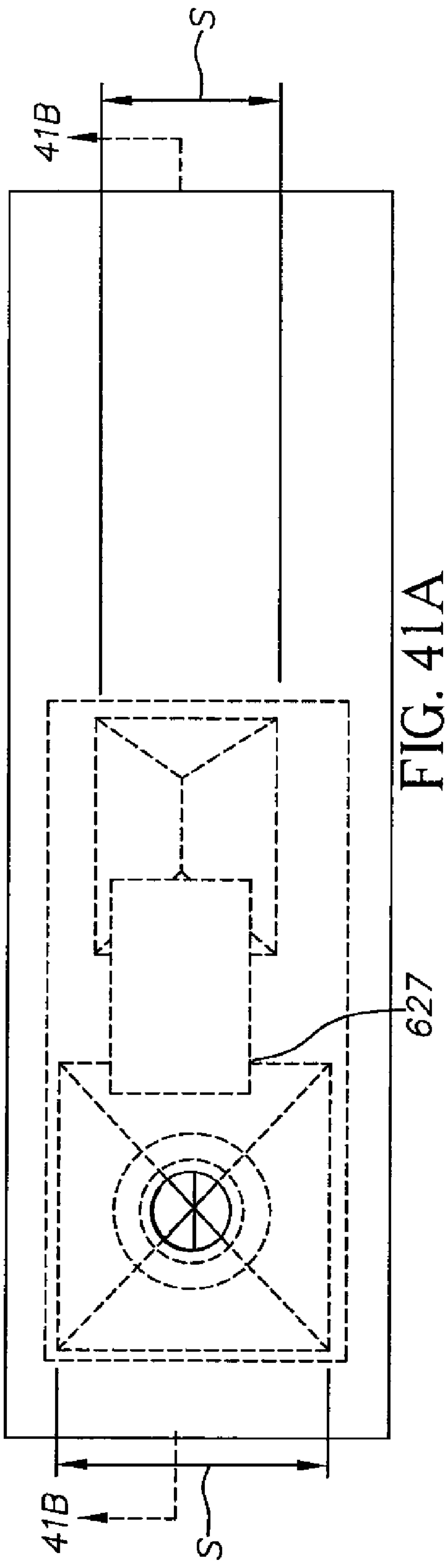

FIG. 41A shows a top view following a subsequent step of removing the sacrificial material from the pit.

Figure 41B:
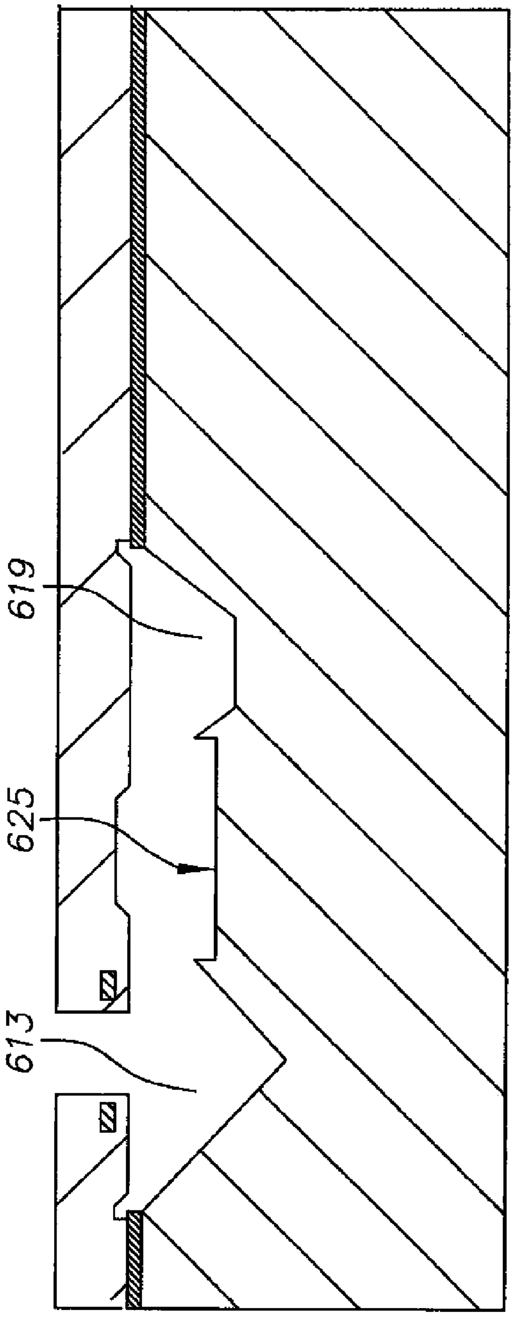

FIG. 41B shows a cross-sectional view as seen along direction 41B-41B.

Figure 42A:
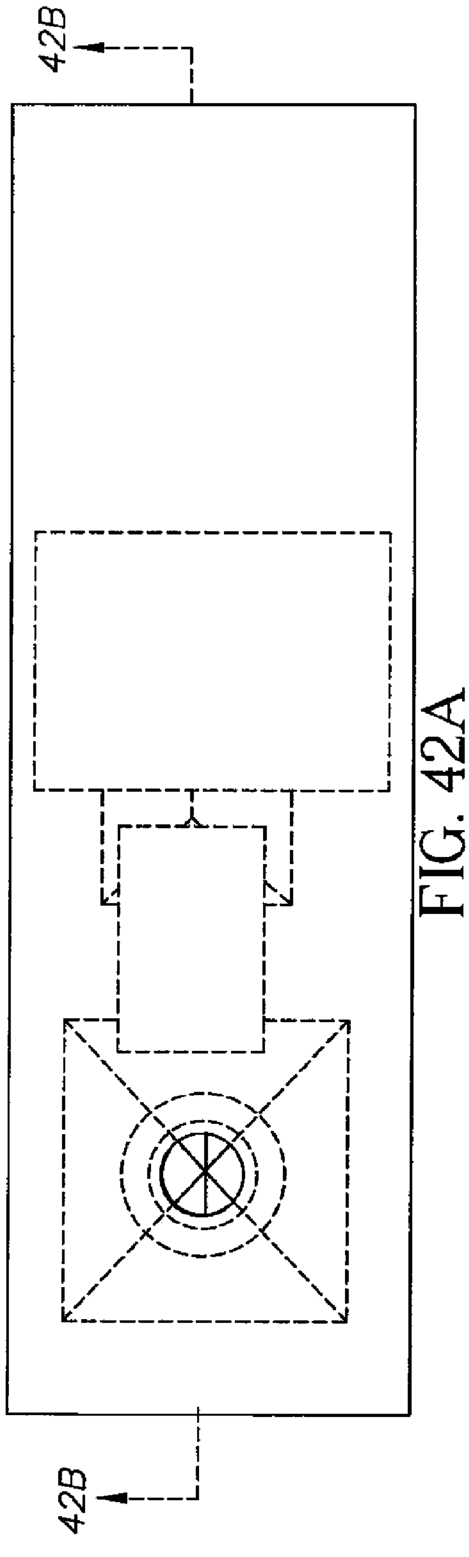

FIG. 42A shows a top view following a subsequent step of forming a fluid delivery channel.

Figure 42B:
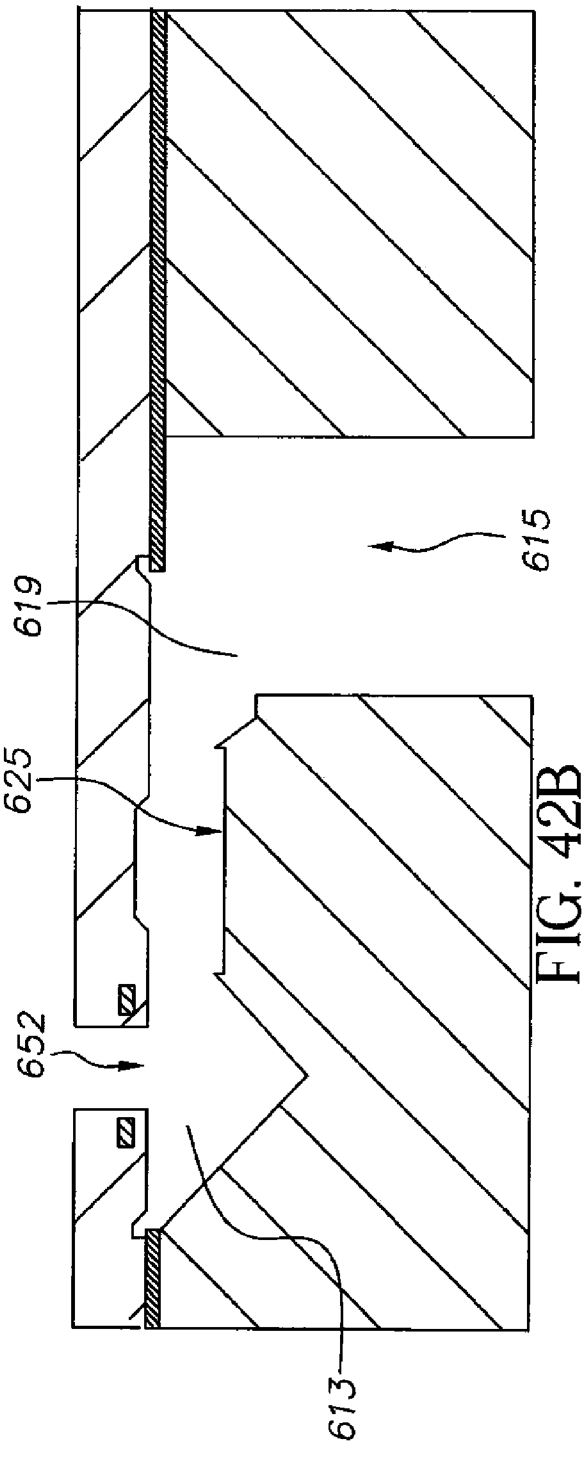

FIG. 42B shows a cross-sectional view as seen along direction 42B-42B.

Figure 43A:
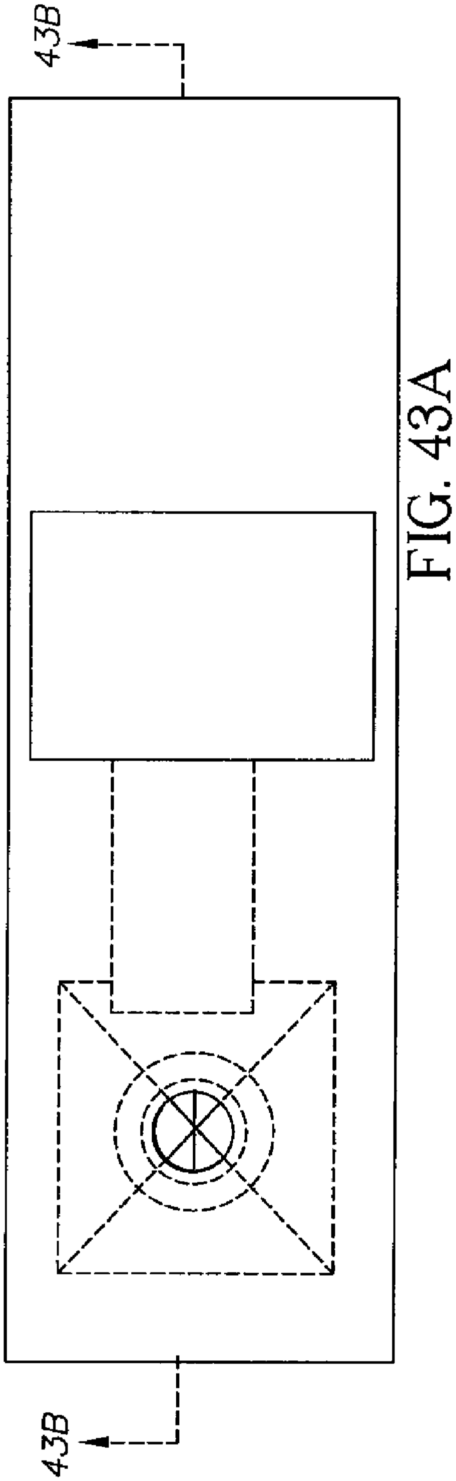

FIG. 43A shows a top view of a seventh embodiment in which the impedance channel has been formed by removing sacrificial material from a pit intersecting the fluid chamber.

Figure 43B:
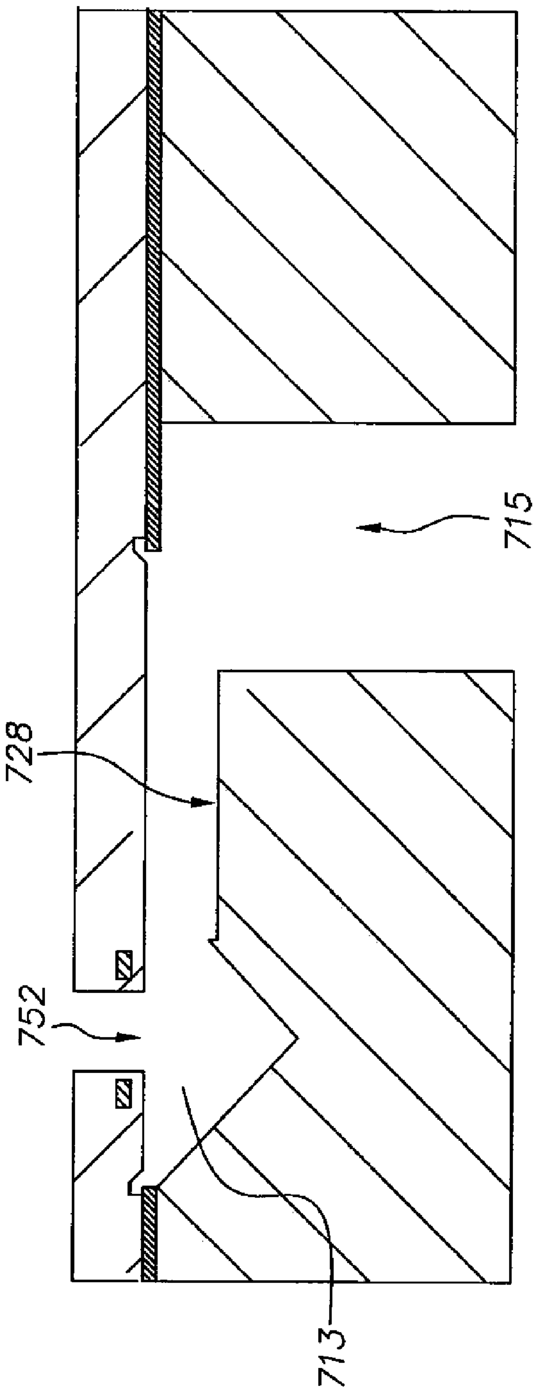

FIG. 43B shows a cross-sectional view as seen along direction 43B-43B.

Figure 44A:
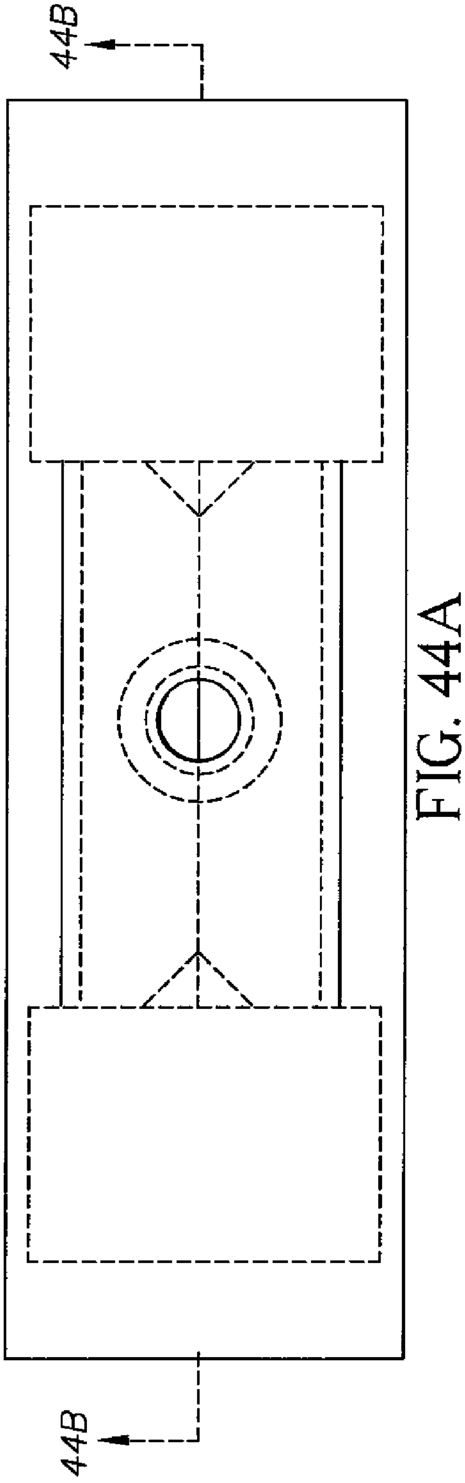

FIG. 44A shows a top view of an eighth embodiment having two fluid delivery channels and two regions of constriction arranged symmetrically about the nozzle.

Figure 44B:
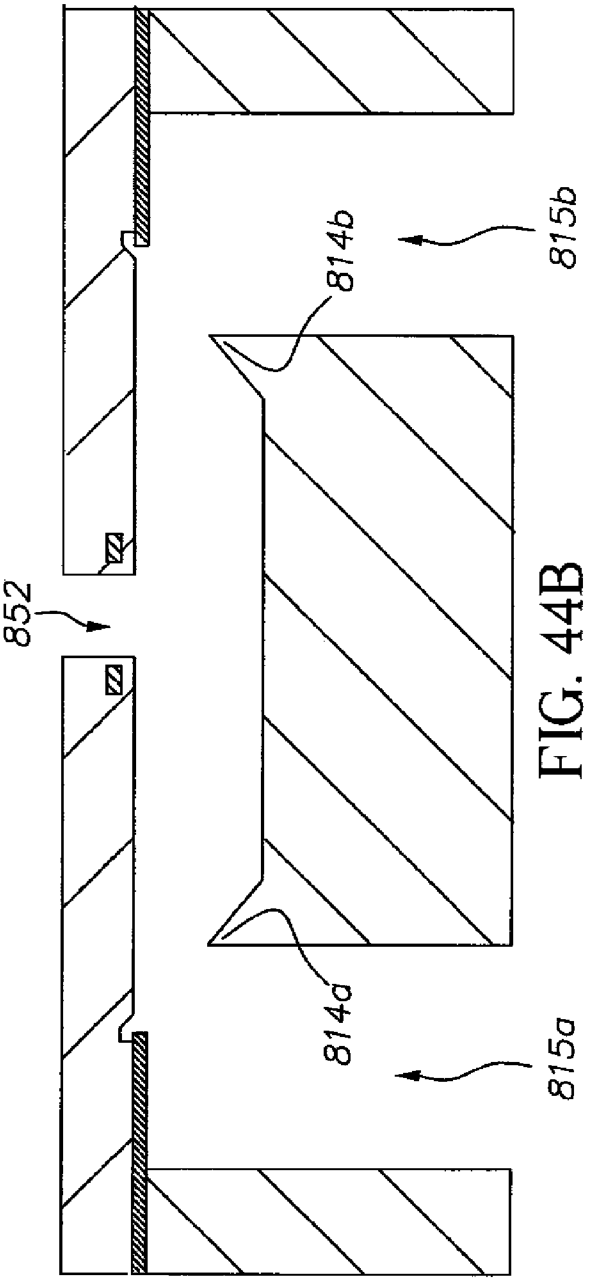

FIG. 44B shows a cross-sectional view as seen along direction 44B-44B.

Figure 45A:
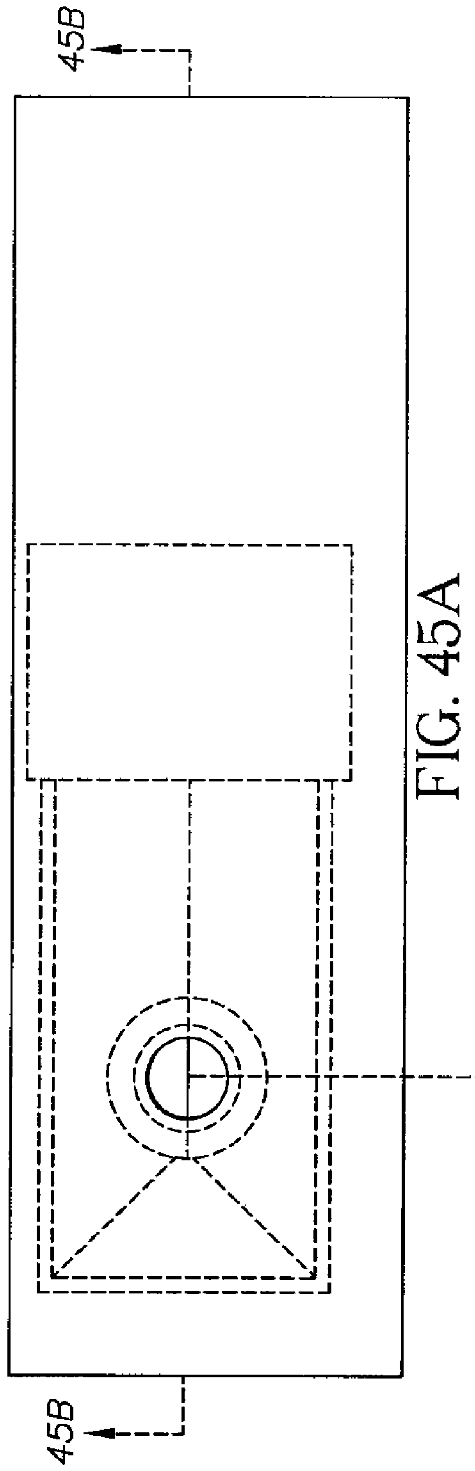

FIG. 45A shows a top view of an embodiment where the fluid chamber has an extended length.

Figure 45B:
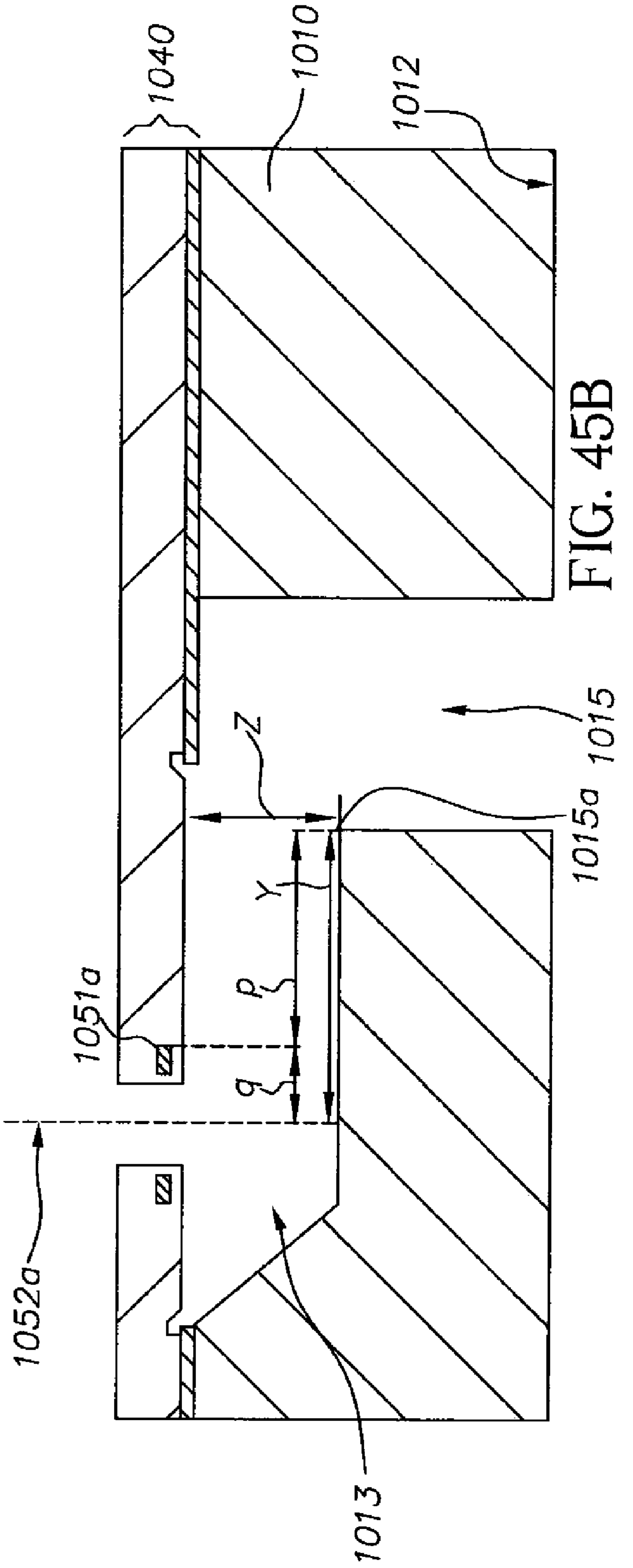

FIG. 45B shows a cross-sectional view as seen along direction 45B-45B.

Figure 46A:
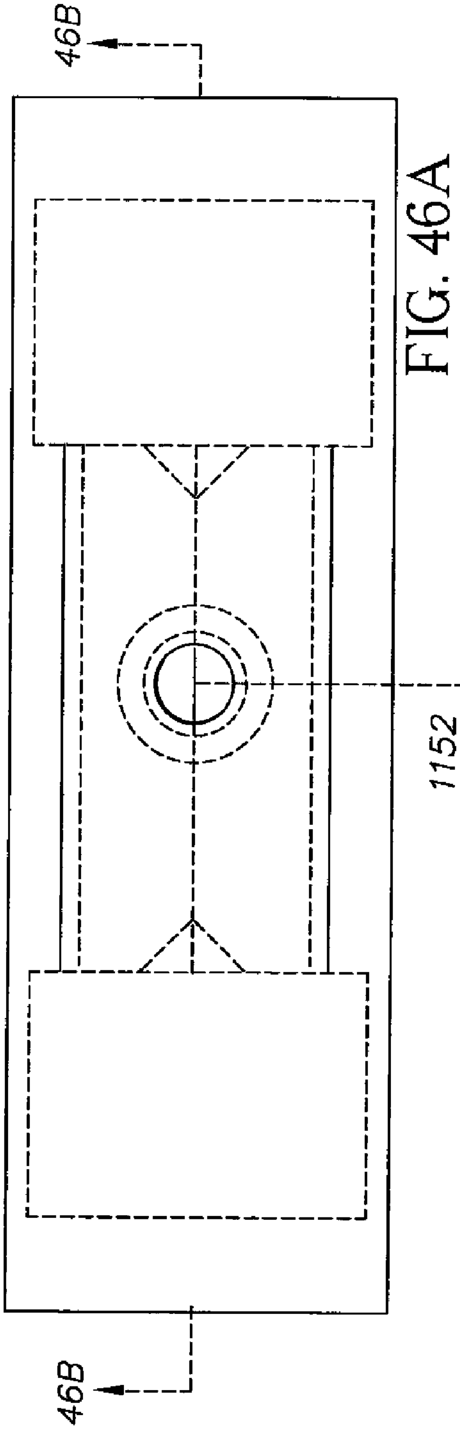

FIG. 46A shows a top view of an embodiment where the fluid chamber has an extended length in each of two directions from the nozzle.

Figure 46B:
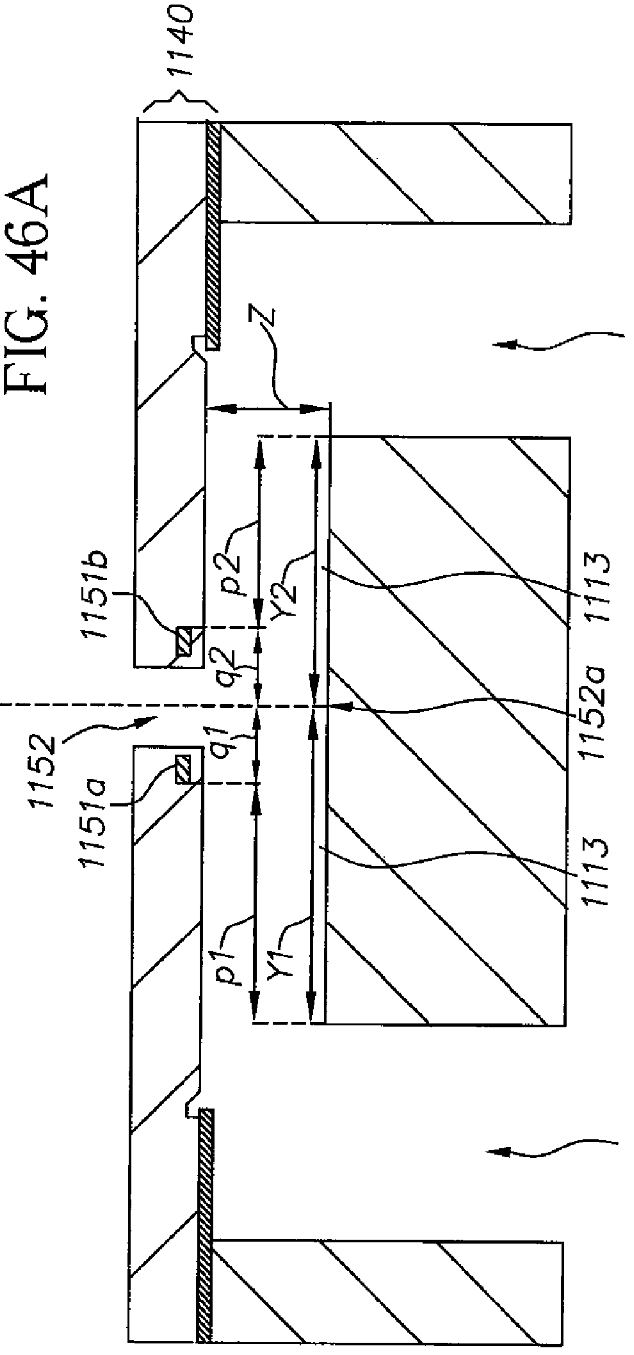

FIG. 46B shows a cross-sectional view as seen along direction 46B-46B.

Figure 47:
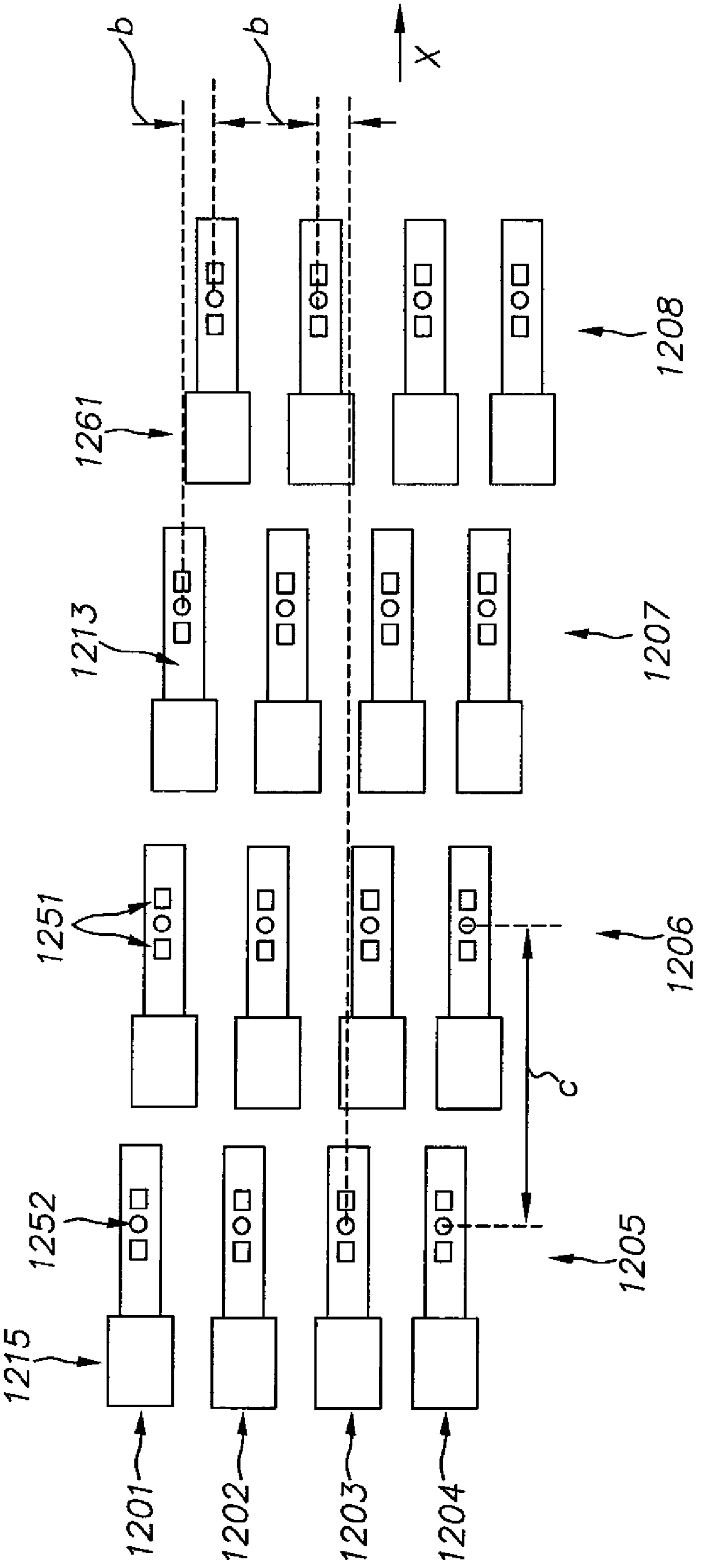

FIG. 47 shows a top view of a two dimensional array of fluid ejectors, each one of which has a corresponding fluid delivery channel.

Figure 48:
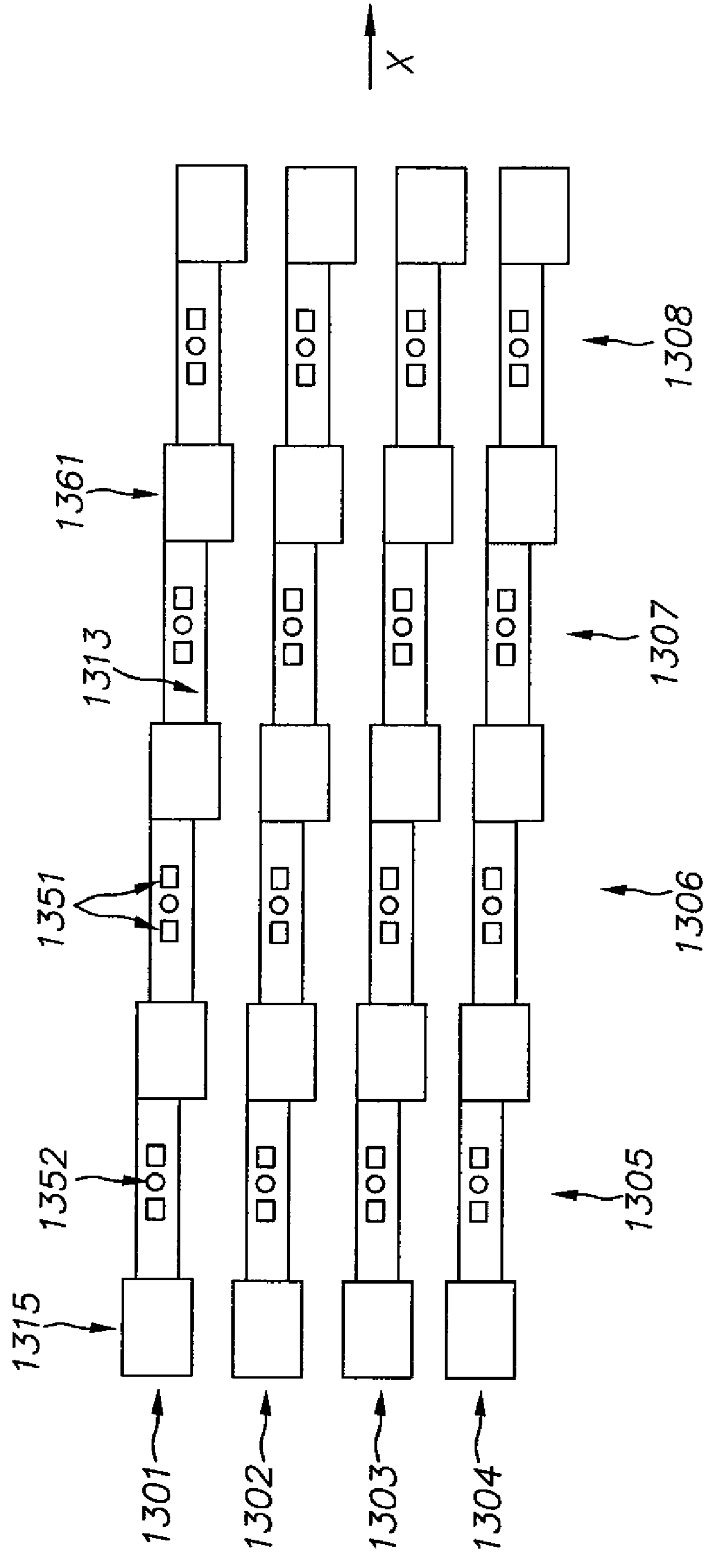

FIG. 48 shows a top view of a two dimensional array of fluid ejectors, each one of which has a fluid delivery channel at each end.

DETAILED DESCRIPTION OF THE INVENTION

The present description will be directed, in particular, to elements forming part of, or cooperating directly with, apparatus or processes of the present invention. It is to be understood that elements not specifically shown or described may take various forms well known to those skilled in the art.

As described herein, the present invention provides a fluid ejection device and a method of operating the same. The most familiar of such devices are used as print heads in inkjet printing systems. The fluid ejection device described herein can be operated in a drop-on-demand mode.

Many other applications are emerging which make use of devices similar to inkjet print heads, but which emit fluids (other than inks) that need to be finely metered and deposited with high spatial precision. As such, as described herein, the term fluid refers to any material that can be ejected by the fluid ejection device described below.

Figure 1:
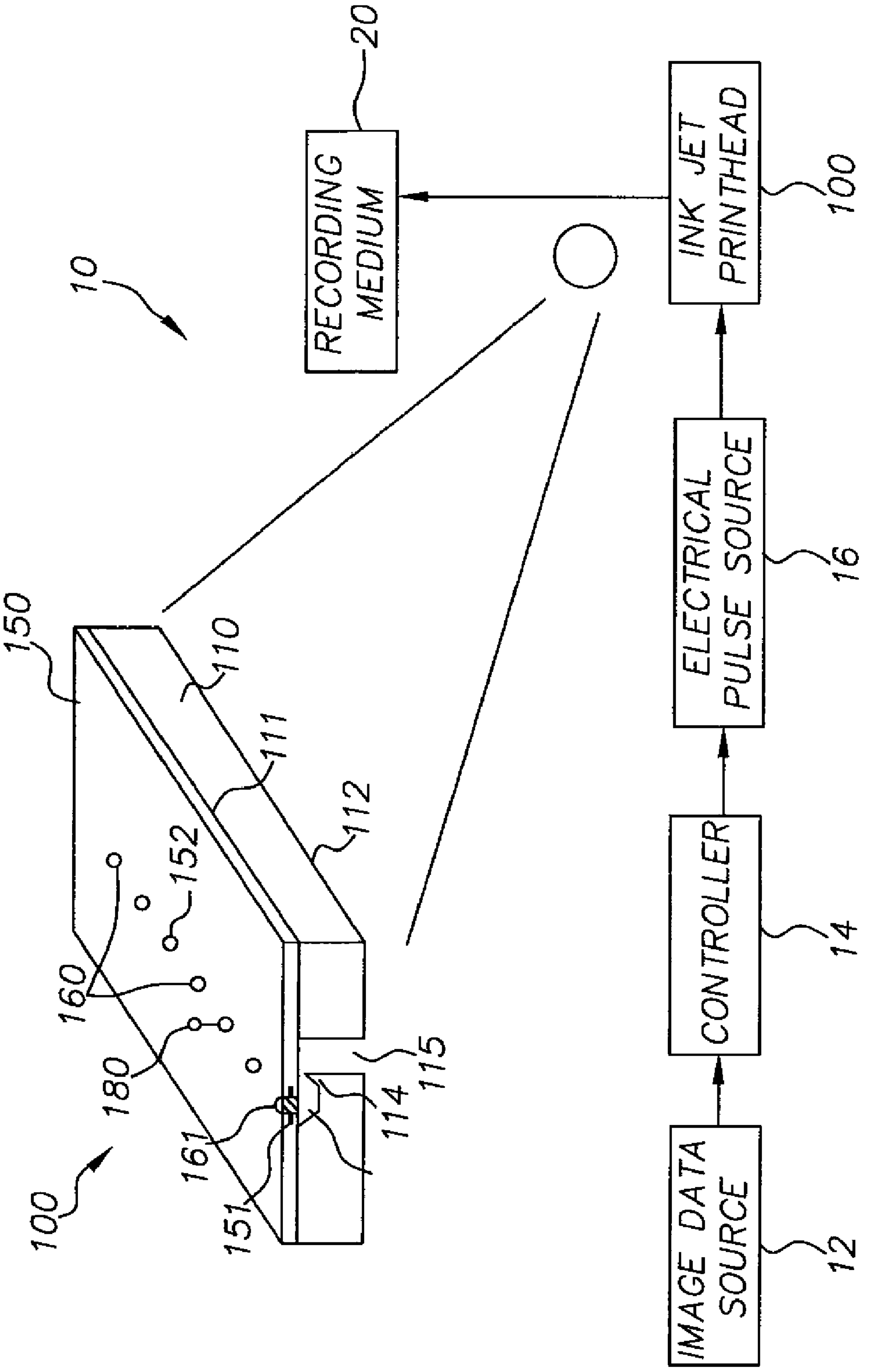
FIG. 1 is a schematic illustration of a backshooting fluid ejecting device according to the present invention.
Figure 2:
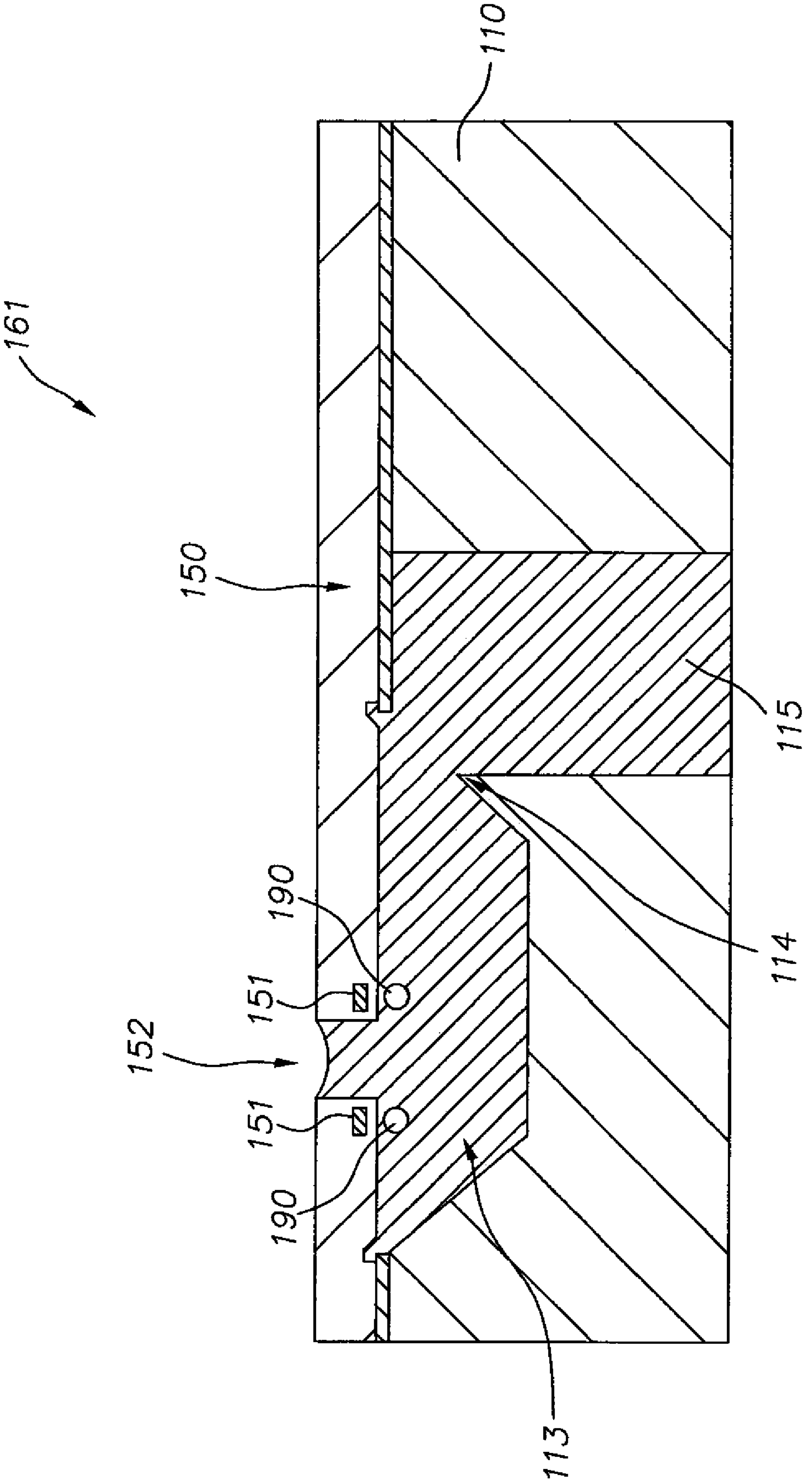
FIGS. 2-5 illustrate operation of the fluid ejection device configured as a drop on demand print head.
Figure 3:
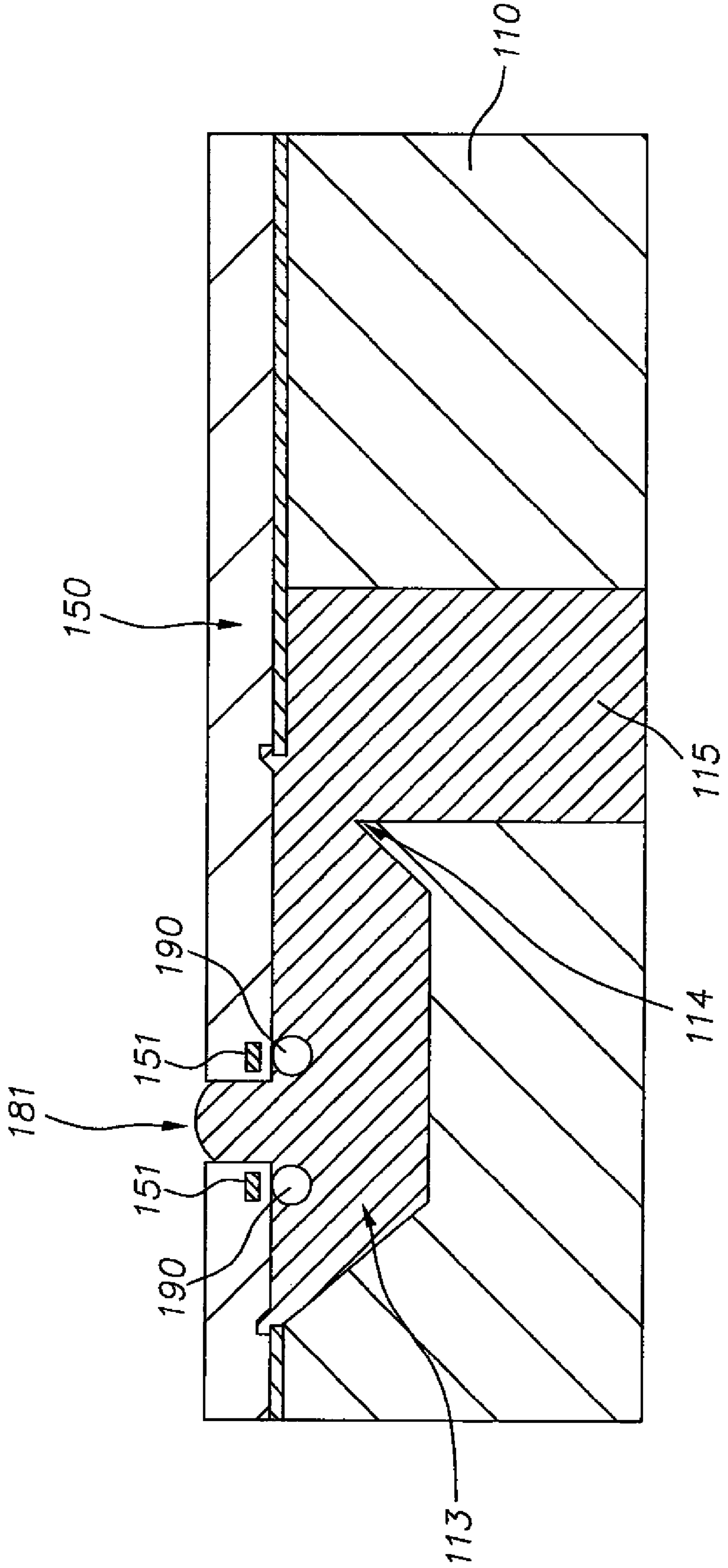
Figure 4:
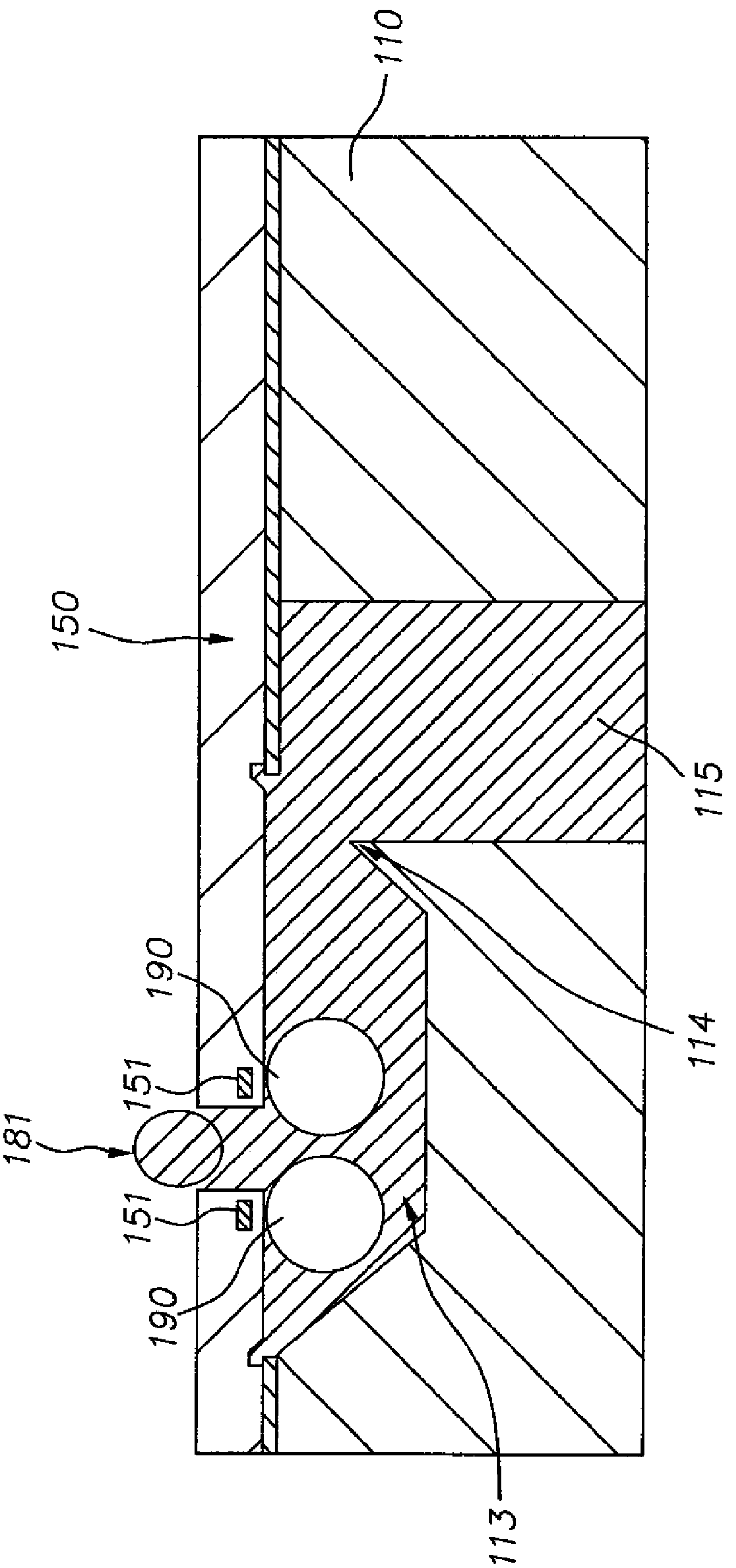
Figure 5:
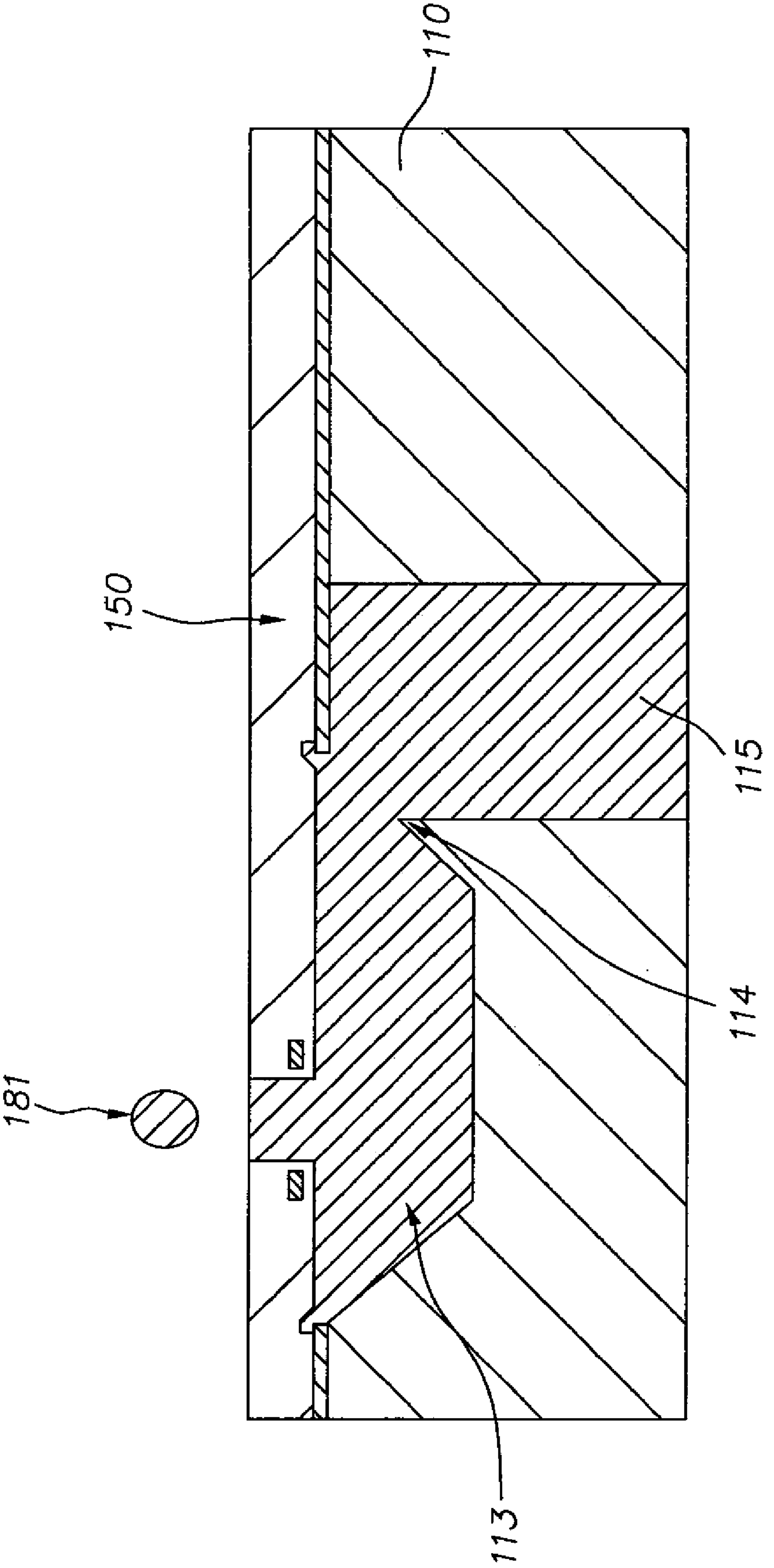

Referring to FIG. 1, a schematic representation of a fluid ejection system 10, such as an inkjet printer, is shown. The system includes a source 12 of data (say, image data) which provides signals that are interpreted by a controller 14 as being commands to eject drops. Controller 14 outputs signals to a source 16 of electrical energy pulses which are inputted to the fluid ejection subsystem 100, for example, an inkjet print head. During operation, fluid, for example, ink, is deposited on a recording medium 20. Typically, fluid ejection subsystem 100 includes a plurality of fluid ejectors 160, arranged in at least one substantially linear row. One example 161 of a fluid ejector is shown in cross-section.

The backshooting bubblejet fluid ejection subsystem 100 according to this invention is comprised of a) a silicon substrate 110 having a first surface 111 and a second surface 112 which is opposite the first surface; b) a fluid delivery channel 115 etched through the silicon substrate 110 from the second surface 112 and substantially perpendicular to it; c) a nozzle plate 150 formed over the first surface 111 of the silicon substrate, the nozzle plate having nozzles 152 formed there through; d) a heater element 151 formed at the periphery of the nozzle 152; a fluid chamber 113 located directly below the nozzle 152 and in fluid communication with both the nozzle 152 and the fluid delivery channel 115, said fluid chamber formed by anisotropic etching of the first surface 111 of the silicon substrate; and a source of fluid impedance, one example of which is region of constriction shown as 114, located within the fluid path between the fluid delivery channel and the fluid chamber.

Referring to FIGS. 2-5 and back to FIG. 1, operation of fluid ejection subsystem 100 in a backshooting drop on demand mode will be described. Controller 14 outputs a signal to source 16 that causes source 16 to deliver an actuation pulse to heater 151. The actuation of heater 151 causes a portion of the fluid (for example, ink), typically maintained under a slight negative pressure in fluid chamber 113, to vaporize forming vapor bubble(s) 190. Vapor bubble(s) 190 expands, forcing fluid in fluid chamber 113 to begin to protrude as a slug of fluid 181 through nozzle 152, and eventually to be ejected through nozzle 152 in the form of a drop 180. The direction of vapor bubble(s) 190 expansion is opposite to the direction of drop 180 ejection. Depending on details of the design of the heater 151 and the fluid chamber 113, the different regions of the vapor bubble 190 from opposite sides of the nozzle 152 may merge as the drop 180 is ejected. In some applications this is advantageous, in that unwanted satellite droplets are prevented from forming. Vapor bubble (s) 190 collapse after heater 151 is de-energized. This allows delivery channel 115 to refill ejection chamber 113. The process is repeated when an additional fluid drop(s) is desired. Constriction 114 between the fluid chamber 113 and the ink delivery channel 115 serves to impede backward flow of ink during and after vapor bubble expansion. This backward flow of ink can otherwise cause a pressure wave which disrupts the operation of adjacent fluid ejectors to be fired shortly thereafter. Such transient disruption of the operation of nearby channels is called fluidic crosstalk. Restricting the backward flow of ink also helps to improve the energy efficiency of the fluid ejector.

For fluid ejection applications, such as ink jet printing, where it is desired to eject drops from a given nozzle at a relatively rapid rate, on the order of 20 kHz or more, it is necessary to achieve fast refill of the fluid chamber such that the ink achieves a relatively stable state within about 50 microseconds, so that stable drop generation can occur. It can be appreciated that the geometries of various elements of the fluid ejector 161 (including the dimensions and shape of the nozzle 152, the heater 151, the fluid chamber 113, the constriction 114, and the ink delivery channel 115) have a significant effect on the performance of the fluid ejection device (including drop size, drop size uniformity, drop velocity, maximum jetting frequency, and drop placement accuracy). The primary emphasis of this invention is fluid chamber 113 and source of fluid impedance 114, and improved methods of fabrication for them.

The various embodiments described below are described in terms of following the basic approach of using CMOS processing to provide nozzles, as well as heater elements and associated driving and logic circuitry, and using MEMS processing to form the fluid passageways. Such an approach is described in more detail, for example, in U.S. Pat. No. 6,450,619 in the context of a continuous ink jet printhead.

Figure 6A:
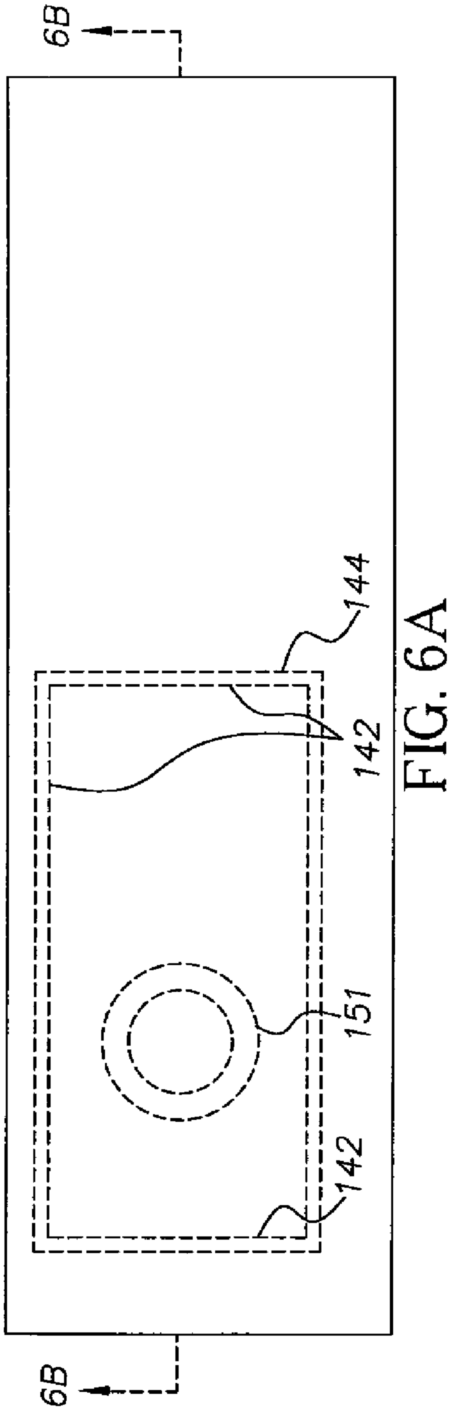
FIG. 6A shows a top view of a substrate, heater, and multilayer stack in a first embodiment.
Figure 6B:
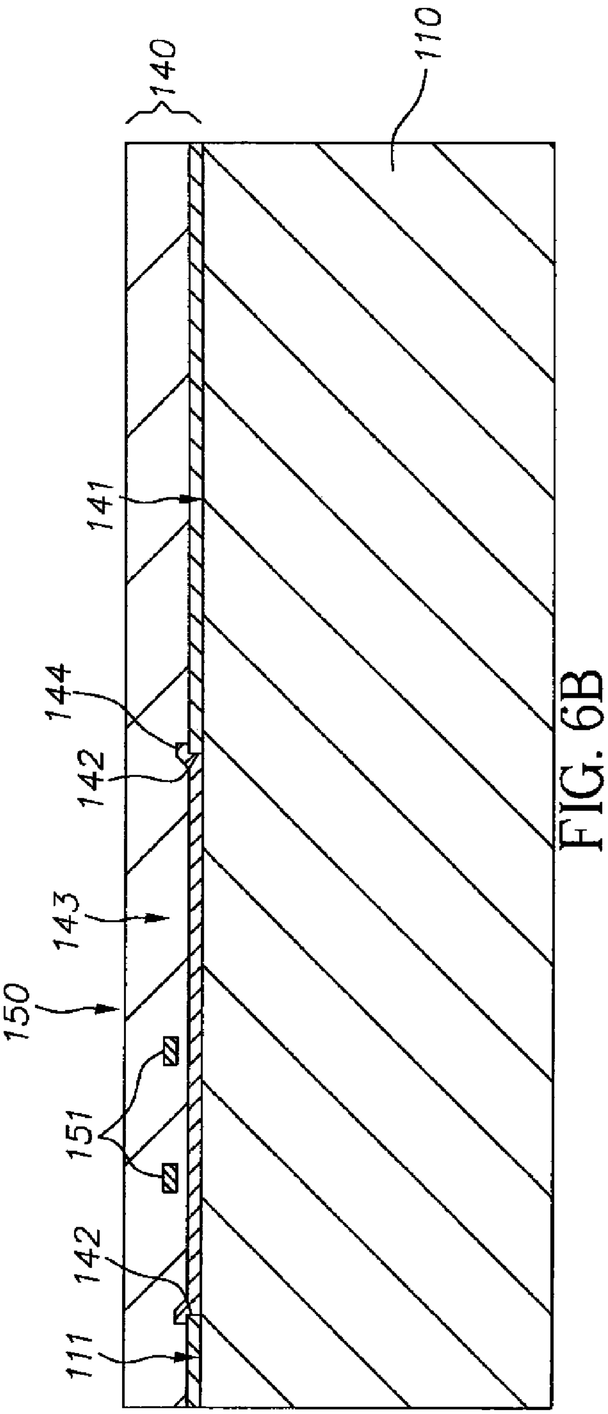
FIG. 6B shows a cross-sectional view as seen along the direction 6B-6B.

FIGS. 6-10 illustrate a series of process steps for forming one embodiment of the fluid passageways of this invention. Each of the figures shows a top view in the region of a single fluid ejector, as well as a cross-sectional view. It may be appreciated that all fluid ejectors for the device are formed simultaneously. In fact, in wafer processing, typically hundreds of fluid ejecting integrated circuit devices are formed simultaneously, and are later separated to be packaged into individual printheads, for example. In FIG. 6, on first surface 111 of monocrystalline silicon substrate 110 is a multilayer stack 140 in which are formed the heater elements 151 and their associated electrodes (not shown). Optionally, within this stack, there are also formed driver and logic circuitry associated with the heaters. In some cases, said drivers and logic circuitry are fabricated using CMOS processes and this multilayer stack 140 is then frequently referred to as the CMOS stack. The multilayer stack 140 in the vicinity of the nozzles also serves as a nozzle plate 150. Containing several levels of metals, oxide and/or nitride insulating layers, and at least one resistive layer, multilayer stack 140 is typically on the order of 5 microns thick. The lowest layer of the multilayer stack 140, formed directly on silicon surface 111 is an oxide or nitride layer 141. Hereinafter layer 141 will be referred to as an oxide layer. Layer 141 has the property that it may be differentially etched with respect to the silicon substrate in the etch step that will form the fluid chamber. As part of the processing steps for the multilayer stack 140, a region 142 of oxide is removed, corresponding to the subsequent location of the fluid chamber. Layer 143 is a sacrificial layer which is deposited over the oxide layer 141, and then which is patterned so that the remaining sacrificial layer material 143 is slightly larger than the window 142 in the oxide layer 141. In other words, there is a small region of overlap 144, on the order of 1 micron, where the sacrificial layer 143 is on top of oxide layer 141. Sacrificial layer may be one of a variety of materials. A particular material of interest is polycrystalline silicon, or polysilicon. The patterned sacrificial layer 143 remains in place during the remainder of the processing of multilayer stack 140, but is removed later during the formation of the fluid chamber.

Also shown within the multilayer stack 140 is a heater 151 which is shown generically as a ring encircling the eventual location of the nozzle. Connections to the heater are not shown. It will be obvious to one skilled in the art that it is not required that the heater have circular or near-circular symmetry. The heater may be formed of one or more segments which are adjacent to the nozzle. In fact, although for simplicity the drop forming mechanism has been described in terms of a heater which forms bubbles to provide the drop ejection force, it is also possible to incorporate other forms of drop forming mechanisms at the periphery of the nozzle, including microactuators or piezoelectric transducers. Regardless of the shape of the heater or other drop forming mechanism, it has an extent Q which is the distance between the points of the drop forming mechanism which are furthest apart from each other.

Figure 7A:
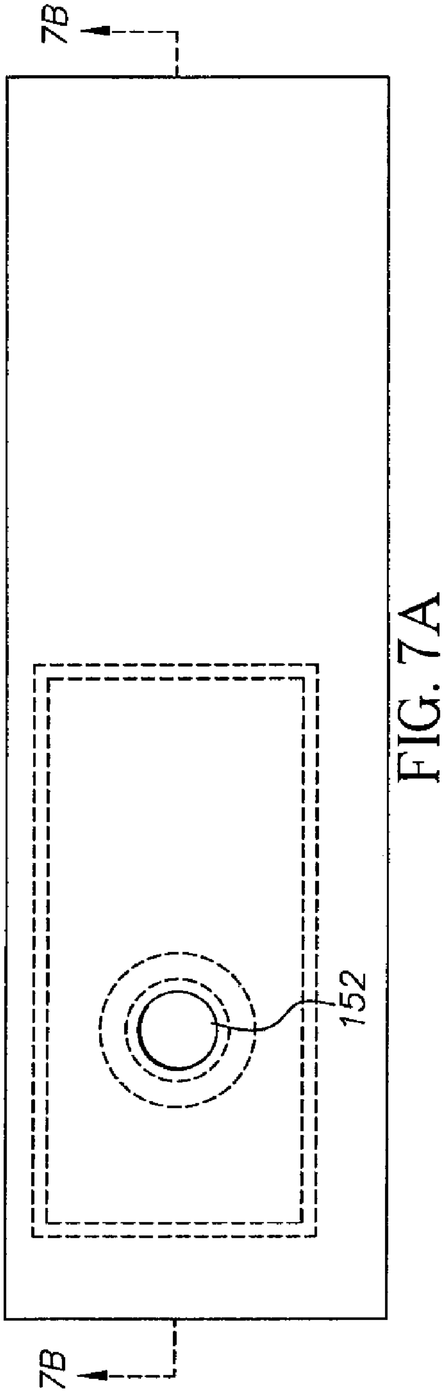
FIG. 7A shows a top view following a subsequent step of forming a nozzle.
Figure 7B:
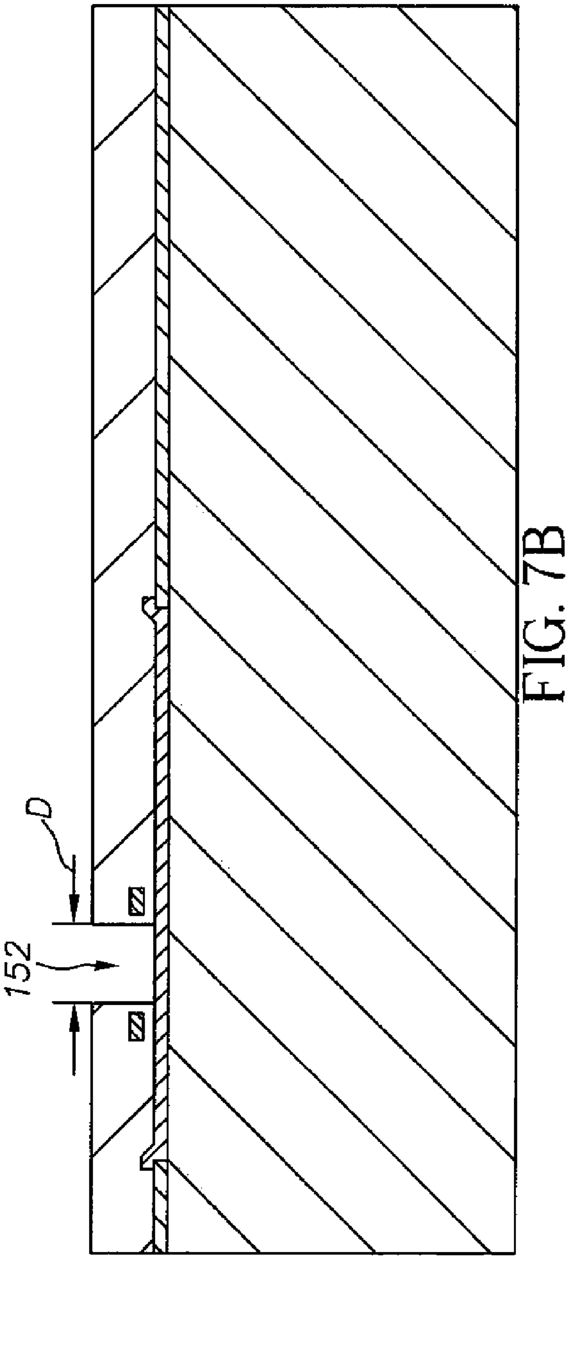
FIG. 7B shows a cross-sectional view as seen along the direction 7B-7B.

FIG. 7 shows the step in which the nozzle 152 is etched through the multilayer stack 140. The nozzle 152 is shown as circular and having a diameter D. In fact, a circular shape is generally preferred, but other shapes are also possible, such as elliptical, polygonal, etc.

Figure 8A:
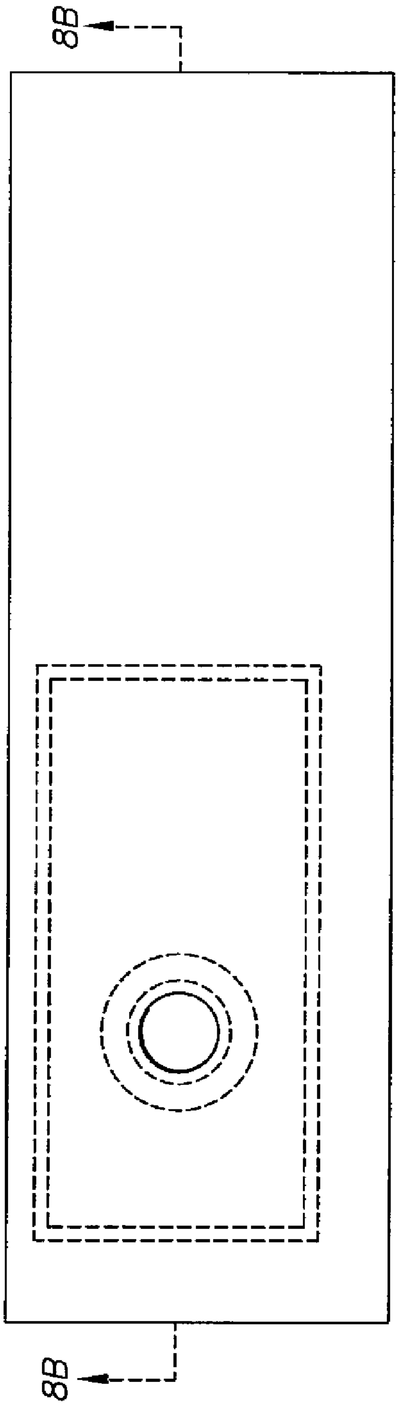
FIG. 8A shows a top view following a subsequent step of etching a sacrificial layer.
Figure 8B:
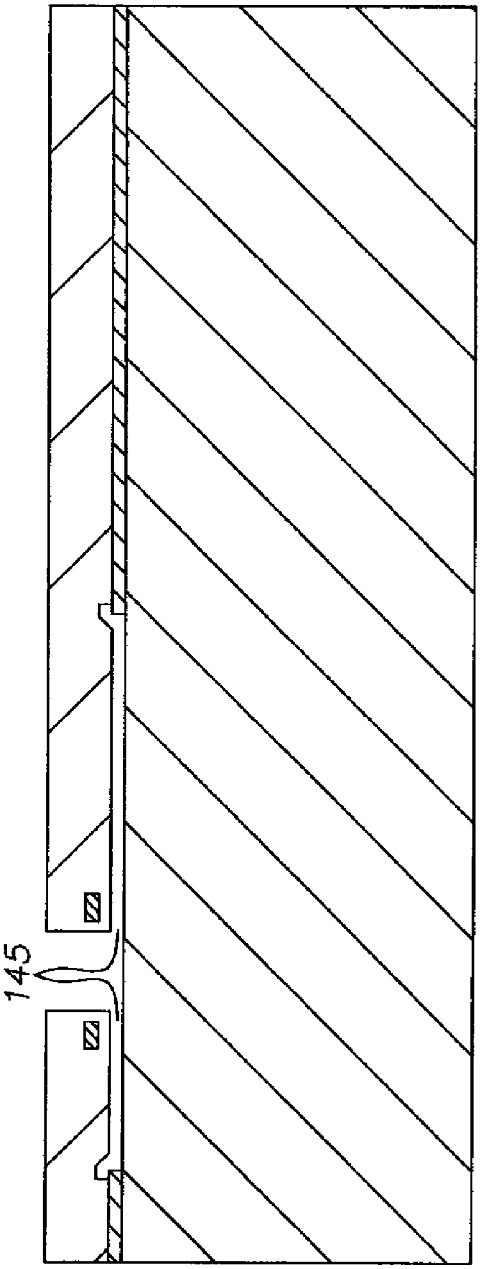
FIG. 8B shows a cross-sectional view as seen along the direction 8B-8B.
Figure 9A:
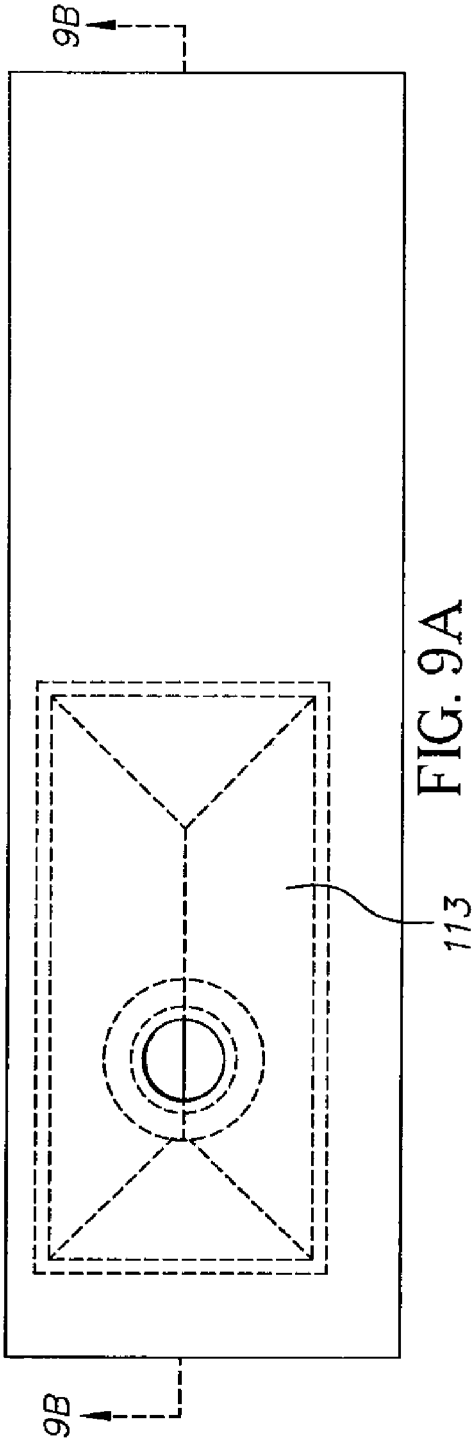
FIG. 9A shows a top view following a subsequent step of forming a fluid chamber.
Figure 9B:
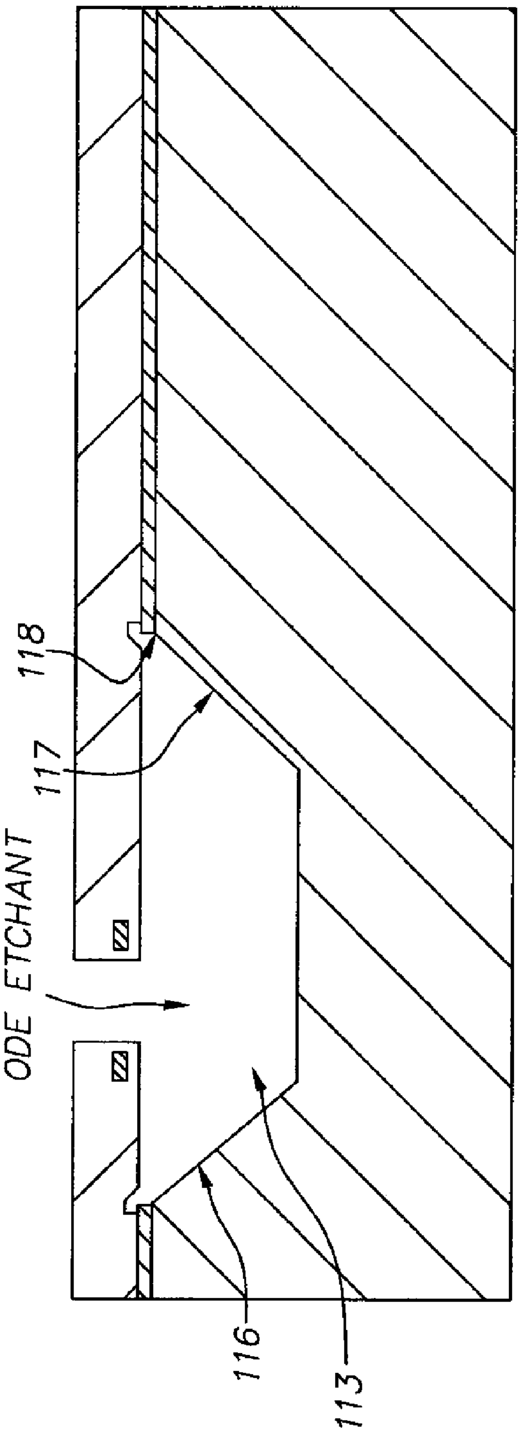
FIG. 9B shows a cross-sectional view as seen along the direction 9B-9B.

FIGS. 8 and 9 illustrate the steps for fabricating the fluid chamber. FIG. 8 shows the etching of the sacrificial layer 143, leaving a cavity 145. FIG. 9 shows the orientation dependent etching of the fluid chamber 113. FIGS. 8 and 9 show the etching of the sacrificial layer 143 and the etching of the chamber 113 occurring as separate steps. For the case of using polysilicon as the sacrificial layer, these two process steps occur at the same time, the etching occurring according to fronts having a width determined by the progressive removal of the polysilicon sacrificial layer, as shown in U.S. Pat. No. 6,376,291 assigned to ST Microelectronics.

Orientation dependent etching (ODE) is a wet etching step which attacks different crystalline planes at different rates. As such, orientation dependent etching is one type of anisotropic etching. As is well known in the art of orientation dependent etching, etchants such as potassium hydroxide, or TMAH (tetramethylammonium hydroxide), or EDP etch the (111) planes of silicon much slower (on the order of 100 times slower) than they etch other planes. A well-known case of interest is the etching of a monocrystalline silicon wafer having (100) orientation. There are four different orientations of (111) planes which intersect a given (100) plane. The intersection of a (111) plane and a (100) plane is a line in a [110] direction. There are two different [110] directions contained within a (100) plane, and they are perpendicular to one another. Thus, if a monocrystalline silicon substrate having (100) orientation is covered with a layer, such as oxide or nitride which is resistant to etching by KOH or TMAH, but is patterned to expose a rectangle of bare silicon, where the sides of the rectangles are parallel to [110] directions, and the substrate is exposed to an etchant such as KOH or TMAH, then a pit will be etched in the exposed silicon rectangle. If the etch is allowed to proceed to completion, then the pit will have four sloping walls, each wall being a different (111) plane. If the length and width of the rectangle of exposed silicon were L and W respectively, and if L=W, then the four (111) planes would meet at a point, and the pit would be pyramid shaped. The (111) planes are at a 54.7 degree angle with respect to the (100) surface. The depth H of the pit is half the square root of 2 times the width, that is, H=0.707 W. If L>W, then the maximum depth H is still 0.707 W and the shape of the pit is a V groove with sloped side walls and sloped end walls. The length of the region of maximum depth of the pit is L−W. Of course, if the thickness of the substrate is less than 0.707 W, and if the etch is allowed to proceed to completion, then a hole will be etched through the substrate. In the description of the present invention, etch pit geometries are used wherein the local thickness of the substrate is greater than 0.707 W.

As shown in FIG. 9, chamber 113 has a sloping end wall 116 located in the vicinity of the nozzle 152, and another sloping end wall 117, located at the opposite end of the chamber and having opposite slope. End wall 117 terminates at the surface of the silicon at one edge 118 of the pit.

Figure 10A:
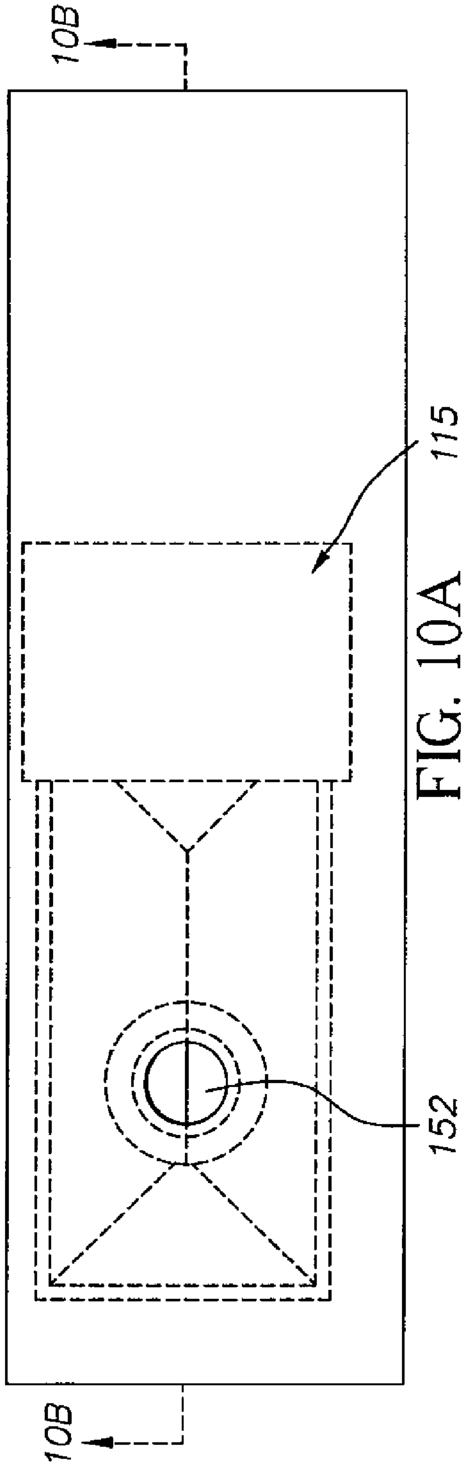
FIG. 10A shows a top view following a subsequent step of forming a fluid delivery channel.
Figure 10B:
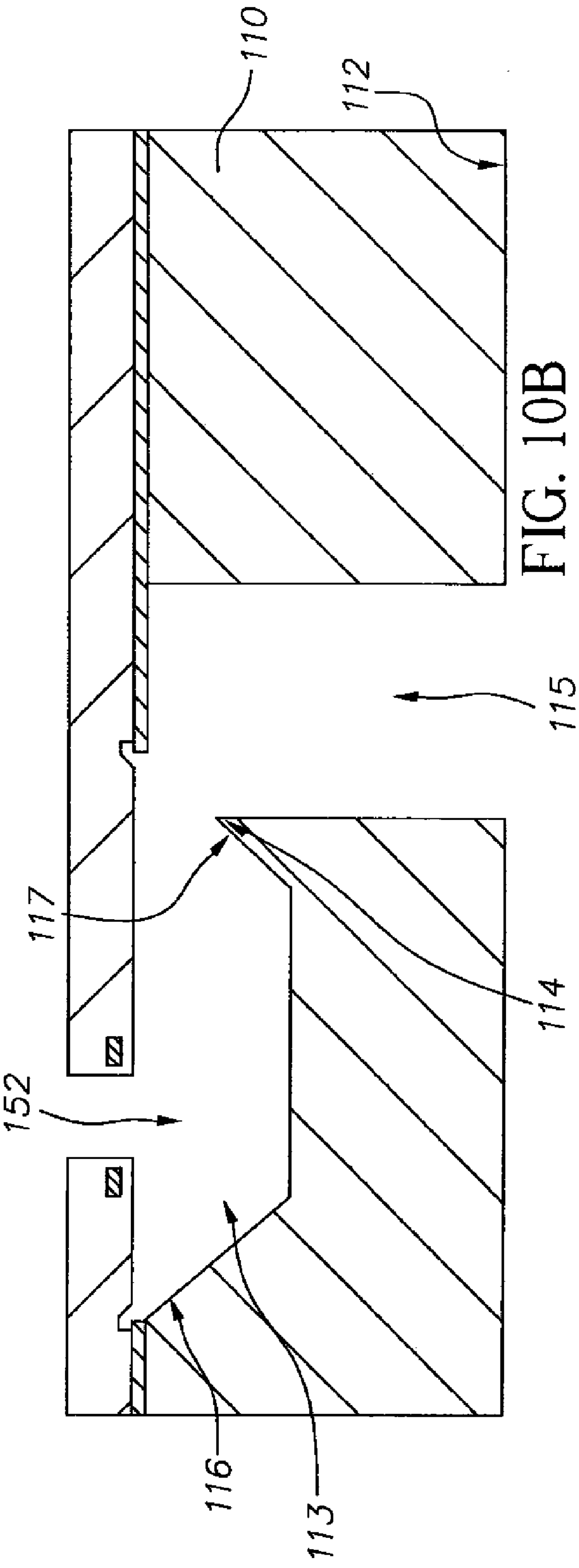
FIG. 10B shows a cross-sectional view as seen along the direction 10B-10B.
Figure 11C:
FIG. 11C shows an end view of the chamber opening as from point B for an alternative configuration of intersection between fluid chamber and fluid delivery channel.
Figure 11B:
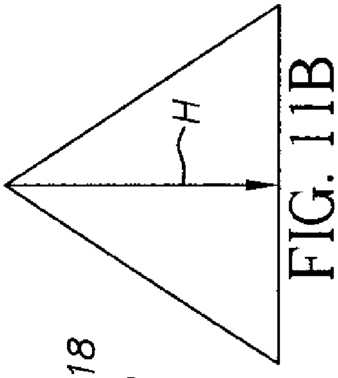
FIG. 11B shows an end view of the chamber opening as from point B for one configuration of intersection between fluid chamber and fluid delivery channel.
Figure 11A:
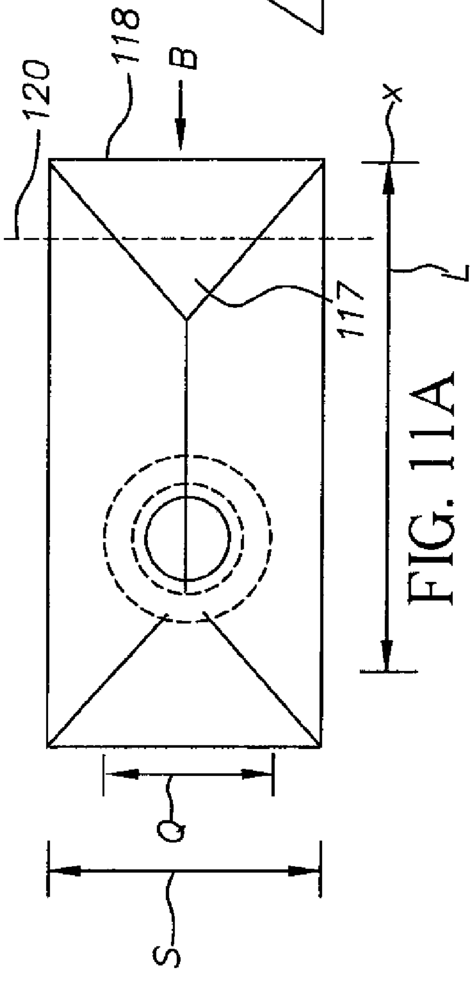
FIG. 11A shows a top view of a heater, nozzle, fluid chamber, and line of intersection between fluid chamber and fluid delivery channel.
Figure 11D:
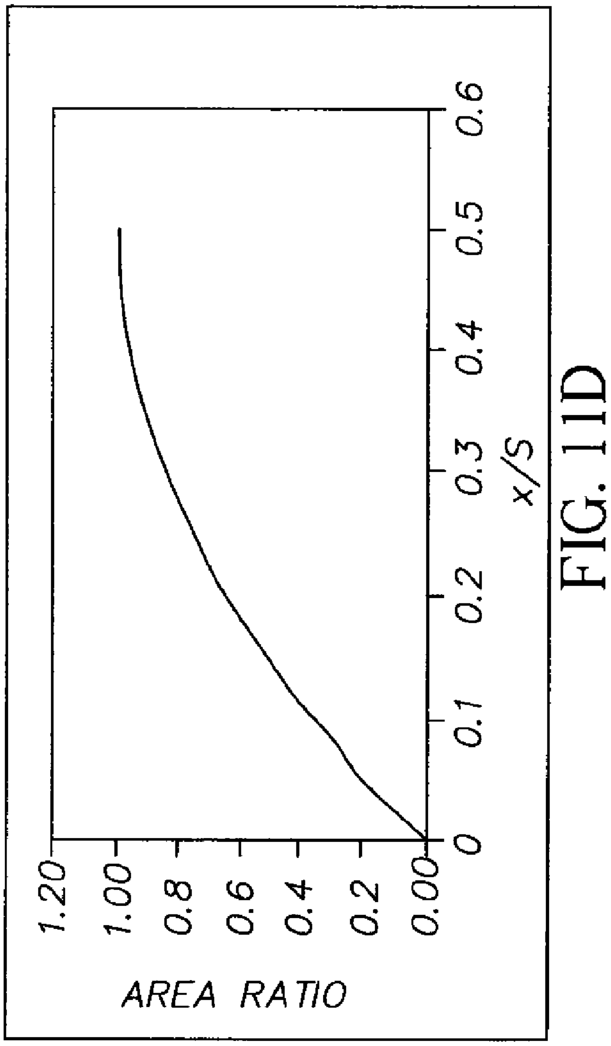
FIG. 11D shows the ratio of the area of the chamber opening to the maximum cross sectional area of the fluid chamber, as a function of the position of intersection between fluid chamber and fluid delivery channel.

FIG. 10 shows the formation of the fluid delivery channel 115, for example, by deep reactive ion etching (DRIE) from the second surface 112 (i.e. the backside) of the silicon substrate. As is well known in the art, DRIE allows the etching of passages with substantially vertical walls in silicon, said passages being up to several hundred microns deep. In order to allow fluid to flow from the backside of the substrate into the chamber, the position of the DRIE etched fluid delivery channel is such that it intersects the fluid chamber. In the embodiment illustrated in FIG. 10, this point of intersection is designed to be within the sloping end wall 117 of the fluid chamber. In this way, a region of constriction 114 is formed as a physical structure in the fluid pathway between the fluid delivery channel 115 and the nozzle 152. Constriction 114 extends from the fluid chamber 113 toward the nozzle plate 150. Because fluid delivery channel 115 typically connects to multiple nearby fluid chambers 113, said region of constriction 114 (located between the fluid delivery channel and the individual nozzles 152) helps to minimize the fluidic crosstalk between ejector 161 and nearby ejectors.

FIG. 11 shows some geometrical details of the region of constriction 114 for a chamber having length L and width S. As seen in the top view, the line of intersection 120 of the fluid delivery channel 115 with the fluid chamber 113, is located at a distance x from pit edge 118. If x were greater than S/2 (that is, if the fluid delivery channel intersected the chamber at its region of full depth D, rather than within sloping end wall 117), the shape of the opening would be a triangle having width S, depth H=0.707 S, and cross sectional area A=0.354 $S^2$. However, as seen in the end view from point B, by positioning the fluid delivery channel 115 such that x is somewhat less than S/2, the cross-section of the opening will be a trapezoid. The cross-sectional area of the trapezoidal opening is given by the expression $A=0.354\,S^2\,[4(x/S)-4(x/S)^2]$. Thus, it is less than the cross-sectional area of the chamber 113 at its largest region, where A=0.354 $S^2$. The growth of the trapezoidal opening (as a fraction of the maximum area of A=0.354 $S^2$) is shown as a function of x/S in the graph in FIG. 11, as x/S is varied from 0 to 0.5. The increased fluid impedance of the constriction 114 is due to both the smaller area of the trapezoidal opening, as well as the remaining length of sloping end wall 117.

For the purpose of energy efficiency, it is advantageous if the extent Q of the heater 151 is less than the width S of the fluid chamber 113. In this way, the heat generated by the heater is effectively transferred to the fluid within the fluid chamber It may be appreciated that there are a variety of means for providing a region of constriction in the fluid passageways between the nozzle and the fluid delivery channel. Several such alternate embodiments will now be described.

A second embodiment for forming a region of constriction in the fluid passageways between the nozzle and the ink delivery channel is illustrated in FIGS. 12-16. In this embodiment a pendent protrusion is formed within the chamber to form the region of constriction. In particular, this type of protrusion hangs down from the roof of the chamber (that is, the portion of the multilayer stack comprising the nozzle plate) and extends partway into the chamber. The protrusion is made by filling a pit which will remain adhering to the bottom of the multilayer stack when the fluid chamber is subsequently etched.

Figure 12A:
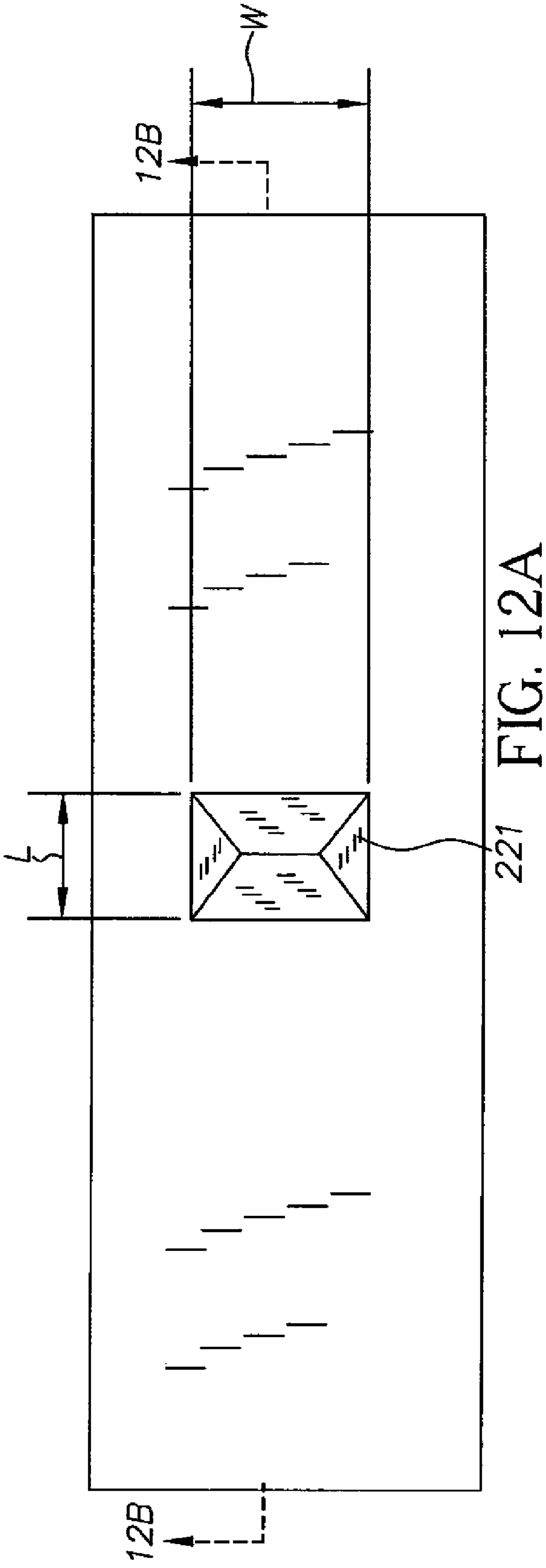
FIG. 12A shows a top view of a substrate and a pit in the surface of the substrate in a second embodiment.
Figure 12B:
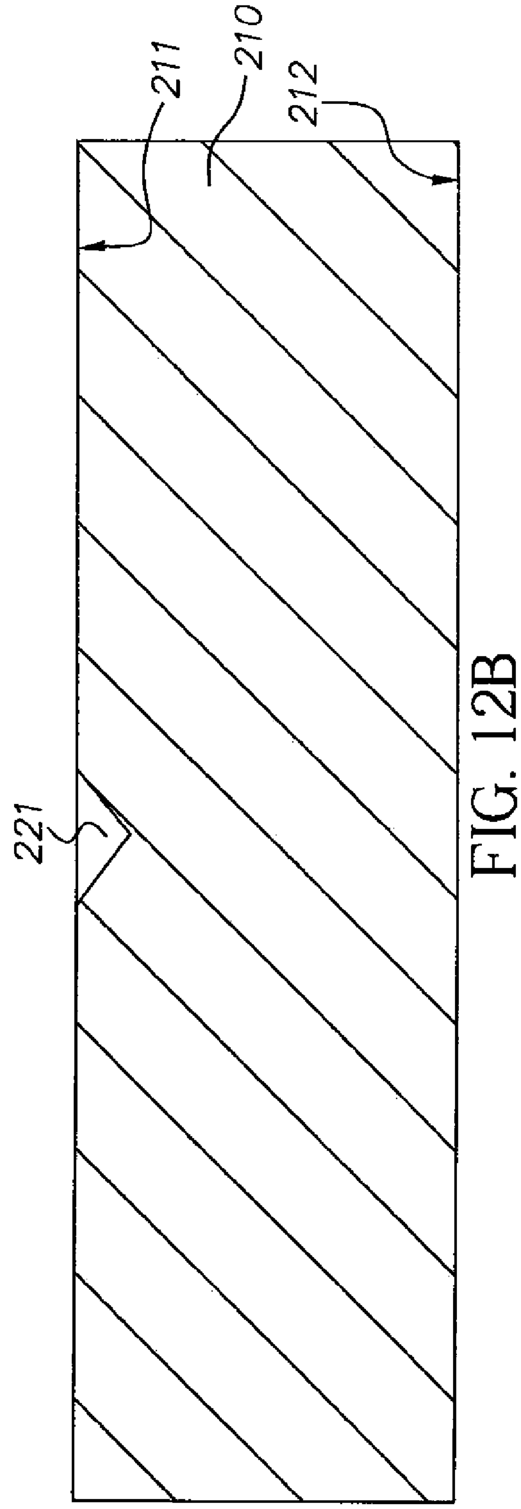
FIG. 12B shows a cross-sectional view as seen along the direction 12B-12B.

FIG. 12 shows the first step of etching a pit 221 into first surface 211 of silicon substrate 210. The pit 221 may be etched by a variety of isotropic or anisotropic means. However, in this embodiment, it is shown, for example, to be etched by orientation dependent etching. This pit has lateral dimensions l and w, and a depth d which is half the square root of 2 times the smaller of l or w.

Figure 13A:
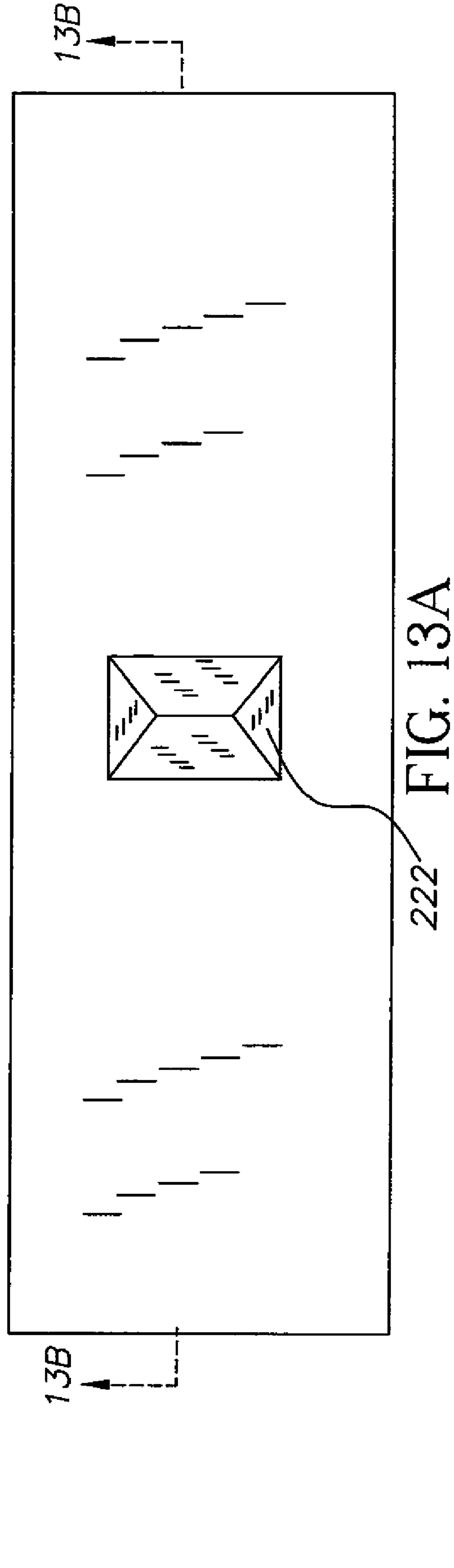
FIG. 13A shows a top view following a subsequent step of filling the pit with material.
Figure 13B:
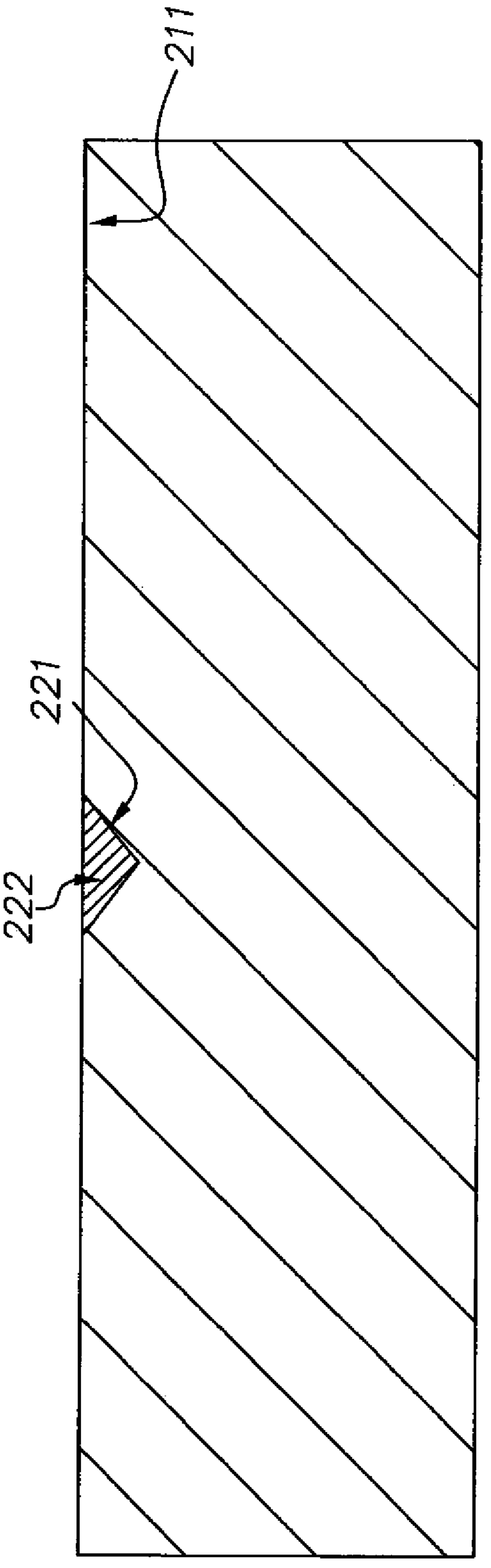
FIG. 13B shows a cross-sectional view as seen along the direction 13B-13B.

FIG. 13 shows pit 221 filled with material 222. Material 222 will later form the pendent protrusion. It must have the following properties: a) it must be capable of filling the pit 221; b) it must be able to withstand the subsequent processing steps; c) it must be able to adhere well to the bottom layer of the multilayer stack (typically an oxide or a nitride layer); and d) it must be etched slowly or not at all by the ODE etchant used in the subsequent chamber etch step. An example of such a material is glass. Another example is tungsten. In FIG. 13, the top of the pit-filling material 222 is shown to be at the same level as the first surface 211 of the silicon substrate. The excess material 222 which may have been deposited on surface 211 has been removed, by steps which may include etching and/or polishing.

Figure 14A:
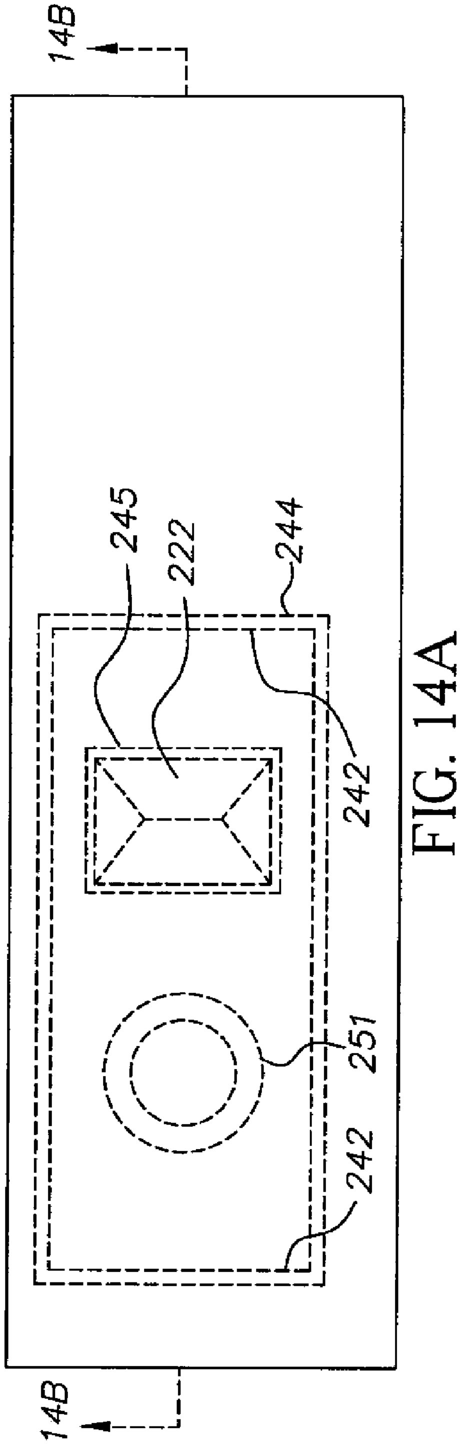
FIG. 14A shows a top view following subsequent steps of forming a patterned masking layer, a heater, and a multilayer stack.
Figure 14B:
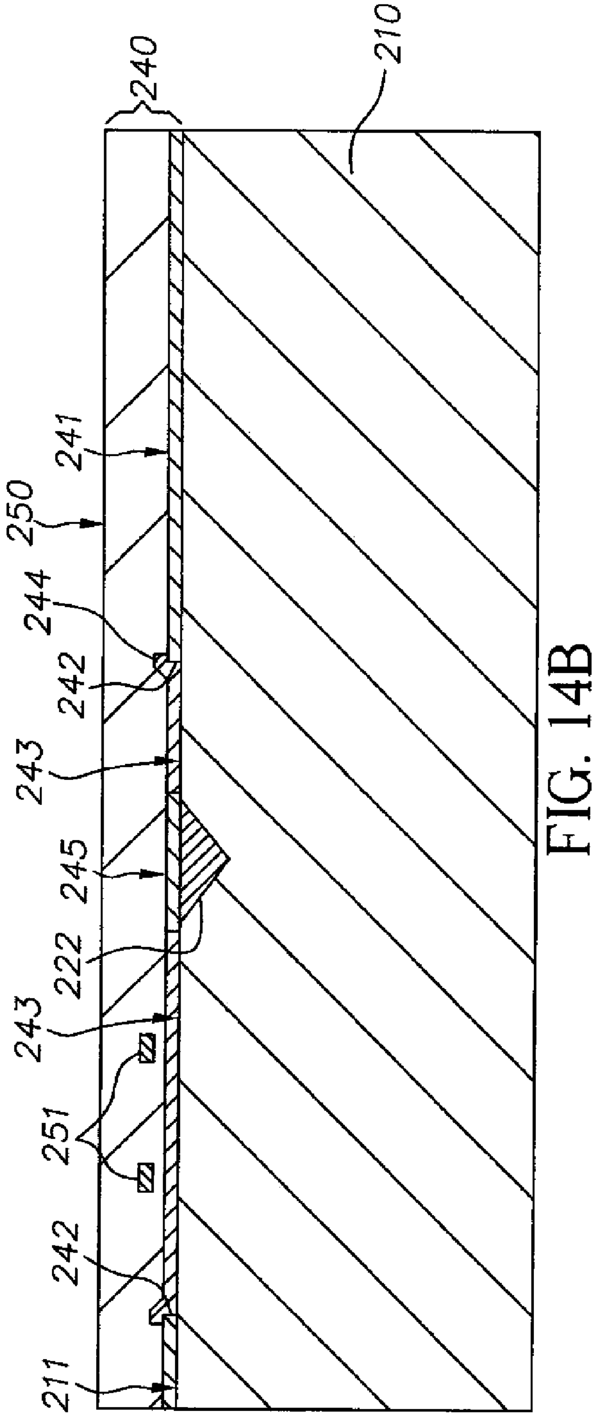
FIG. 14B shows a cross-sectional view as seen along the direction 14B-14B.

FIG. 14 shows the result of the various processing steps for the multilayer stack 240, a portion of which comprises a nozzle plate 250. It is similar to FIG. 6 for the first embodiment, and similar numbers refer to similar parts, including multilayer stack 240, heater element 251, oxide layer 241, region 242 of oxide which has been removed corresponding to the eventual location of the fluid chamber, sacrificial layer 243, and region of overlap 244 of sacrificial layer on top of the oxide layer. Also shown in FIG. 14 is an island of oxide layer 245 which remains within the eventual chamber location and is deposited over pendent protrusion material 222.

Figure 15A:
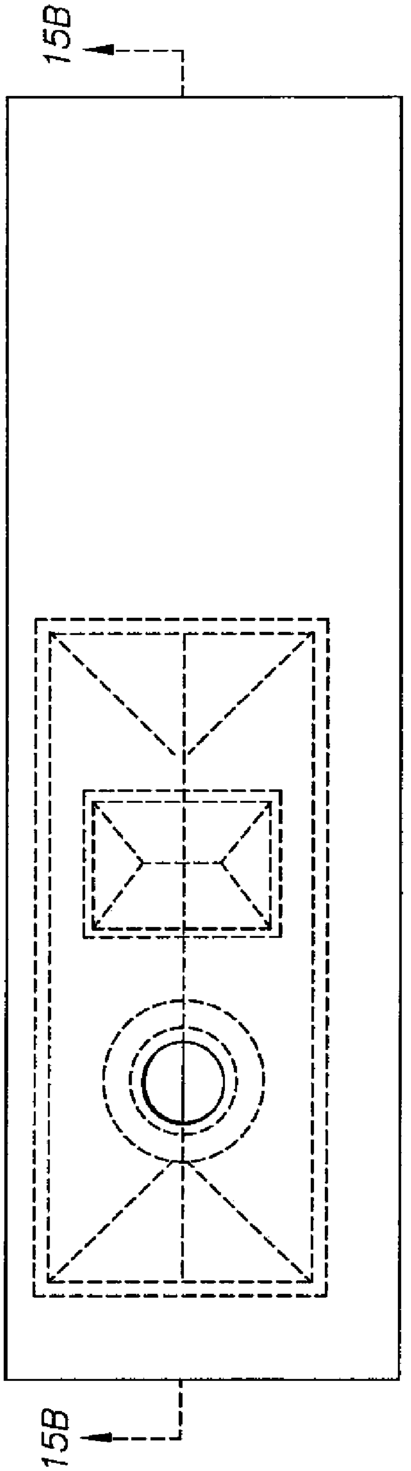
FIG. 15A shows a top view following subsequent steps of forming a nozzle and a fluid chamber, such that the material extends as a pendent protrusion from the bottom of the nozzle plate into the chamber.
Figure 15B:
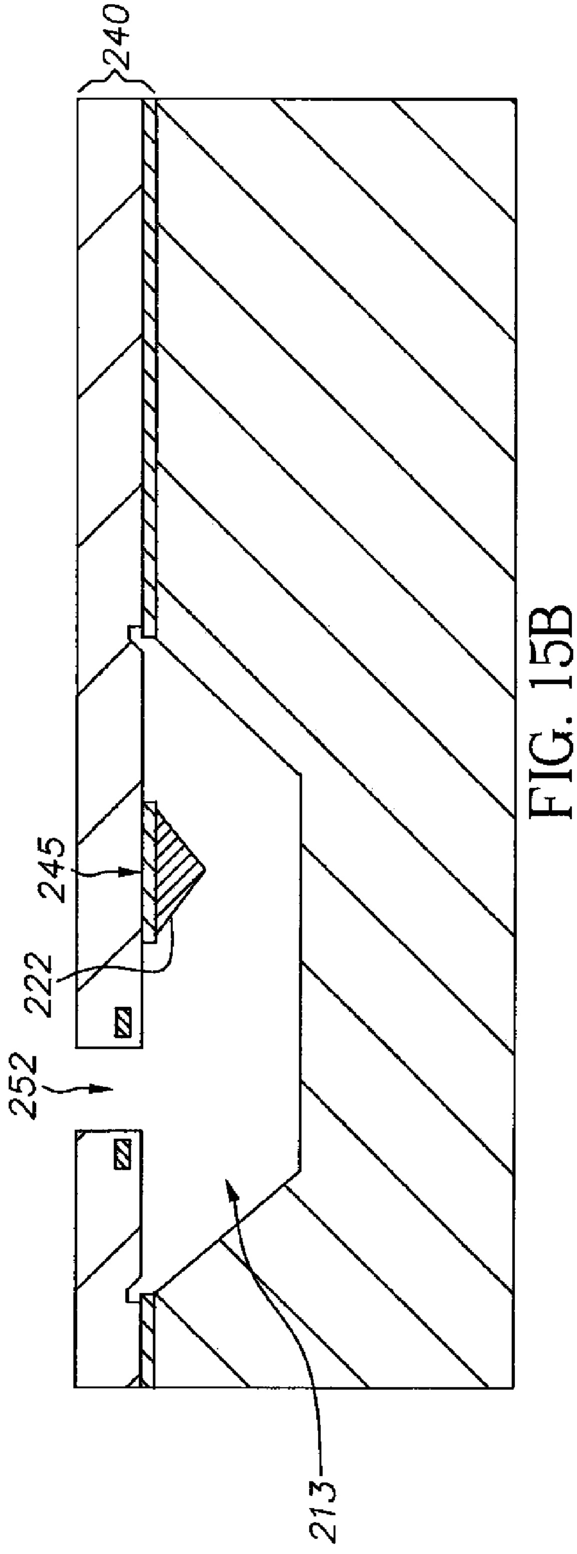
FIG. 15B shows a cross-sectional view as seen along the direction 15B-15B.

FIG. 15 illustrates the steps for fabricating the fluid chamber. After the nozzle 252 is formed, both the sacrificial layer 243 and the chamber 213 are etched. If the sacrificial material 243 is a material such as polysilicon, which can be etched at the same time as the fluid chamber, then these two steps may occur simultaneously. The pendent protrusion material 222 and the oxide layer 245 to which it adheres, are not etched during the chamber etch step. As a result, the pendent protrusion 222 extends down into the chamber 213 from the underside of the nozzle plate, which forms a roof over the chamber 213.

Figure 16A:
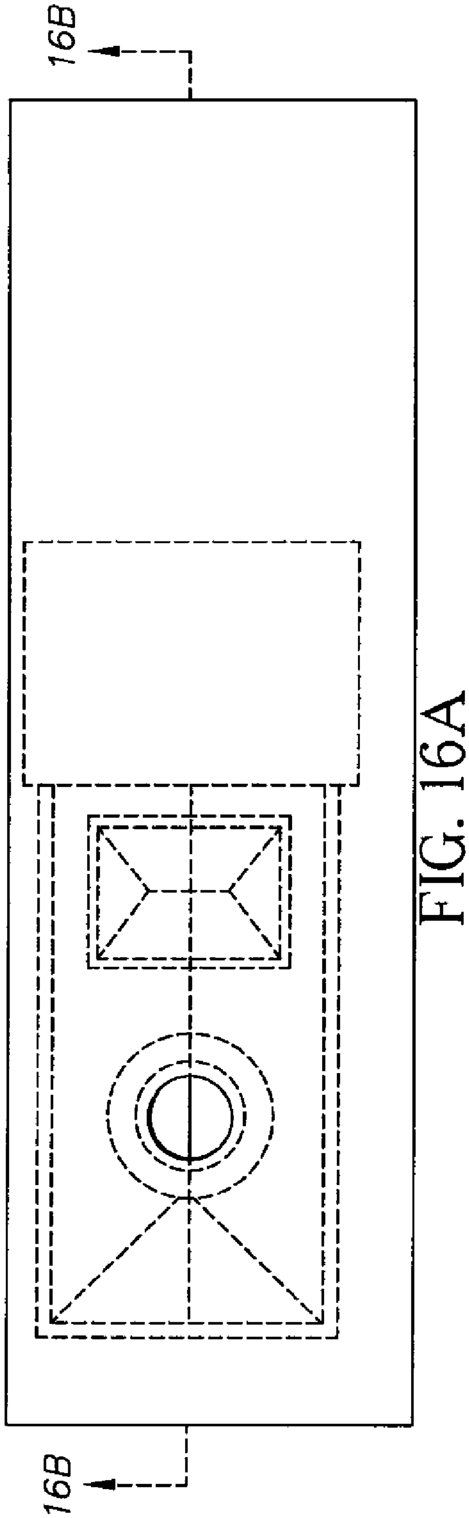
FIG. 16A shows a top view following a subsequent step of forming a fluid delivery channel.
Figure 16B:
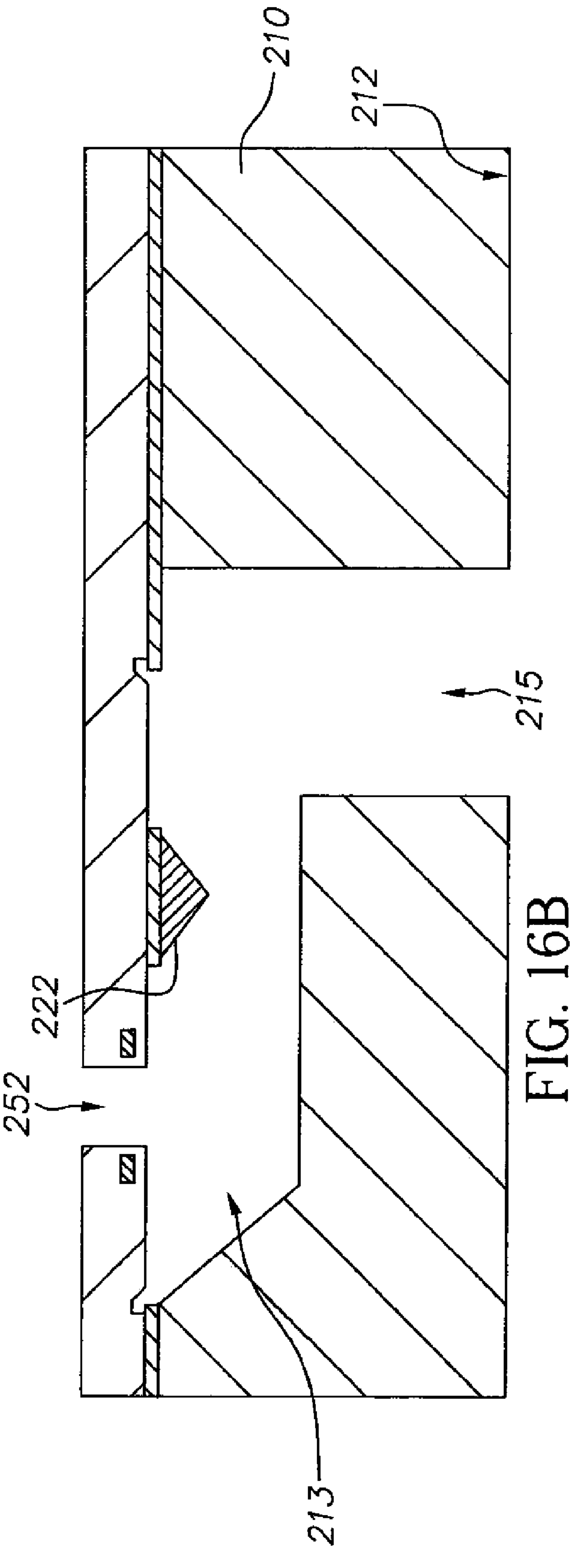
FIG. 16B shows a cross-sectional view as seen along the direction 16B-16B.

FIG. 16 shows the DRIE fluid delivery channel 215 which has been etched from the backside 212 of silicon substrate 210. The fluid delivery channel 215 is shown as having been positioned so that it intersects the fluid chamber 213 in a location where the fluid chamber has its maximum cross-sectional area. In this embodiment, the constriction between the nozzle and the fluid delivery chamber is formed by the pendent protrusion 222. Although only one pendent protrusion 222 is shown, of course numerous pendent protrusions may be formed in a linear or two dimensional array within the boundaries of the chamber. It may be appreciated that it is also possible to combine embodiments 1 and 2, and to have constrictions formed by a combination of one or more pendent protrusions and a smaller opening of the chamber 213 into the fluid delivery channel 215. Optionally, in such a case, one may locate the one or more pendent protrusions over the sloped end wall of the chamber.

In addition to adding fluid impedance to minimize cross-talk, a second function that a constriction in the fluid path may serve is to prevent particulate matter, which may have entered at the fluid delivery channel, from getting to the nozzle and lodging there. In other words, such protrusion(s) may serve as a final stage filter. Typically there are other filters in the fluid supply line which are upstream of the ink delivery channel. The protrusion(s) would only be required to block a rare particle which may have gotten past the main filters.

FIGS. 17-24 illustrate a third embodiment for forming a constriction in the fluid path between the fluid delivery channel and the nozzle. As in the second embodiment, a protrusion extends into the fluid chamber. In the third embodiment, the protrusion consists of a post which is formed using a photopatternable polymer. The post extends from the roof of the chamber (that is, the nozzle plate) to a wall of the chamber and is adhered at both ends.

Figure 17A:
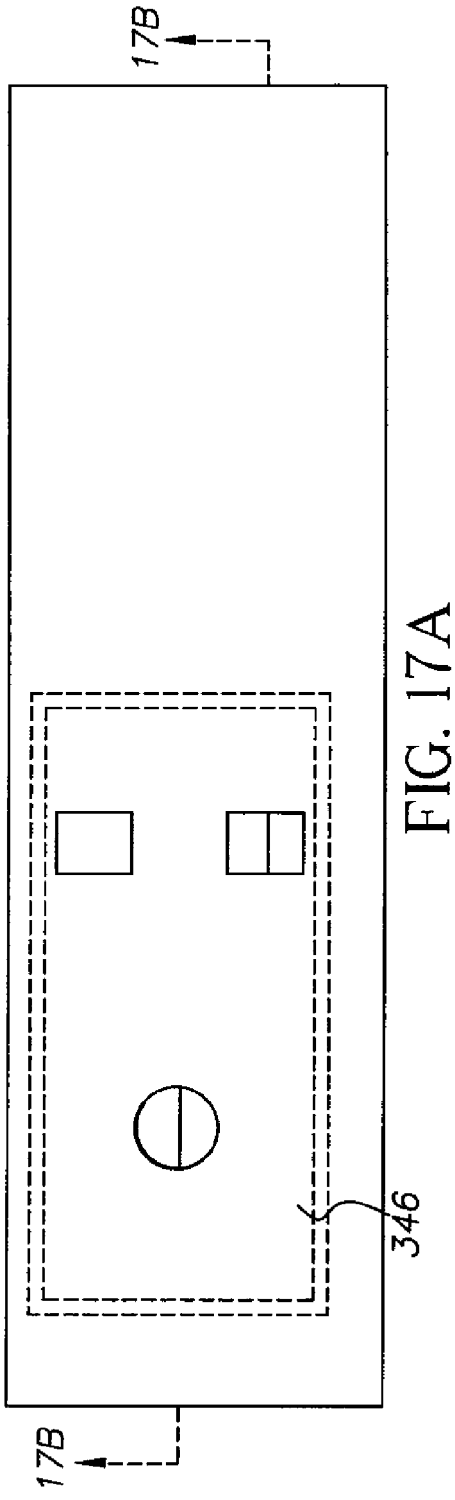
FIG. 17A shows a top view of a substrate, heater, multilayer stack, and patterned metal layer in a third embodiment.
Figure 17B:
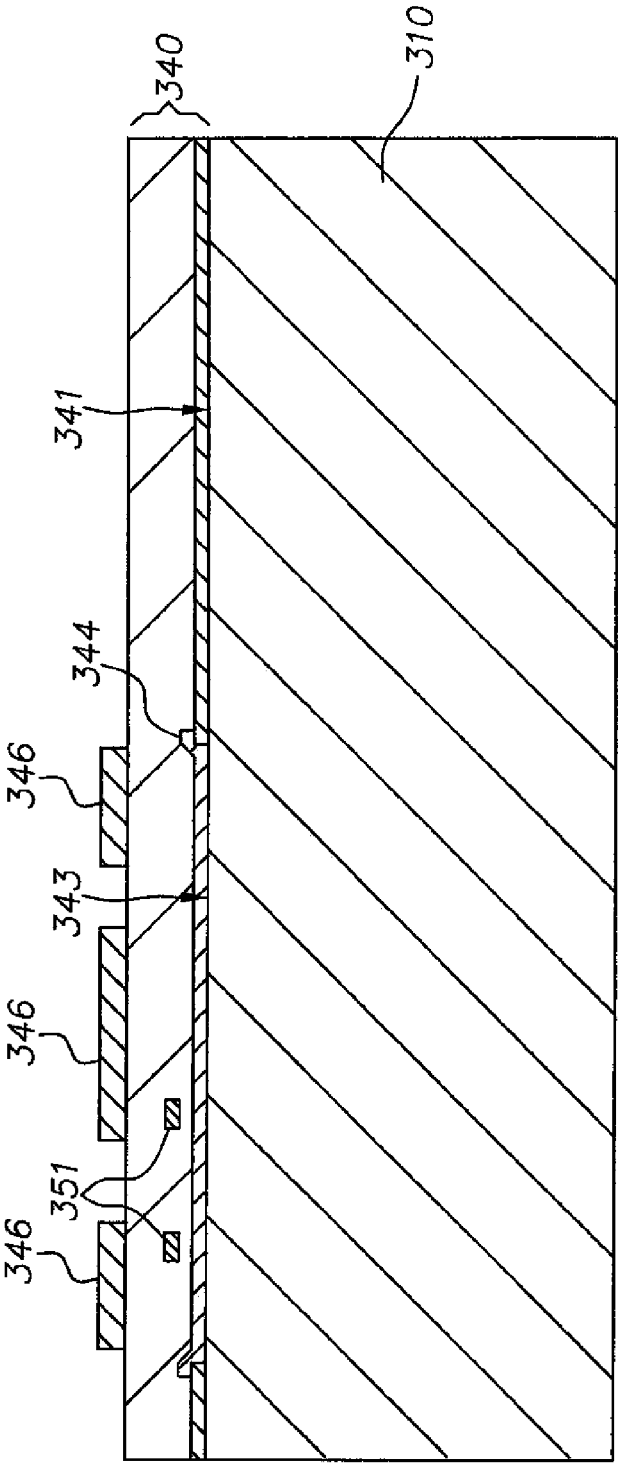
FIG. 17B shows a cross-sectional view as seen along the direction 17B-17B.

FIG. 17 is similar to FIG. 6 for the first embodiment, and similar numbers refer to similar parts, including multilayer stack 340, heater element 351, oxide layer 341, region 342 of oxide which has been removed corresponding to the eventual location of the fluid chamber, sacrificial layer 343, and region of overlap 344 of sacrificial layer on top of the oxide layer. In addition, FIG. 17 shows a layer 346 which remains on top of the multilayer stack 340, at least in the region corresponding to the eventual location of the fluid chamber. Layer 346 has been patterned so that there are windows corresponding to the eventual location of the nozzle (shown here as a circle), as well as to the eventual location of polymer posts (shown here as rectangles). Layer 346 is opaque to photo exposure, and typically would be made of metal.

Figure 18A:
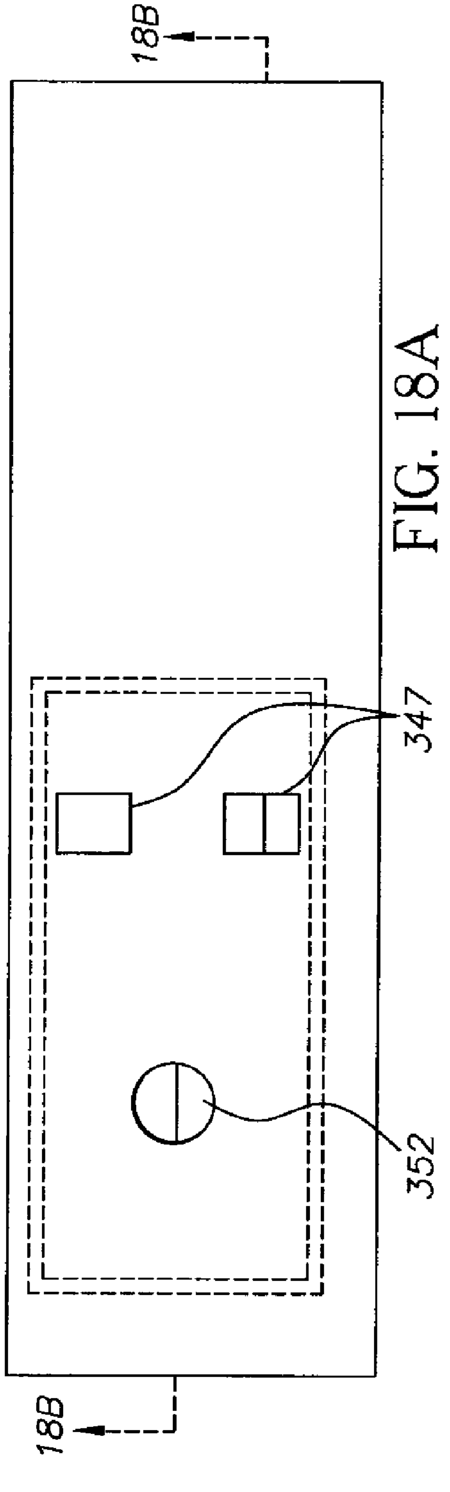
FIG. 18A shows a top view following a subsequent step of etching a nozzle and additional holes through the patterned metal layer and the multilayer stack.
Figure 18B:
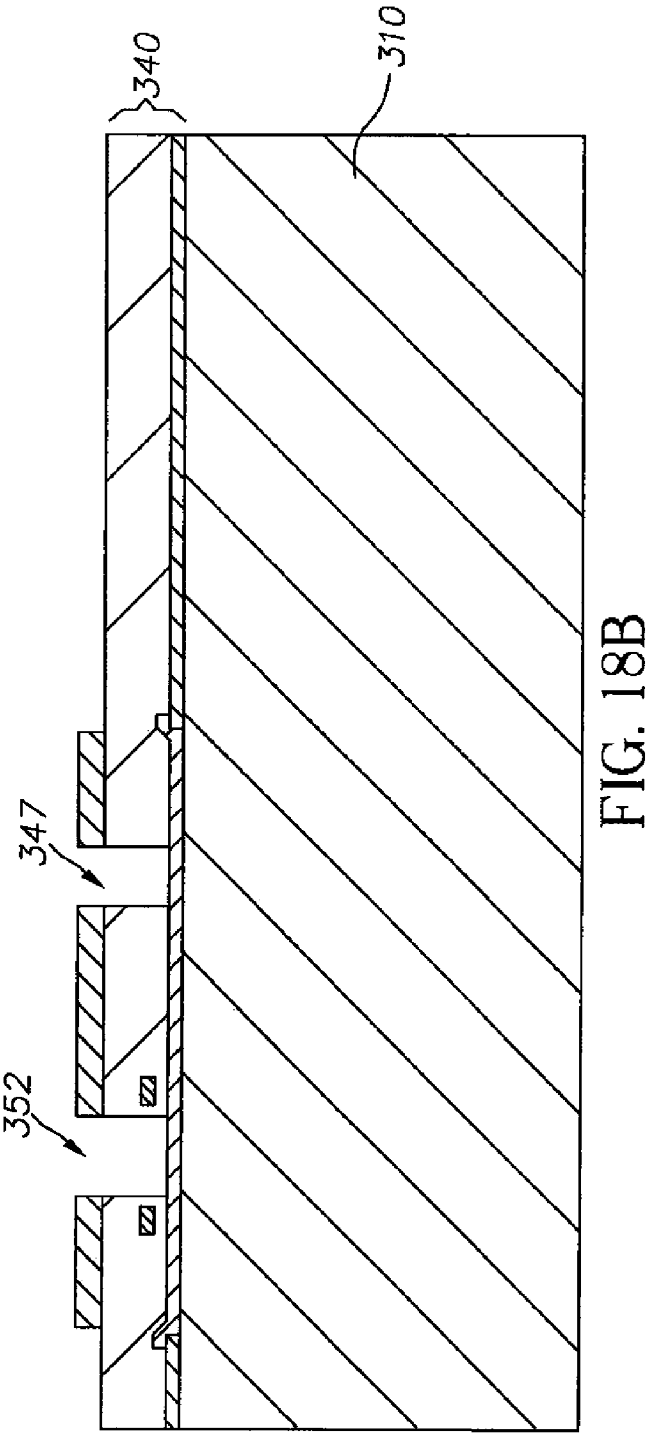
FIG. 18B shows a cross-sectional view as seen along the broken line direction 18B-18B.

FIG. 18 shows holes having been etched through multilayer stack 340. These holes correspond to the nozzle 352 and the eventual post locations 347. The cross-sectional view in FIG. 18 is along broken line A-C, so that the nozzle as well as the post location may be seen.

Figure 19A:
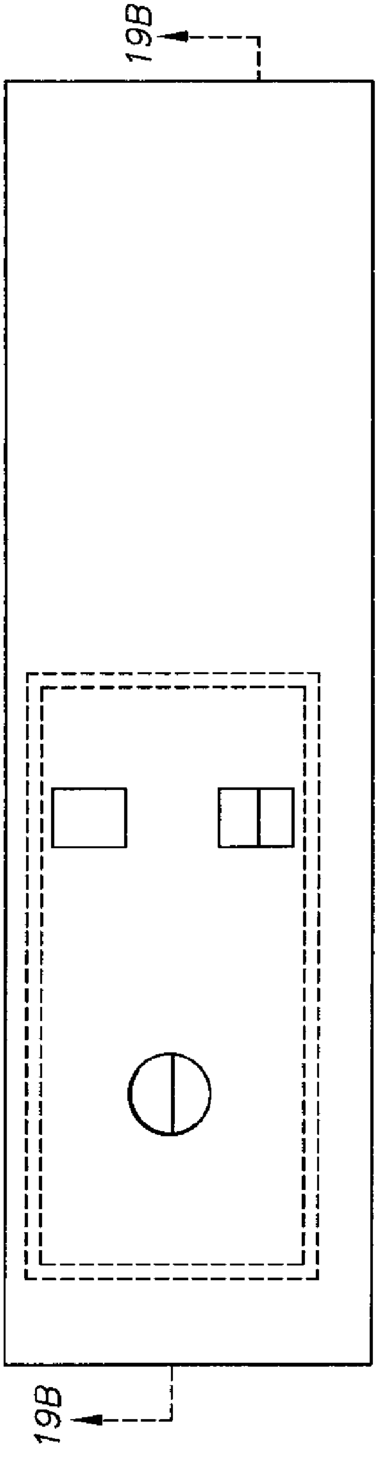
FIG. 19A shows a top view following a subsequent step of forming a fluid chamber.
Figure 19B:
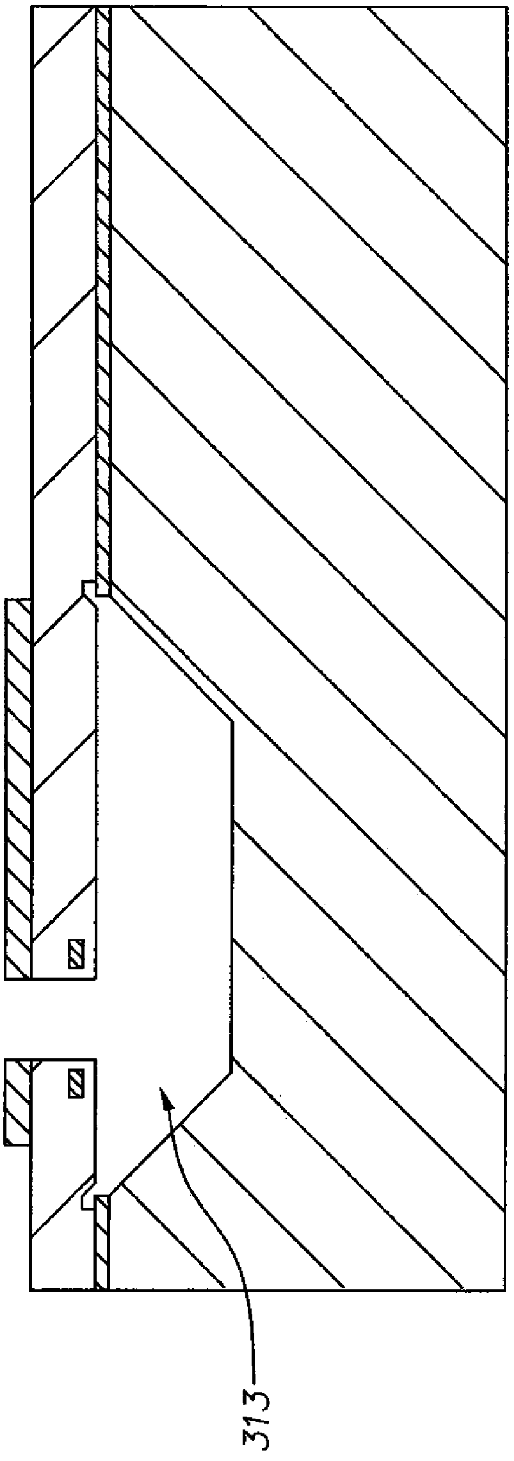
FIG. 19B shows a cross-sectional view as seen along the direction 19B-19B.
Figure 20A:
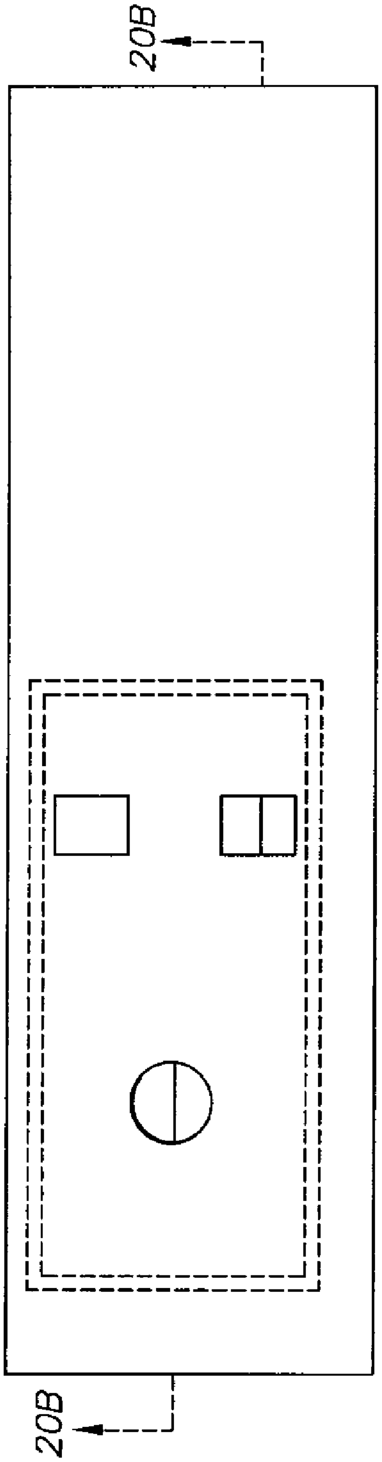
FIG. 20A shows a top view similar to FIG. 19A.
Figure 20B:
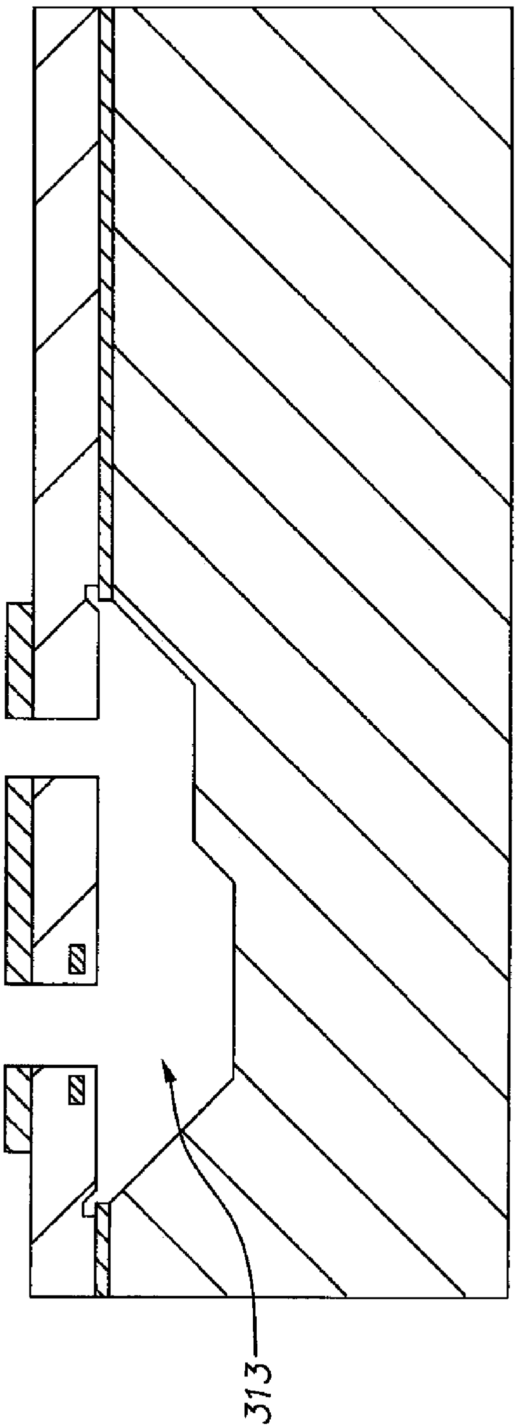
FIG. 20B shows a cross-sectional view as seen along the broken line direction 20B-20B.

FIGS. 19-20 show different cross-sectional views following the step of orientation dependent etching of the fluid chamber 313. FIG. 19 shows the view along A-A which goes through the nozzle and the deepest part of the chamber 313. FIG. 20 shows the view along A-C which goes through the nozzle, and then jogs over to show the view through one of the eventual post locations. In making this jog in the view line, the slope in the bottom of the chamber is also represented.

Figure 21A:
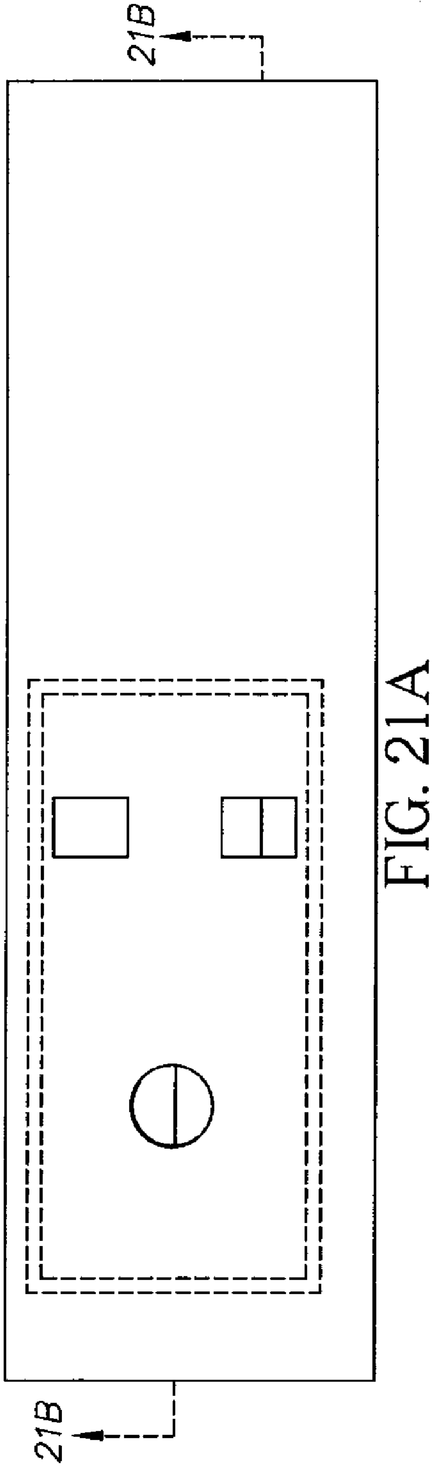
FIG. 21A shows a top view following a subsequent step of applying a photopatternable polymer.
Figure 21B:
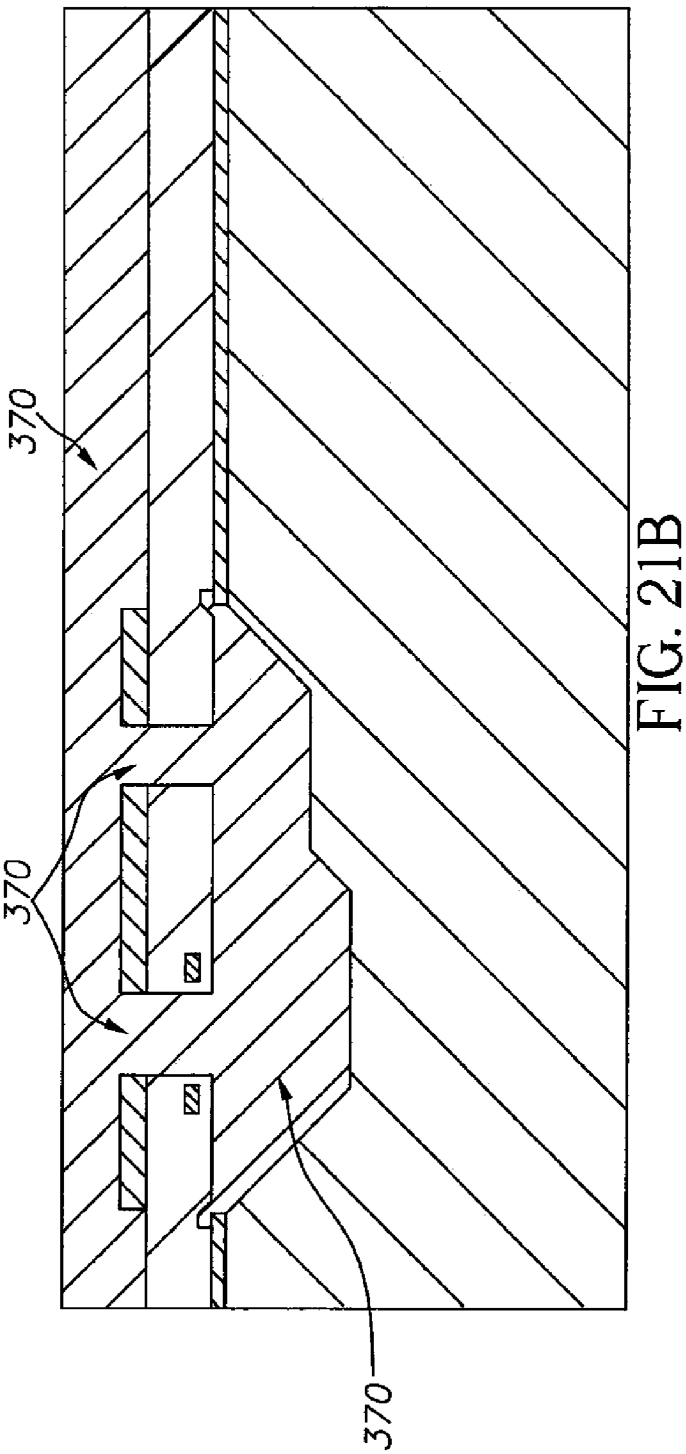
FIG. 21B shows a cross-sectional view as seen along the broken line direction 21B-21B.

FIG. 21 illustrates the addition of a photopatternable polymer material 370. Photopatternable polymer material 370 may be an epoxy such as SU-8, or a polyimide, or any other such polymer material which may be exposed, developed and cured. It is typically applied by depositing an amount on the wafer, and spinning the wafer. As shown, the polymer material 370 fills the fluid chamber, the nozzle hole and the post holes, and also leaves a layer on top of the multilayer stack 340.

Figure 22A:
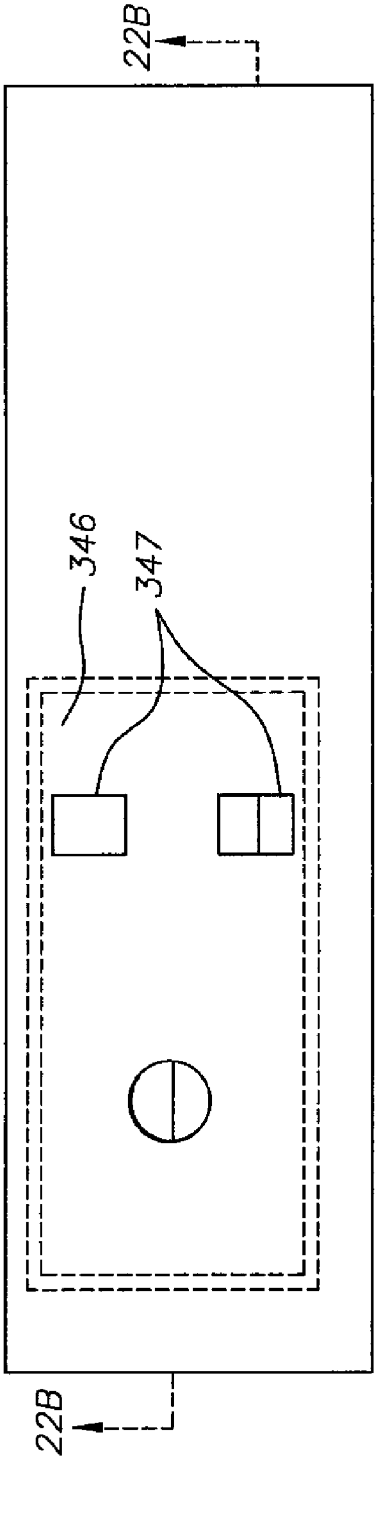
FIG. 22A shows a top view following a subsequent step of exposing the photopatternable layer while shielding the nozzle region from exposure.
Figure 22B:
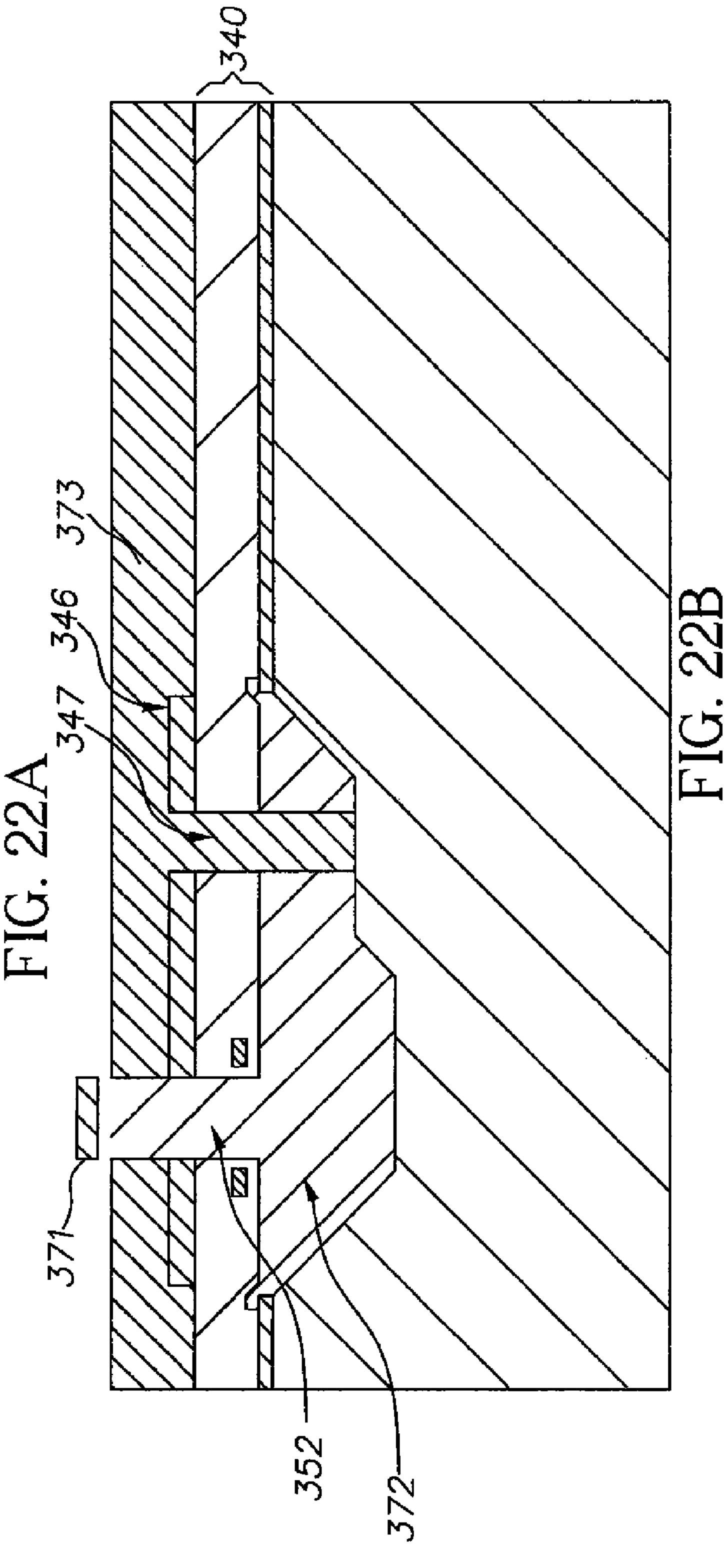
FIG. 22B shows a cross-sectional view as seen along the broken line direction 22B-22B.

FIG. 22 illustrates the step of exposing the photopatternable polymer material 370 through a mask 371. Mask 371 shields the polymer material 370 in the nozzle region 352 from exposure. In addition, opaque layer 346 (on top of the multilayer stack 340) shields polymer material 370 in the chamber, except where the posts are to be formed at locations 347.

Figure 23C:
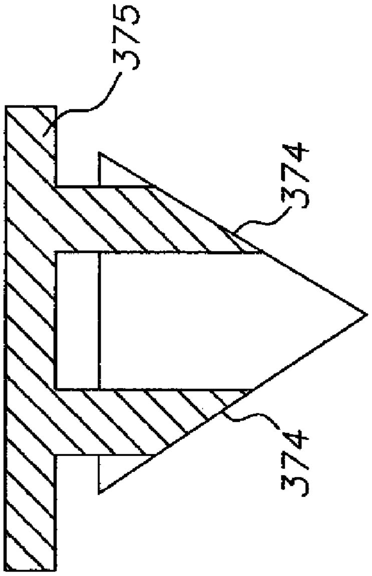
FIG. 23C shows an end view showing the fluid chamber, the polymer layer, and polymer posts extending from the polymer layer into the fluid chamber.
Figure 23A:
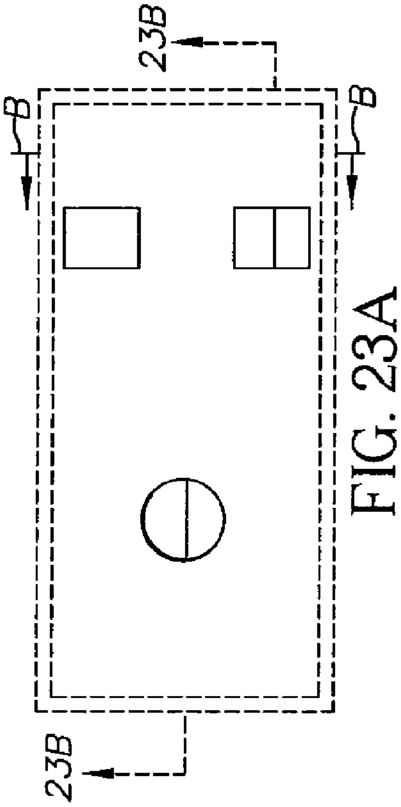
FIG. 23A shows a top view following subsequent step of developing away the unexposed photopatternable polymer.
Figure 23B:
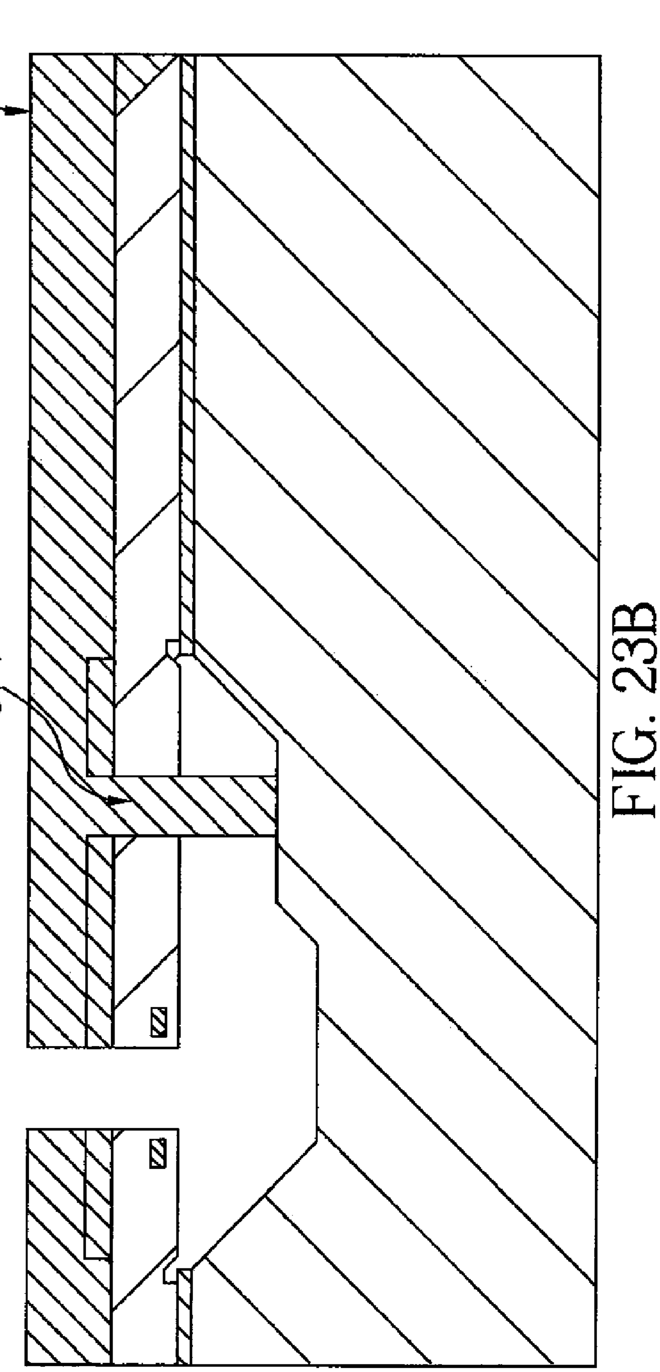
FIG. 23B shows a cross-sectional view as seen along the broken line direction 23B-23B.

FIG. 23 shows cross-sectional views and end views of the cross-linked post structures 374, as well as the cross-linked top layer of polymer 375 following development and cure of the photopatternable polymer material. One advantage of the top layer of polymer 375 is that it provides an additional length to the nozzle 352. A second advantage of the top polymer layer is that it serves as an anchoring point for the posts 375. The fact that the posts 375 are attached at both the top and the bottom gives them additional strength. Although two posts of rectangular cross-section are showed side by side, it may be appreciated such features are determined by the patterning of the opaque layer 346. Other one-dimensional or two dimensional arrays of posts are possible, and other cross-sectional shapes of the posts are may be readily implemented.

Figure 24A:
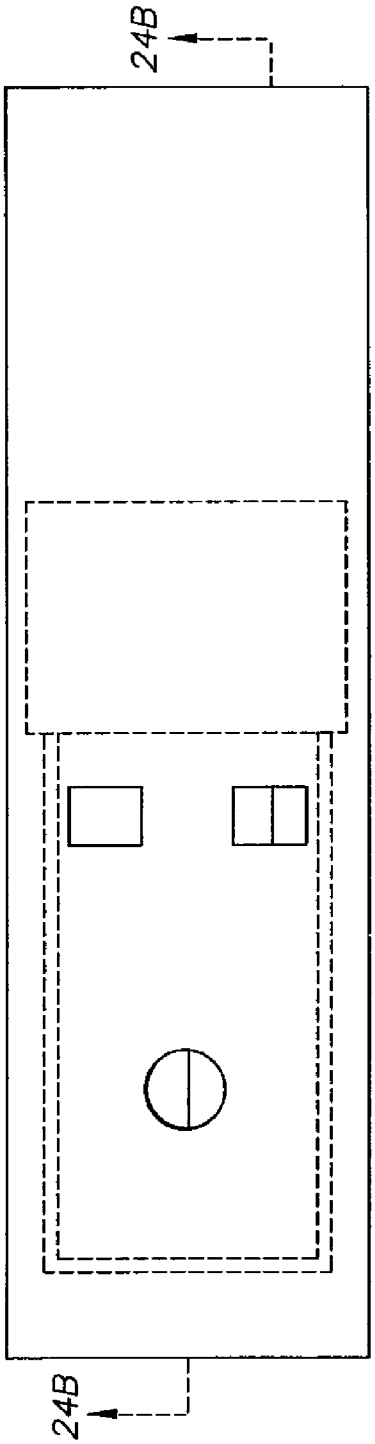
FIG. 24A shows a top view following a subsequent step of forming a fluid delivery channel.
Figure 24B:
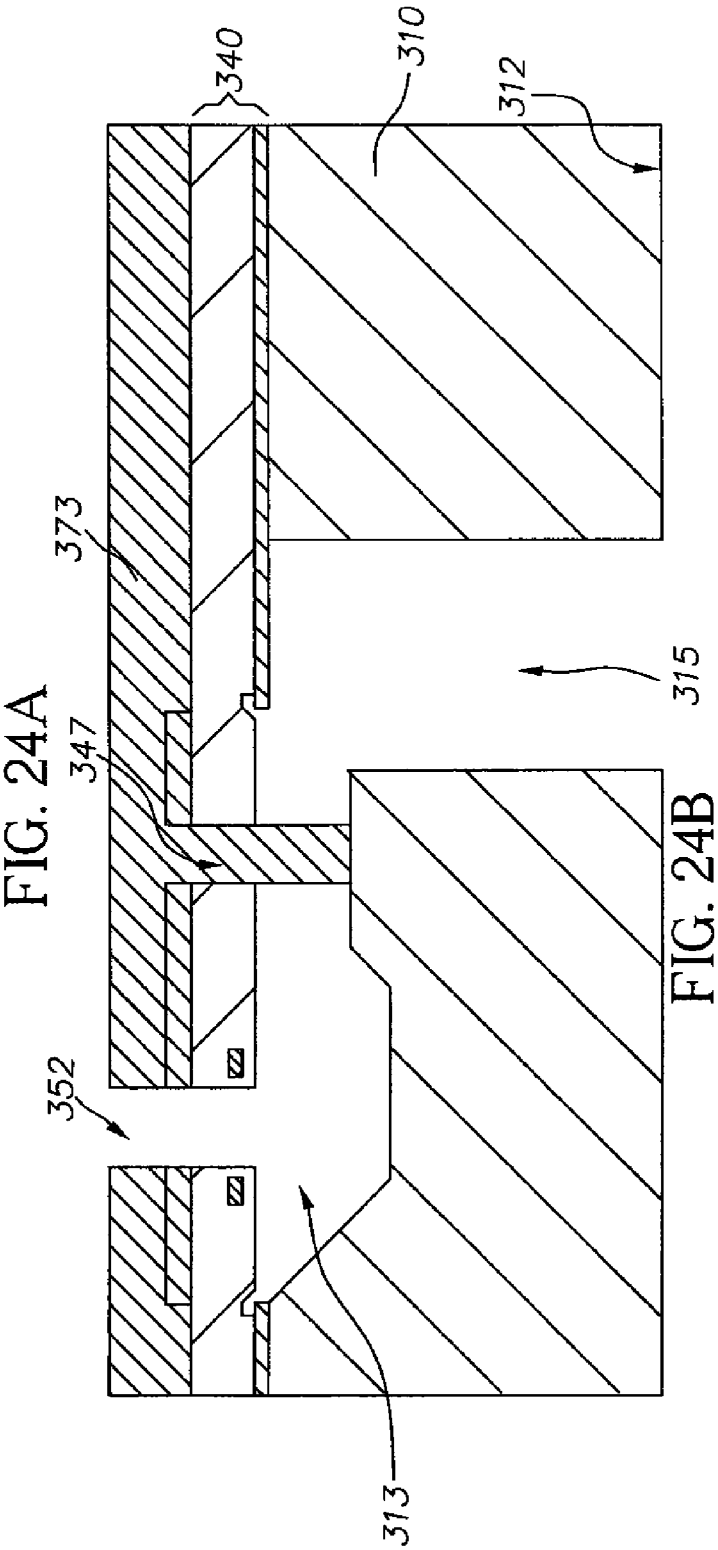
FIG. 24B shows a cross-sectional view as seen along the broken line direction 24B-24B.

FIG. 24 shows the DRIE fluid delivery channel 315 which has been etched from the backside 312 of silicon substrate 310. The fluid delivery channel 315 is shown as having been positioned so that it intersects the fluid chamber 313 in a location where the fluid chamber has its maximum cross-sectional area. In this embodiment, the constriction between the nozzle and the fluid delivery chamber is formed by the polymer posts 374. It may be appreciated that it is also possible to combine embodiments 1 and 3 and to have constrictions formed by a combination of a post or posts and a smaller opening of the chamber 313 into the fluid delivery channel 315. Optionally, in such a case, one may locate the post or posts over the sloped end wall of the chamber.

As was true of the pendent protrusions in the second embodiment, it is likewise true of the polymer posts that they may serve the dual function of providing fluid impedance against cross-talk, as well as serving as a final stage filter for unwanted particulate matter.

FIGS. 25-30 illustrate a fourth embodiment for forming a constriction in the fluid path between the fluid delivery channel and the nozzle. In this fourth embodiment, the constriction is formed by interposing an impedance channel at the first surface of the substrate between the nozzle and the fluid delivery channel, said impedance channel having a cross-sectional area which is less than the maximum cross sectional area of the fluid chamber, i.e. less than 0.35 $S^2$. The particular example of forming such an impedance channel which will be described here is an orientation dependent etched channel having a width s less than S and a corresponding depth less than 0.707 S. Hence, the cross-sectional area of the impedance channel is 0.35 $s^2$, which is less than 0.35 $S^2$.

Figure 25A:
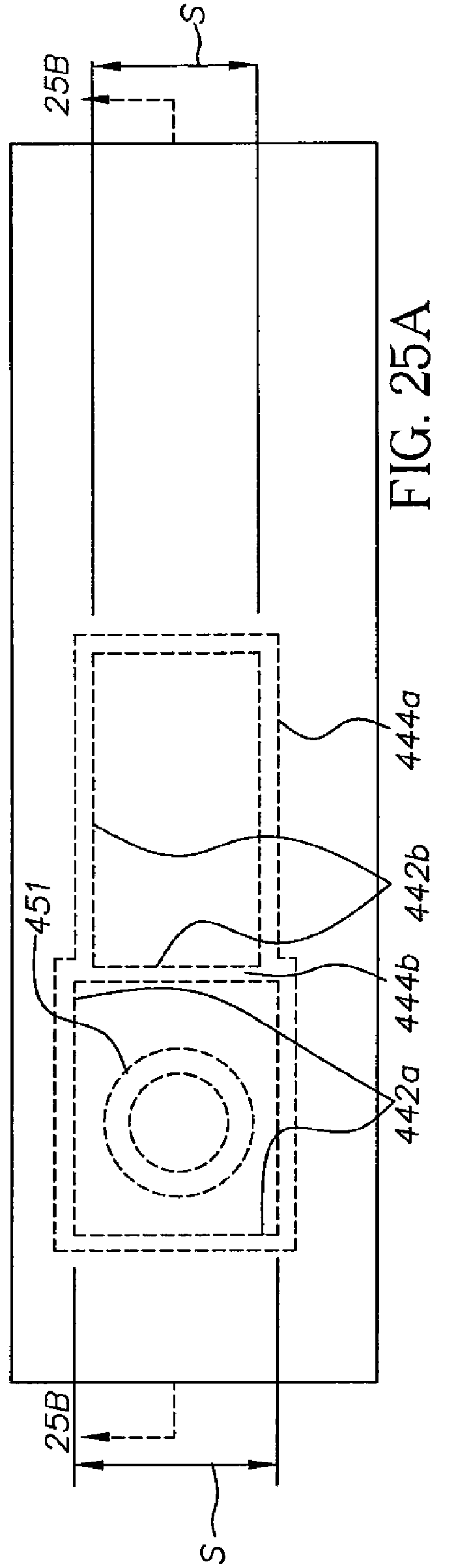
FIG. 25A shows a top view of a substrate, heater, and multilayer stack in a fourth embodiment.
Figure 25B:
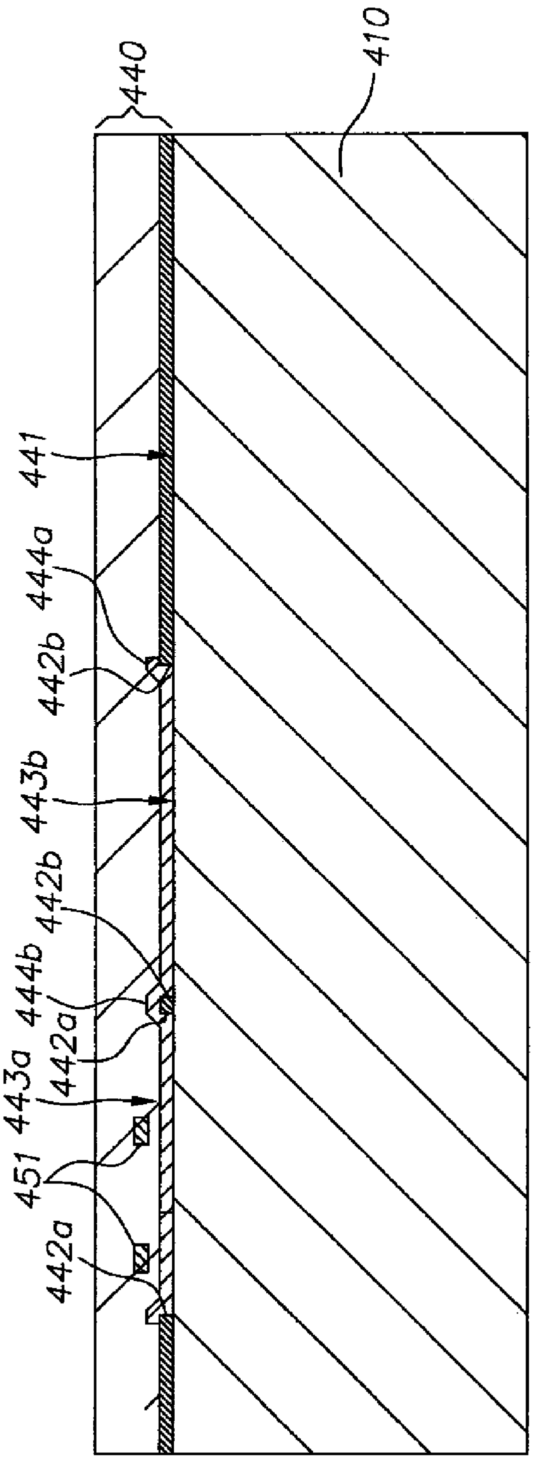
FIG. 25B shows a cross-sectional view as seen along direction 25B-25B.

FIG. 25 shows an oxide mask pattern for a fluid chamber of width S and an adjacent impedance channel of width s<S. FIG. 25 shows the result of the various processing steps for the multilayer stack 440. It is similar to FIG. 6 for the first embodiment, and similar numbers refer to similar parts, including substrate 410, multilayer stack 440, heater element 451, oxide layer 441, region 442*a* of oxide which has been removed corresponding to the eventual location of the fluid chamber, region 442*b* of oxide which has been removed corresponding to the eventual location of the impedance channel, sacrificial layer 443*a* in the eventual location of the fluid chamber, sacrificial layer 443*b* in the eventual location of the impedance channel, region of overlap 444*a* of sacrificial layer on top of the oxide layer at the extreme ends of the fluid chamber and the impedance channel, and region of overlap 444*b* of sacrificial layer on top of the oxide layer in the region between the eventual locations of the fluid chamber and the impedance channel.

Figure 26A:
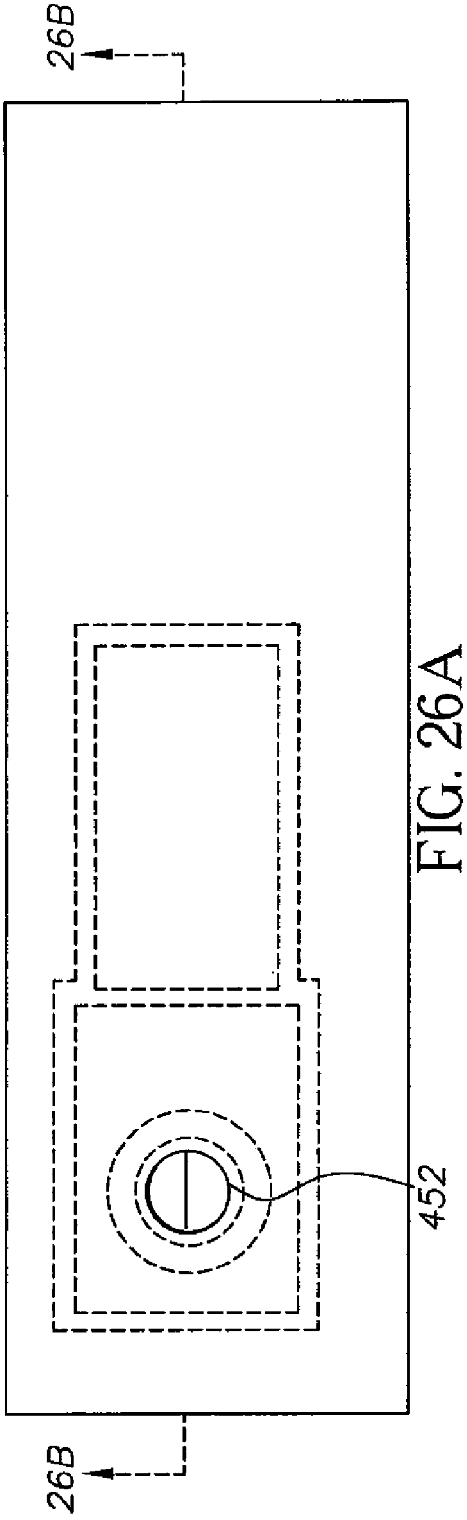
FIG. 26A shows a top view following a subsequent step of forming a nozzle.
Figure 26B:
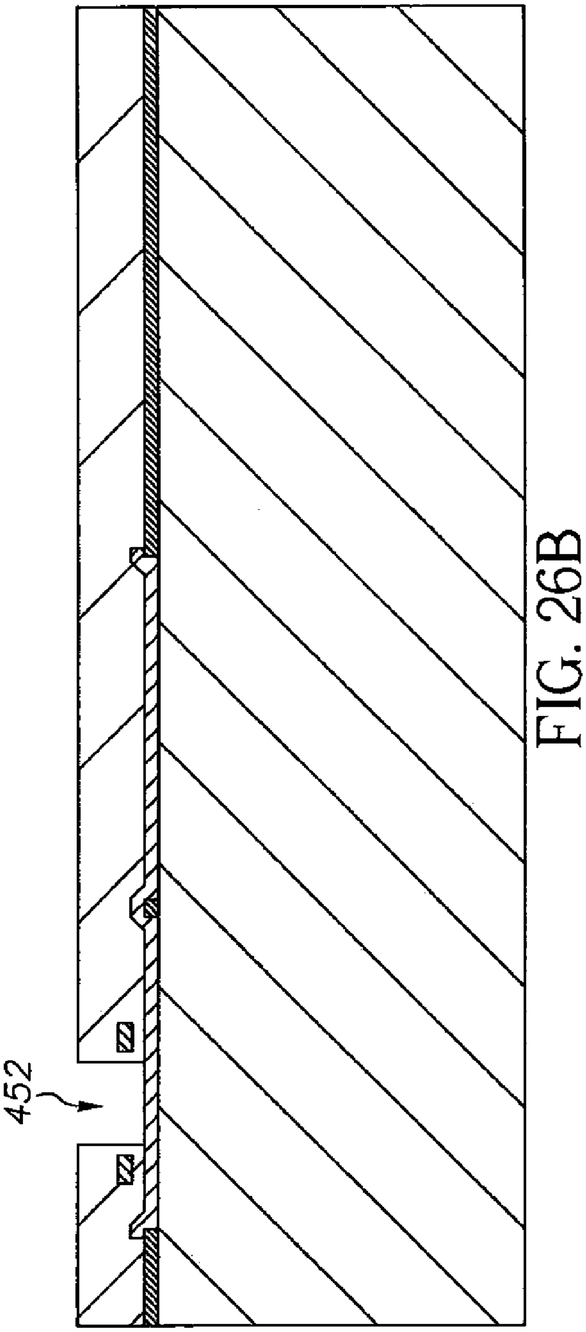
FIG. 26B shows a cross-sectional view as seen along direction 26B-26B.
Figure 27A:
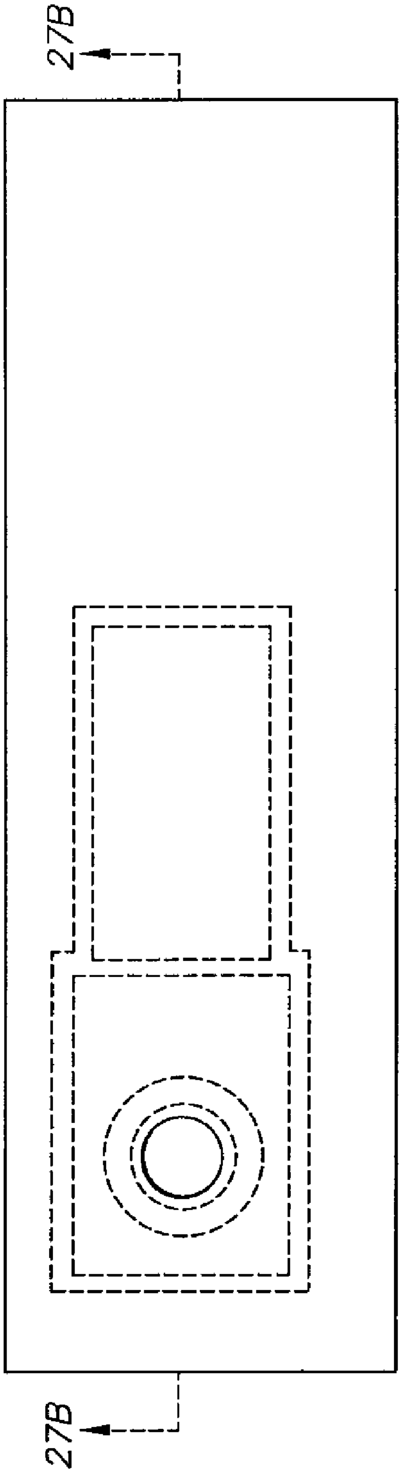
FIG. 27A shows a top view following a subsequent step of removing a sacrificial layer.
Figure 27B:
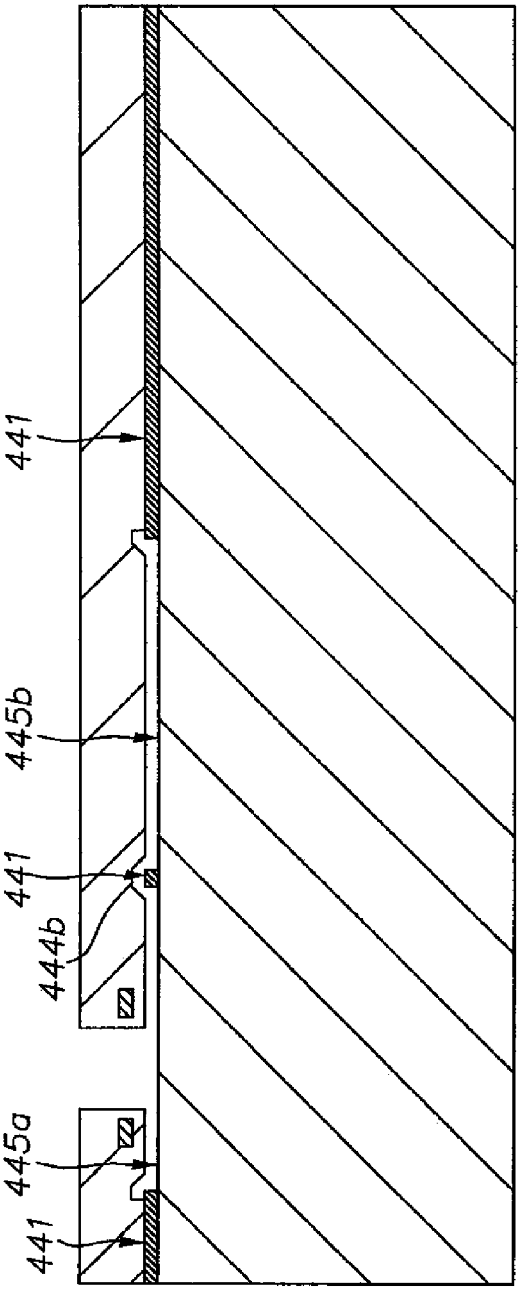
FIG. 27B shows a cross-sectional view as seen along direction 27B-27B.

FIG. 26 illustrates the step of etching the nozzle 452. FIG. 27 shows the etching of the sacrificial layer 443 to form cavity 445*a* above the eventual location of the fluid chamber and cavity 445*b* above the eventual location of the impedance channel. Note that the etching away of sacrificial layer in the region of overlap 444*b* (on top of the oxide layer) forms a continuous passageway for etchant to enter.

Figure 28A:
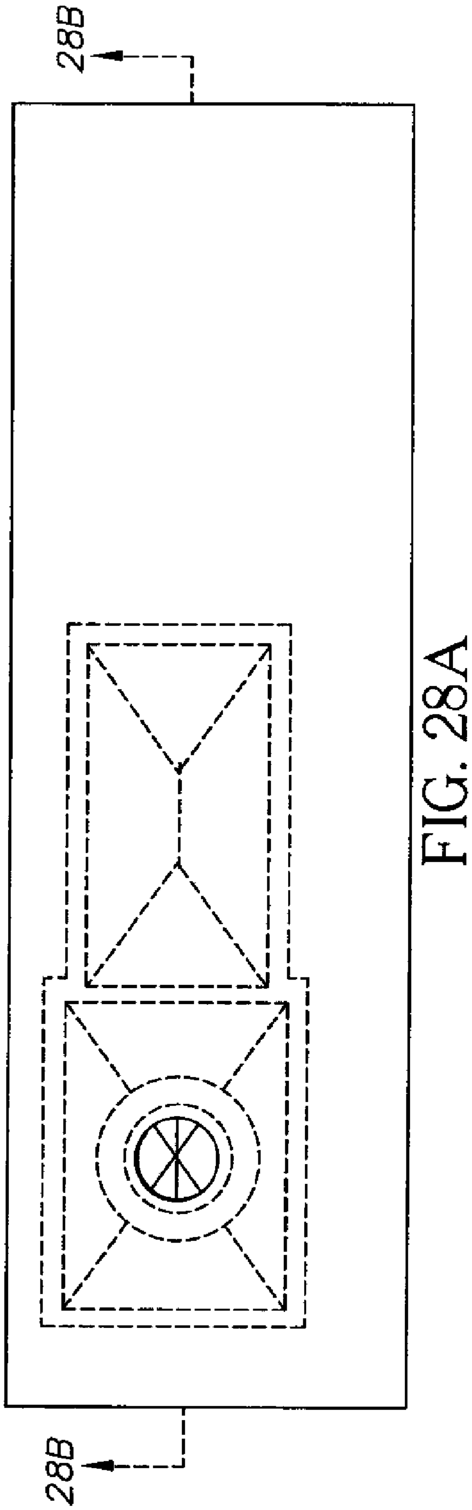
FIG. 28A shows a top view following a subsequent step of forming a fluid chamber and impedance channel.
Figure 28B:
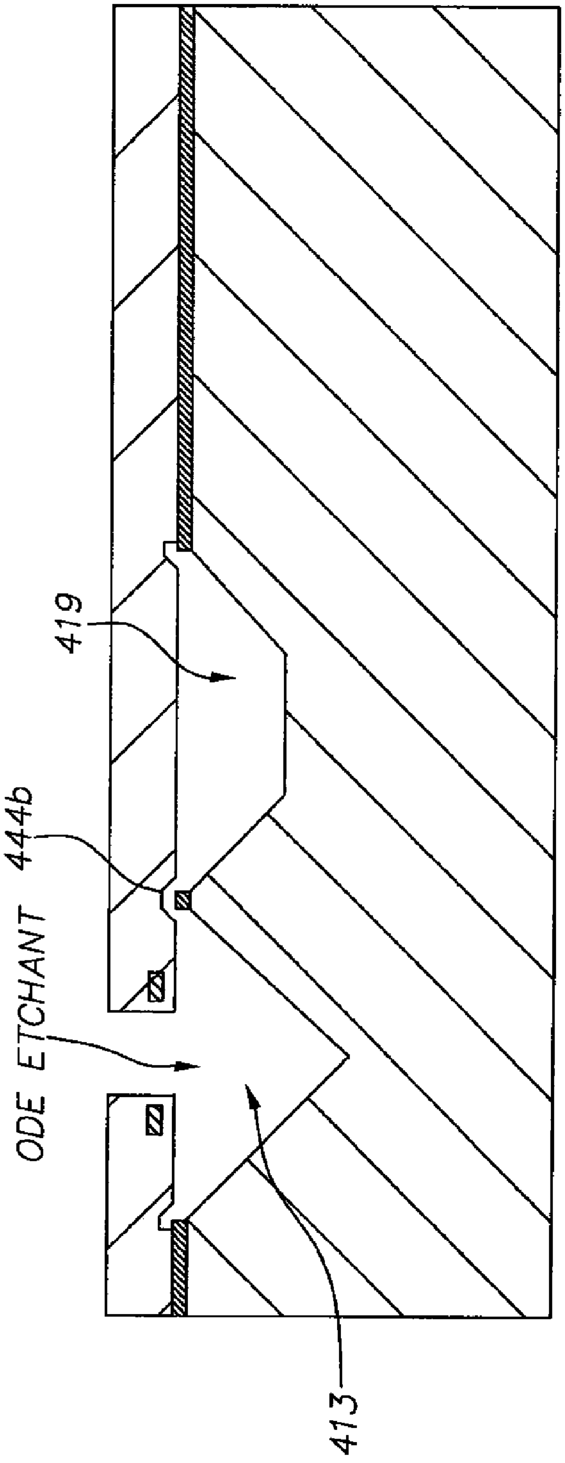
FIG. 28B shows a cross-sectional view as seen along direction 28B-28B.

FIG. 28 shows the step of orientation dependent etching of both the fluid chamber 413 and the impedance channel 419. Note: if sacrificial layer 443 is polysilicon, the etching of the sacrificial layer and the ODE etching of fluid chamber 413 and impedance channel 419 can all occur during the same step.

Figure 29A:
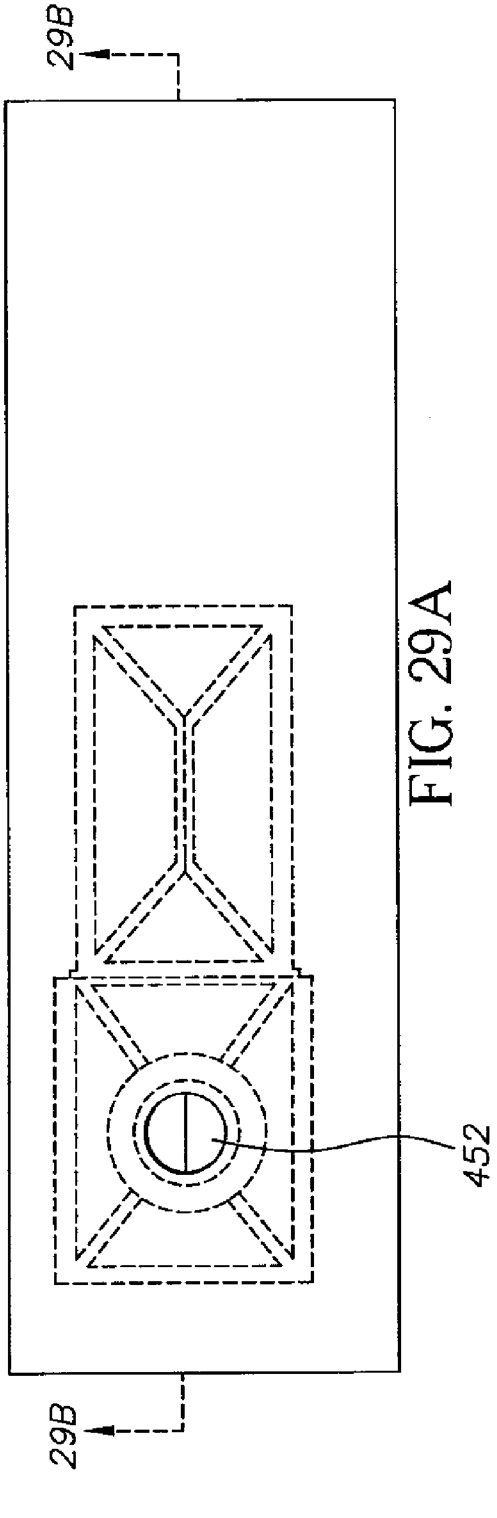
FIG. 29A shows a top view following a subsequent step of enlarging the connection between the fluid chamber and the impedance channel.
Figure 29B:
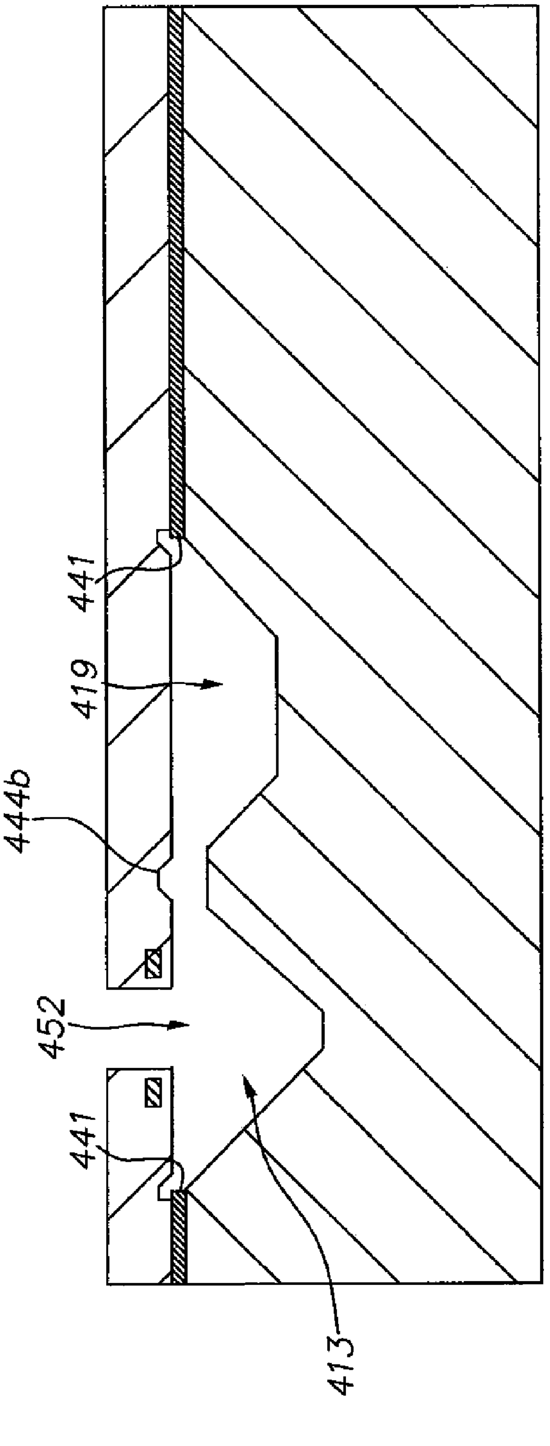
FIG. 29B shows a cross-sectional view as seen along direction 29B-29B.

Although cavity 444*b* is sufficient for allowing the ODE etchant to get to the region of impedance channel 419, cavity 444*b* is typically not large enough in cross-section to enable the fast refill of fluid chamber 413 through impedance channel 419 with fluid during subsequent operation of the device. Thus it will usually be desirable to enlarge the connecting region between fluid chamber 413 and impedance channel 419. Such a step for enlarging this connecting region is shown in FIG. 29. In FIG. 29 an isotropic etch step has been performed, for example by allowing an etching gas such as $SF_6$ or $XeF_2$ to enter the nozzle region 452 for a predetermined period of time, and thereby etch regions of exposed silicon. As a result, fluid chamber 413 and impedance channel 419 are both enlarged somewhat, including in the connecting region directly below cavity 445*b*. Note also that oxide layer 441 becomes undercut somewhat, and previously sharp corners in the orientation dependent etched structures 413 and 419 become somewhat rounded.

Figure 30A:
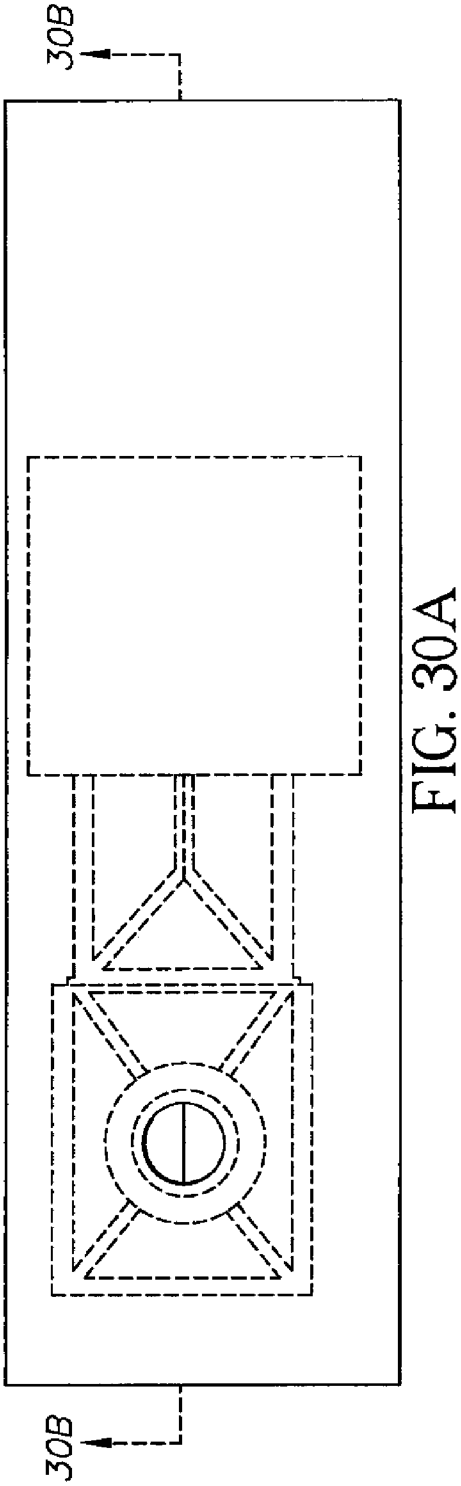
FIG. 30A shows a top view following a subsequent step of forming a fluid delivery channel.
Figure 30B:
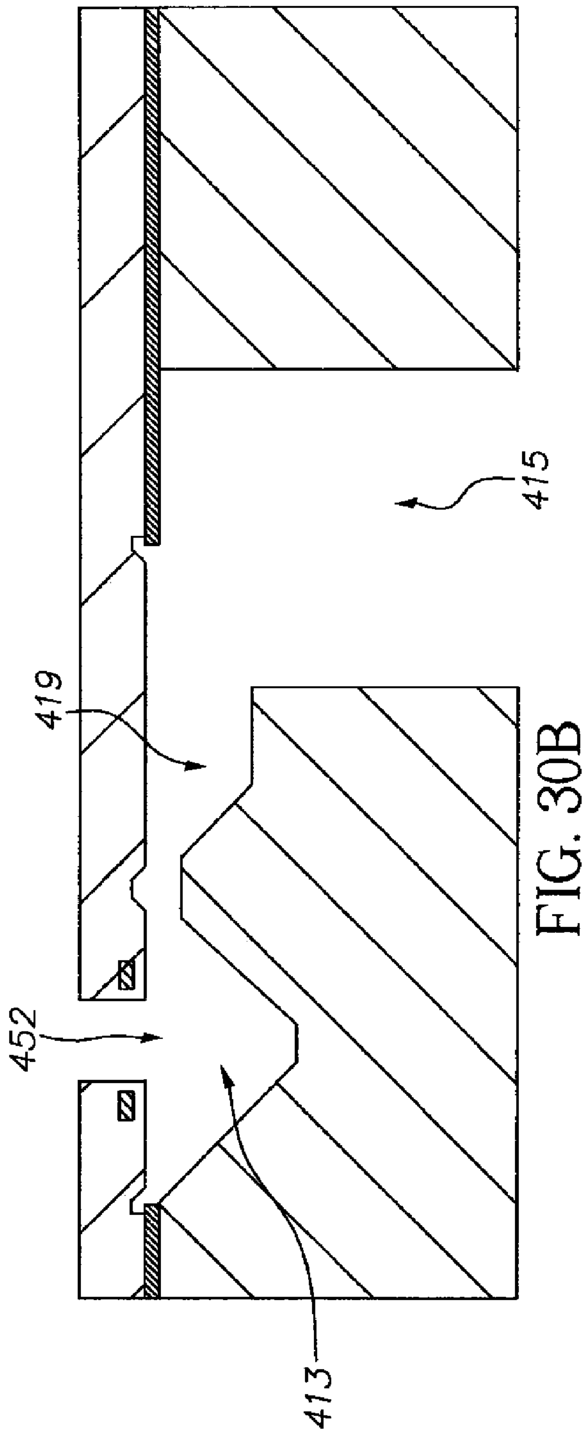

FIG. 30 shows the formation of the fluid delivery channel 415 by DRIE from the backside of the silicon substrate. Its point of intersection with the impedance channel 419 is shown as occurring at a location where the impedance channel is at its full depth rather than where the end wall of the impedance channel is sloping. However, it may be appreciated that the intersection point could also be designed to occur alternatively within the sloping end wall of the impedance channel 419.

FIGS. 31-35 illustrate a fifth embodiment for forming a constriction in the fluid path between the fluid delivery channel and the nozzle. In this fifth embodiment, the constriction is formed by interposing one or more multistage impedance channels between the nozzle and the fluid delivery channel, said multistage impedance channel having a region with cross-sectional area which is less than the maximum cross sectional area of the fluid chamber, i.e. less than 0.35 $S^2$. The particular example of forming such a multistage impedance channel which will be described here is comprised of two orientation dependent etched passages which are end-to-end, at least one of which having a length l less than S and a corresponding depth less than 0.707 S. The resulting cross-sectional area of the impedance channel has a region whose cross-sectional area is less than 0.35 $S^2$.

FIG. 31 shows an oxide mask pattern for a fluid chamber of width S and an adjacent multistage impedance channel with one stage having a length l<S. FIG. 31 shows the result of the various processing steps for the multilayer stack 540. It is similar to FIG. 6 for the first embodiment, and similar numbers refer to similar parts, including substrate 510, multilayer stack 540, heater element 551, oxide layer 541, region 542*a* of oxide which has been removed corresponding to the eventual location of the fluid chamber, region 542*b* of oxide which has been removed corresponding to the eventual location of the first stage of the impedance channel, region 542*c* of oxide which has been removed corresponding to the eventual location of the second stage of the impedance channel, sacrificial layer 543*a* in the eventual location of the fluid chamber, region 542*b* of oxide which has been removed corresponding to the eventual location of the first stage of the impedance channel, region 542*c* of oxide which has been removed corresponding to the eventual location of the second stage of the impedance channel, region of overlap 544*a* of sacrificial layer on top of the oxide layer at the extreme ends of the fluid chamber and the impedance channel, and region of overlap 544*b* of sacrificial layer on top of the oxide layer in the region between the eventual locations of the fluid chamber and the two stages of the impedance channel.

FIG. 32 illustrates the step of etching the nozzle 552. FIG. 33 shows the result of etching of the sacrificial layer as well as the fluid chamber 513, and the first stage 519*a* and the second stage 519*b* of the multistage impedance channel. In the particular example shown, both the length l and the width of the first stage 519*a* of the multistage impedance channel are less than S. However, it is smaller of the two dimensions of the orientation dependent etched pit that determines its depth. In the example shown in FIG. 33, the length of first stage 519*a* is smaller than the width. Therefore the depth of the first stage 519*a* of the multistage impedance channel is 0.707 l. For other examples (not shown), the width of the first stage 519*a* could be less than l or even greater than S, and still satisfy the condition that the cross sectional area of at least one stage of the multistage impedance channel is less than 0.35 $S^2$.

As in the fourth embodiment, it is desirable (for adequately fast fluid refill during operation) to enlarge the connecting regions between the fluid chamber and the stages of the impedance channel. In FIG. 34 an isotropic etch step has been performed, for example by allowing an etching gas such as $SF_6$ or $XeF_2$ to enter the nozzle region 552 for a predetermined period of time, and thereby etch regions of exposed silicon. As a result, fluid chamber 513 and both stages of the impedance channel 519*a* and 519*b* are enlarged somewhat.

FIG. 35 shows the formation of the fluid delivery channel 515 by DRIE from the backside of the silicon substrate. Its point of intersection with the second stage 519*b* of the impedance channel is shown as occurring at a location where the second stage 519b is at its full depth rather than where the end wall is sloping. However, it may be appreciated that the intersection point could also be designed to occur alternatively within a sloping end wall of the second stage 519*b* of the impedance channel.

FIGS. 36-42 illustrate a sixth embodiment for forming a constriction in the fluid path between the fluid delivery channel and the nozzle. In this sixth embodiment, the constriction is formed by connecting the orientation dependent etched fluid chamber and the orientation dependent etched impedance channel by means of a previously formed pit, said pit having a temporary material removed from it after the orientation dependent etching of the fluid chamber and the impedance channel is completed.

FIG. 36 shows the first step of etching a pit 625 into first surface 611 of silicon substrate 610. The pit 625 may be etched by a variety of isotropic or anisotropic means. However, in this embodiment, it is shown, for example, to be etched by reactive ion etching. This pit has lateral dimensions l and w, and a depth d.

FIG. 37 shows pit 625 substantially filled with temporary material 626 having the following properties: a) it must be capable of filling the pit 625; b) it must be able to withstand the subsequent processing steps; c) it must be etched slowly or not at all by the etchant used to etch the temporary material above the fluid chamber; d) it must be etched slowly or not at all by the ODE etchant used in the fluid chamber etch step; and e) it must be removable by an etch process which does not substantially attack exposed silicon. An example of such a material is glass. In FIG. 37, the top of the temporary pit-filling material 626 is shown to be at the same level as the first surface 611 of the silicon substrate. The excess temporary material 626 which may have been deposited on surface 611 has been removed, by steps which may include chemical mechanical polishing.

FIG. 38 shows the result of the various processing steps for the multilayer stack 640 over pit 625 filled with temporary material 626. It is similar to FIG. 6 for the first embodiment, and similar numbers refer to similar parts, including multilayer stack 640, heater element 651, oxide layer 641, region 642*a* of oxide which has been removed corresponding to the eventual location of the fluid chamber, region 642*b* of oxide which has been removed corresponding to the eventual location of the impedance channel, sacrificial layer 643*a* in the eventual location of the fluid chamber, sacrificial layer 643*b* in the eventual location of the impedance channel, sacrificial layer 643*d* over the top of pit-filling temporary material 626, and region of overlap 644 of sacrificial layer on top of the oxide layer at the extreme ends of the fluid chamber and the impedance channel.

FIG. 39 illustrates the step of etching the nozzle 652. FIG. 40 shows the result of etching of the sacrificial layer 643 as well as the fluid chamber 613, and the impedance channel 619. Pit-filling temporary material 626 is substantially not affected by either the etch of the sacrificial layer 643 or by the orientation dependent etch step to form the fluid chamber 613 and the impedance channel 619. Width s of the impedance channel 619 is less than width S of the fluid chamber 613, and depth of impedance channel 619 is 0.707 s which is less than depth 0.707 S of fluid chamber 613.

FIG. 41 shows the result of etching the pit-filling temporary material 626 from the pit 625 using an etchant which does not substantially affect exposed silicon. The passageway between fluid chamber 613 and the impedance channel 619 has been enlarged by the interposed pit 625. Note: In this particular example, both the interposed pit 625 and the impedance channel 619 are sketched to have a cross-sectional area which is less than the maximum cross-sectional area of fluid chamber 613. However, other examples which are included under this invention are the case where the cross-sectional area of the interposed pit 625 is less than that of the fluid chamber 613 (but the cross-sectional area of the impedance channel 619 is not less), as well as the case where the cross-sectional area of the impedance channel 619 is less than that of the fluid chamber 613 (but the cross-sectional area of the interposed pit 625 is not less).

It is significant that this method of connecting two orientation dependent etched structures having different widths and depths by removing temporary material from an interposed pit does not affect the precision of the dimensions of fluid chamber 613 and impedance channel 619, as some other methods of making this connection would do. For example, it is well known that connecting two end-to-end orientation dependent etched chambers having the same axis and different widths S and s by using a subsequent orientation dependent etch step would tend to etch the entire region to the larger width S and a depth 0.707 S if the etch step is allowed to proceed to completion. In general, if there are two intersecting orientation dependent etched features in a (100) substrate, and if there is a convex angle at the point of intersection of the two features, the portion of substrate at the convex angle is subject to rapid etching. In FIG. 41, a convex angle 627 is shown between pit 625 and chamber 613. In the process described here, this convex angle is not subject to rapid etching, because the orientation dependent etch step preceded the step of removing the temporary material 626 from pit 625. Note: the method of emptying temporary material from a pit in order to form a passageway which connects to an orientation dependent etched feature has been described in terms of an orientation dependent etched fluid chamber having a roof. The general method of connecting a recess in a surface with an orientation dependent etched feature is described in co-pending application, Substrate Etching Method for Forming Connected Features.

FIG. 42 shows the formation of the fluid delivery channel 615 by DRIE from the backside of the silicon substrate. Its point of intersection with the impedance channel 619 is shown as occurring at a location where impedance channel 619 is at its full depth rather than where the end wall is sloping. However, it may be appreciated that the intersection point could also be designed to occur alternatively within the sloping end wall of the impedance channel 619.

FIG. 43 shows a seventh embodiment which is very similar to the sixth embodiment. In the seventh embodiment, there is not a separate orientation dependent etched pit which forms the impedance channel. Rather, the impedance channel 728 is formed by a pit which had been filled with a temporary material prior to the etching of the fluid chamber 713, by a similar process as described in the sixth embodiment.

In the first seven embodiments described above, the fluid delivery channel is offset asymmetrically to one side of the nozzle. FIG. 44 illustrates an eighth embodiment in which there is a nozzle 852 plus two fluid delivery channels 815*a* and 815*b*, and two corresponding regions of constriction 814*a* and 814*b* between the fluid delivery channels and the nozzles, such that the fluid delivery channels and the regions of constriction are arranged symmetrically about the location of the nozzle. In such a design, there is a redundant fluid pathway for fluid to reach the nozzle. FIG. 44 shows the particular example of fluid constriction regions 814*a* and 814*b* made in the same fashion as the first embodiment. However, it is readily apparent that symmetrical versions of the other embodiments are possible as well.

In the first eight embodiments, the type of physical structure which provides the fluid impedance between the fluid delivery channel and the nozzle is a region of constriction. It is also possible to provide fluid impedance to improve energy efficiency and reduce fluidic cross-talk with nearby channels by increasing the length of the chamber between the nozzle region and the point at which the fluid supply channel meets the chamber. FIG. 45 shows a first embodiment of providing fluid impedance through additional length of the fluid chamber. The process for making the structure is substantially identical to that described with reference to FIGS. 6-10. A first difference is that the orientation dependent etched fluid chamber 1013 is designed to have an extended length between a point 1052*a* directly below the center of the nozzle and a point 1015*a* of intersection with the fluid delivery channel. A second difference is that the point 1015*a* of intersection of the fluid chamber 1013 and the fluid delivery channel 1015 occurs at a location where the fluid chamber is at its full depth, so that there is not a constriction in the fluid path between the nozzle and the fluid delivery channel. The fluid impedance of a passageway is proportional to its length, and it also is inversely proportional to the depth raised to a power. Define Y as the distance between the point 1052*a* directly below the center of the nozzle and the point 1015*a* of intersection of fluid chamber 1013 and fluid delivery channel 1015. Further, define Z as the distance between the bottom of the nozzle plate 1040 and the bottom of the fluid chamber 1013. The preferred range of values for Y is one where $10Z>Y>1.3Z$. The lower bound for Y, that it is greater than 1.3Z, is motivated by the desire for improved energy efficiency and reduced cross-talk with nearby channels. The upper bound for Y, that it is less than 10Z, is motivated by the desire to have fast enough refill of the chamber.

A different means for describing a preferred minimum length of the fluid chamber when used as a source of fluid impedance is with respect to distances related to the amount of fluid being pushed toward the nozzle versus the amount of fluid being pushed toward the fluid supply channel. As the bubble nucleates and grows, it is pushing a volume of fluid toward the nozzle in order to eject the droplet. At the same time, the bubble is also pushing another volume of fluid back toward the fluid supply channel. By designing the fluid chamber such that the amount of fluid that the bubble needs to displace back toward the fluid supply channel is somewhat greater than the amount of fluid pushed toward the nozzle, a suitable amount of impedance can be provided. Define p as the distance between the point 1015*a* of intersection and the point 1051*a* directly below the edge of the heater element which is closest to the point of intersection 1015*a*. Further, define q as the distance between the point 1052*a* directly below the center of the nozzle and the point 1051*a* that is directly below the edge of the heater element which is closest to the point of intersection 1015*a*. In order to provide a desirable source of fluid impedance, it is preferred that p be greater than q.

Advantages of the configuration of FIG. 45 are that dimensional control of the fluid passageways is very tight and the fabrication process is very simple. The fluid chamber is formed by orientation dependent etching, so that once the etching is complete to the point of exposing the (111) planes which intersect the silicon surface in the [110] lines defined by the oxide mask pattern, the etching essentially stops. Dimensions of fluid chamber 1013 are then substantially independent of parameters such as etchant temperature, etchant concentration, or length of additional etch time. In addition, it is readily possible to fabricate the fluid delivery channel 1015, using methods such as DRIE, such that its point of intersection 1015*a* with fluid chamber 1013 is within a few microns of the target.

FIG. 46 illustrates a second embodiment of providing fluid impedance through additional length of the fluid chamber. In FIG. 46 there is a nozzle 1152 plus two fluid delivery channels 1115*a* and 1115*b*, such that the fluid delivery channels are arranged symmetrically about the location of the nozzle. In such a design, there is a redundant fluid pathway for fluid to reach the nozzle. The process for making the structure is substantially identical to that described with reference to FIGS. 6-10, as well as FIG. 44. A first difference is that the orientation dependent etched fluid chamber 1113 is designed to have an extended length between a point 1152*a* directly below the center of the nozzle and the respective points of intersection with fluid delivery channels 1115*a* and 1115*b*. Define lengths Y1 and Y2 similarly to Y in FIG. 45, such that Y1 corresponds to the distance from a projection of the center of the nozzle to the intersection with fluid delivery channel 1115*a*, and such that Y2 corresponds to the distance from a projection of the center of the nozzle to the intersection with fluid delivery channel 1115b. Similarly, define Z as the distance between the bottom of the nozzle plate 1140 and the bottom of the fluid chamber 1113. The preferred range of values for Y1 and Y2 is one where 10Z>(Y1 and Y2)>1.3Z. Furthermore, define lengths p1 and p2 similarly to p in FIG. 45, such that p 1 corresponds to the distance between the point 1115*a* of intersection and the point 1151*a* directly below the edge of the heater element which is closest to the point of intersection 1115*a*, and such that p2 corresponds to the distance between the point 1115*b* of intersection and the point 1151*b* directly below the edge of the heater element which is closest to the point of intersection 1115*b*. Similarly, define length q1 as the distance between the point 1152*a* directly below the center of the nozzle and the point 1151*a* that is directly below the edge of the heater element which is closest to the point of intersection 1115*a*. Also, define length q2 as the distance between the point 1152*b* directly below the center of the nozzle and the point 1151*b* that is directly below the edge of the heater element which is closest to the point of intersection 1115*b*. In order to provide desirable sources of fluid impedance, it is preferred that p1 be greater than q1, and that p2 be greater than q2.

In the configuration shown in FIG. 1, the fluid ejectors 160 are arranged in a substantially linear row. Furthermore in FIG. 1, only a single fluid delivery channel 115 is shown. For applications such as high quality printing where it is desired to eject fluid at high resolution, a linear array of fluid ejectors requires that there be a small distance between adjacent fluid ejectors. This small distance imposes design constraints on the geometries of fluid ejectors. For example, in some applications having a linear row of fluid ejectors will require that many or all of the fluid ejectors 160 share a common fluid delivery channel 115. If it were desired to form a single fluid delivery channel per fluid ejector in a high resolution linear array, the individual fluid delivery channels, and/or the walls between adjacent fluid delivery channels, might need to be unacceptably narrow.

However, in a two dimensional array of fluid ejectors, some of these geometrical constraints can be relaxed. FIG. 47 shows a top view of a two dimensional array of fluid ejectors. In this example, there are four rows (1201, 1202, 1203 and 1204) and four columns (1205, 1206, 1207 and 1208) of fluid ejectors 1261. For each fluid ejector is shown a fluid delivery channel 1215, a fluid chamber 1213, heating elements 1252, and a nozzle 1251. In this figure, the heating elements are shown as a pair of elements located on opposite sides of the nozzle, but other heater element configurations are possible. Also, the source of fluid impedance is shown in this example as an extended length of the fluid chamber between the nozzle 1252 and the fluid delivery channel 1215, but other types of fluid impedance sources (such as those described above) may alternatively be used. It is assumed that the array of drop ejectors is to deposit droplets of fluid on a medium (not shown). Furthermore, it is assumed that the relative motion of the two dimensional array of ejectors and the medium is along the direction X. As shown in FIG. 47, in each of the rows of drop ejectors, the nozzles in neighboring fluid ejectors are offset from one another in a direction substantially perpendicular to X by a distance b. Furthermore, the offset between the rightmost fluid ejector in one row and the leftmost fluid ejector in the next row is also b in a direction substantially perpendicular to X. Nozzles in adjacent columns are separated by a distance c in the X direction. As can be readily seen, such a two dimensional array is capable of printing a line of droplets wherein each droplet is a distance b from its neighbor, if the timing of ejecting drops from fluid ejectors in adjacent columns is delayed by a time t=c/v, where v is the velocity of the relative motion of the medium and the fluid ejector array. Thus, in a two dimensional array of drop ejectors, it is possible to provide an individual fluid delivery channel 1215 through the substrate for each drop ejector. Such a configuration can have greater structural strength than the arrangement wherein the fluid delivery channel is a slot feeding many adjacent drop ejectors.

FIG. 48 shows a top view of a two dimensional array of fluid ejectors in which each fluid chamber is supplied by two fluid delivery channels from opposite ends. The configuration is similar to that of FIG. 47 and similar components are labeled similarly. For each fluid ejector is shown a fluid delivery channel 1315, a fluid chamber 1313, heating elements 1352, and a nozzle 1351. In this figure, the heating elements are shown as a pair of elements located on opposite sides of the nozzle, but other heater element configurations are possible. Also, the source of fluid impedance is shown in this example as an extended length of the fluid chamber between the nozzle 1352 and the fluid delivery channel 1315, but other types of fluid impedance sources (such as those described above) may alternatively be used. The primary difference is that in the configuration shown in FIG. 48, there are redundant fluid delivery channels 1315 for each chamber 1313.

The invention has been described in detail with particular reference to certain preferred embodiments thereof, but it will be understood that variations and modifications can be effected within the scope of the invention.

Parts List

In the following list, parts having similar functions in the various embodiments describes are denoted by a number of the form mnp, where m is an integer from 1 to 13. Parts referring to a particular embodiment described above are denoted by a specific integer m.

10 fluid ejection system
12 image data source
14 controller
16 electrical pulse source
20 recording medium
100 ink jet printhead
m10 substrate
m11 first surface of substrate
m12 second surface of substrate
m13 fluid chamber
m14 region of constriction
m15 fluid delivery channel
m19 impedance channel formed by orientation dependent etching
m40 multilayer stack
m41 lowest layer of multilayer stack m40, formed on surface m11
m42 window in layer m40 to expose substrate surface m11
m43 sacrificial layer material
m44 region of overlap of sacrificial material m43 on layer m41
m45 cavity between m40 and m11 formed by etching material m43
m50 nozzle plate formed as part of multilayer stack m40
m51 heater element(s)
m52 nozzle
116 end wall of fluid chamber, near nozzle
117 end wall of fluid chamber, opposite end wall m16
118 termination of end wall m17 at substrate surface m11
120 line of intersection of delivery channel m15 and chamber m13
160 row of fluid ejectors
161 one example of a fluid ejector
180 ejected drop of fluid
181 slug of fluid protruding through nozzle
190 vapor bubble
221 pit for filling with material to form pendant protrusion
222 material for filling pit m21 to form pendant protrusion
245 island of oxide layer deposited over pendant protrusion material
346 opaque layer on top of multilayer stack
347 location where posts are to be formed
370 photopatternable polymer material
371 exposure mask
374 polymer post structures
375 top layer of polymer material
625 pit interposed between fluid chamber m13 and impedance channel m19
626 material used to temporarily fill pit
627 convex corner between two intersecting pits
728 impedance channel formed by removing temporary material from pit

What is claimed is:

1. A method of forming a fluid ejector comprising:

providing a substrate having a surface;

depositing a first material layer on the surface of the substrate, the first material layer being differentially etchable with respect to the substrate;

defining a fluid chamber boundary region by removing a portion of the first material layer thereby forming a patterned first material layer that includes a region exposing the surface of the substrate;

after forming the patterned first material layer, depositing a sacrificial material layer over the patterned first material layer;

further defining the fluid chamber boundary location by removing a portion of the sacrificial material layer deposited over the patterned first material layer thereby forming a patterned sacrificial material layer that includes a region of sacrificial material that is in contact with the surface of the substrate;

depositing at least one additional material layer over the patterned sacrificial material layer;

after depositing the at least one additional material layer, etching a hole through the at least one additional material layer, said hole terminating at the region of the sacrificial material layer that is in contact with the surface of the substrate within the fluid chamber boundary location;

after etching the hole, removing the sacrificial material layer in the region of the sacrificial material layer that is in contact with the surface of the substrate within the fluid chamber boundary location by introducing a first etchant through the hole;

forming the fluid chamber by introducing a second etchant through the hole to etch substrate material within the fluid chamber boundary location that was exposed after removing the sacrificial material layer; and forming a source of fluid impedance.

2. The method according to claim 1, the surface being a first surface, wherein forming the source of fluid impedance comprises:

forming a pit in the first surface of the substrate, the substrate having a second surface opposite the first surface; and filling the pit with a material which will form a protrusion extending from the first material layer toward the second surface of the substrate,, the protrusion remaining as a region of constriction in a fluid passageway after the fluid chamber is formed.

3. The method according to claim 2, wherein forming the pit in the first surface of the substrate comprises forming the pit in the first surface of the substrate within the fluid chamber boundary location.

4. The method according to claim 2, wherein forming the pit in the first surface of the substrate comprises etching the pit in the first surface of the substrate.

5. The method according to claim 4, wherein etching the pit includes etching the pit using an anisotropic etching process.

6. The method according to claim 4, wherein etching the pit includes etching the pit using an orientation dependent etching process to provide a pit having a plurality of sloping walls.

7. The method according to claim 4, wherein etching the pit includes etching the pit using an isotropic etching process.

8. The method according to claim 1, wherein forming the fluid chamber includes using an orientation dependent etching process to provide a fluid chamber having a plurality of sloping walls.

9. The method according to claim 1, the hole being a first hole, wherein forming the source of fluid impedance comprises:

depositing an opaque material layer over the at least one additional material layer prior to forming the first hole extending from the at least one additional material layer to the sacrificial material layer, the first hole also extending through the opaque material layer;

forming a second hole extending from the opaque material layer to the sacrificial material layer;

depositing a photopatternable polymer material over the at least one additional material layer such that the polymer material fills the fluid chamber, the first hole, and the second hole;

providing a mask over the first hole;

photoexposing at least some of the photopatternable material;

removing that portion of the photopatternable material which remains unexposed; and forming a post extending through the second hole from the at least one additional material layer to a wall of the fluid chamber by curing the photopatternable polymer material.

10. The method according to claim 9, wherein depositing the photopatternable polymer material over the at least one additional material layer comprises depositing an epoxy.

11. The method according to claim 10, wherein depositing the epoxy includes depositing an SU-8 epoxy.

12. The method according to claim 9, wherein curing the photopatternable polymer material anchors the post to the wall of the fluid chamber.

13. The method according to claim 9, wherein forming a second hole extending from the opaque material layer to the sacrificial material layer includes forming a plurality of second holes thereby forming a plurality of posts.

14. The method according to claim 1, wherein the first etchant is the same as the second etchant.

15. The method according to claim l, wherein the substrate is a silicon substrate.

16. The method according to claim 1, wherein the sacrificial material layer includes a polycrystalline silicon material.

17. The method according to claim 1, further comprising:

etching a fluid delivery channel in the substrate using an etchant, the fluid delivery channel connecting with the fluid chamber such that the source of fluid impedance is disposed between the fluid delivery channel and the hole.

* * * * *